United States Patent
Fox et al.

(10) Patent No.: US 12,459,904 B2
(45) Date of Patent: Nov. 4, 2025

(54) PROCESS FOR PREPARING CARBAMOYLOXYMETHYL TRIAZOLE CYCLOHEXYL ACID COMPOUNDS

(71) Applicant: BRISTOL-MYERS SQUIBB COMPANY, Princeton, NJ (US)

(72) Inventors: Richard J. Fox, Yardley, PA (US); Carlos A. Guerrero, North Wales, PA (US); Michael Dummeldinger, Plainsboro, NJ (US); Dimitri Skliar, Staten Island, NY (US); Harshkumar Patel, Somerset, NJ (US); Yichen Tan, East Brunswick, NJ (US); David Thomas George, Ewing, NJ (US); Shane McKenna, Pensby (GB); Candice Lee Joe, Metuchen, NJ (US); Michael J. Smith, Somerset, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 950 days.

(21) Appl. No.: 17/603,659

(22) PCT Filed: Apr. 14, 2020

(86) PCT No.: PCT/US2020/028039
§ 371 (c)(1),
(2) Date: Oct. 14, 2021

(87) PCT Pub. No.: WO2020/214545
PCT Pub. Date: Oct. 22, 2020

(65) Prior Publication Data
US 2022/0298122 A1    Sep. 22, 2022

Related U.S. Application Data

(60) Provisional application No. 62/834,538, filed on Apr. 16, 2019.

(51) Int. Cl.
| | |
|---|---|
| *C07D 249/04* | (2006.01) |
| *C07C 51/09* | (2006.01) |
| *C07C 51/12* | (2006.01) |
| *C07C 51/29* | (2006.01) |
| *C07D 233/60* | (2006.01) |
| *C07D 401/04* | (2006.01) |

(52) U.S. Cl.
CPC ............ *C07D 249/04* (2013.01); *C07C 51/09* (2013.01); *C07C 51/12* (2013.01); *C07C 51/29* (2013.01); *C07D 233/60* (2013.01); *C07D 401/04* (2013.01)

(58) Field of Classification Search
CPC .................................................... C07D 249/04
See application file for complete search history.

(56) References Cited

U.S. PATENT DOCUMENTS

| | | |
|---|---|---|
| 10,071,078 B2 | 9/2018 | Cheng et al. |
| 10,576,062 B2 | 3/2020 | Cheng et al. |
| 11,007,180 B2 | 5/2021 | Cheng et al. |
| 2018/0029999 A1 | 2/2018 | Jiang et al. |
| 2021/0244711 A1 | 8/2021 | Cheng |
| 2022/0073476 A1 | 3/2022 | Lou et al. |

FOREIGN PATENT DOCUMENTS

| | | |
|---|---|---|
| WO | 2007096576 A1 | 8/2007 |
| WO | 2017/223016 A1 | 12/2017 |
| WO | 2019126093 A1 | 6/2019 |
| WO | 2020147740 A1 | 7/2020 |

OTHER PUBLICATIONS

Greene and Wuts "Protective Groups in Organic Synthesis" 3rd Edition, Wiley, 1999, pp. 1-87.*
Krall et al., "Molecular Hybridization of Potent and Selective γ-Hydroxybutyric Acid (GHB) Ligands: Design, Synthesis, Binding Studies, and Molecular Modeling of Novel 3-Hydroxycyclopent-1-enecarboxylic Acid (HOCPCA) and trans-γ-Hydroxycrotonic Acid (T-HCA) Analogs" &nbsp;J. Med. Chem., vol. 60 pp. 9022-9039 (2017).
Hashimoto et al., "Phase-Transfer-Catalyzed Asymmetric Alkylation of a-Benzoyloxy-b-keto Esters: Stereoselective Construction of Congested 2,3-Dihydroxycarboxylic Acid Esters", Chemistry—An Asian Journal, vol. 5,(3), pp. 562-570 (2010).
Li et al., "Copper-catalyzed a-C—H acyloxylation of carbonyl compounds with terminal alkynes" New Journal of Chemistry, vol. 42(3), pp. 1581-1584 (2018).
CAS Registry No. 2302095-32-3 Entered STN: Apr. 7, 2019br1H-1,2,3-Triazole, 4-bromo-1-methyl-5-[(phenylmethoxy)methyl.
Kuijpers, et al. "Copper(I)-Mediated Synthesis of Trisubstituted 1,2,3-Triazoles", SYNLETT; No. 20, pp. 3059-3062 (2005).
1 Greene and Wuts "Protective Groups in Organic Synthesis" 3rd Edition, Wiley, 1999, pp. 1-87.

* cited by examiner

*Primary Examiner* — David K O'Dell
(74) *Attorney, Agent, or Firm* — Jing G. Sun

(57) ABSTRACT

Improved methods and intermediates thereof for preparing carbamoyloxy methyl triazole cyclohexyl acid compounds are described. These compounds are useful as LPA antagonists. Formula (I).

23 Claims, No Drawings

PROCESS FOR PREPARING CARBAMOYLOXYMETHYL TRIAZOLE CYCLOHEXYL ACID COMPOUNDS

CROSS-REFERENCE TO RELATED APPLICATIONS

This application is a 371 of International Application No. PCT/US2020/028039 filed on Apr. 14, 2020, which claims the priority benefit of U.S. Provisional Application 62/834,538, filed Apr. 16, 2019; the content of which is herein incorporated by reference in its entirety.

TECHNICAL FIELD

The present invention relates to improved methods for preparing carbamoyloxymethyl triazole cyclohexyl acid compounds and novel intermediates thereof.

BACKGROUND

Carbamoyloxymethyl triazole cyclohexyl acid LPA (especially LPAi) antagonists that are useful for the treatment of fibrosis have been described. See, e.g., WO2017/223016 (US 2017/0360759). Improved methods of making carbamoyloxymethyl triazole cyclohexyl acid compounds, which provide practical, large-scale synthesis, and improved production quality, efficiency and safety, are needed.

SUMMARY

The present invention provides novel processes, and novel intermediates thereof, for making carbamoyloxymethyl triazole cyclohexyl acid compounds.

Also described are methods of making intermediate compounds, stereoisomers and salts thereof.

DETAILED DESCRIPTION

The features and advantages of the invention may be more readily understood by those of ordinary skill in the art upon reading the following detailed description. It is to be appreciated that certain features of the invention that are, for clarity reasons, described above and below in the context of separate embodiments, may also be combined to form a single embodiment. Conversely, various features of the invention that are, for brevity reasons, described in the context of a single embodiment, may also be combined so as to form sub-combinations thereof.

The skilled artisan will recognize that some chemical structures described herein may be represented on paper by one or more other resonance forms; or may exist in one or more other tautomeric forms, even when kinetically, the artisan recognizes that such tautomeric forms represent only a very small portion of a sample of such compound(s). Such compounds are clearly contemplated within the scope of this disclosure, though such resonance forms or tautomers are not explicitly represented herein.

In aspect 1A, the invention provides a method of making a compound having a structure of Formula (I):

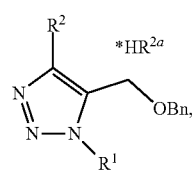

(I)

wherein $R^1$ is $C_{1-6}$ alkyl; and $R^2$ and $R^{2a}$ are halogen; comprising contacting a compound of Formula (III):

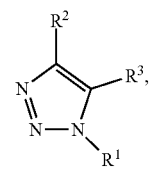

(III)

wherein $R^1$ is $C_{1-6}$ alkyl; $R^2$ is halogen; and $R^3$ is halogen;
with Reagent 2 that is an organolithium, in Solvent 2 that is a polar aprotic or nonpolar aprotic solvent, or a solvent mixture thereof;
for a time and at a temperature sufficient for lithium halogen exchange; followed by an alkylating agent in Solvent 3 that is a polar, polar aprotic, or nonpolar aprotic solvent, or a solvent mixture thereof;
for a time and at a temperature sufficient for alkylation; followed by a strong acid to produce the compound of Formula (I).

In aspect 1B, the invention provides a method of making a compound having a structure of Formula (I):

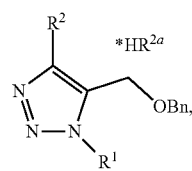

(I)

wherein $R^1$ is $C_{1-6}$ alkyl; and $R^2$ and $R^{2a}$ are halogen; comprising (1) contacting a compound of Formula (II):

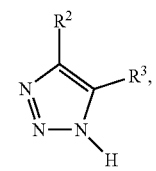

(II)

wherein $R^2$ and $R^3$ are independently halogen;
with a mixture of Reagent 1 selected from $R^5$—OM (a metal-base alkoxide), M-OH (a metal-base hydroxide), $M_2CO_3$ (a metal-base carbonate), $MHCO_3$ (a metal-base bicarbonate) $(R^6)_3N$ (a tertiary amine), and in a mixture thereof, in Solvent 1 that is $R^4$—OH, a polar protic, polar aprotic, or nonpolar aprotic solvent, or a solvent mixture thereof, and followed by adding an alkylating agent;

wherein M is a metal element selected from Li, Na, K and Cs; and $R^4$, $R^5$ and $R^6$ are independently $C_{1-6}$ alkyl;

for a time and at a temperature sufficient for alkylation and to produce a compound of Formula (III):

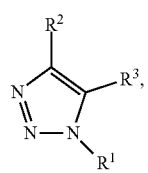

(III)

wherein $R^1$ is $C_{1-6}$ alkyl; $R^2$ is halogen; and $R^3$ is halogen; and (2) contacting the compound of Formula (III), with Reagent 2 that is an organolithium, in Solvent 2 that is a polar aprotic or nonpolar aprotic solvent, or a solvent mixture thereof;

for a time and at a temperature sufficient for lithium halogen exchange, followed by an alkylating agent in Solvent 3 that is a polar, polar aprotic, or nonpolar aprotic solvent, or a solvent mixture thereof;

for a time and at a temperature sufficient for alkylation, followed by a strong acid to produce the compound of Formula (I).

In aspect 2A, within the scope of aspect 1A, the invention provides a method of making a compound having a structure of Formula (I);

comprising contacting the compound of Formula (III), with Reagent 2 selected from n-BuLi, n-HexLi and PhLi in Solvent 2 selected from hexanes, THF, MeTHF and a solvent mixture thereof;

for a time and at −30 to −10° C. sufficient for lithium halogen exchange; followed by an alkylating agent selected from benzyl chloromethyl ether for a time and at −30 to −10° C. sufficient for alkylation, and a strong acid selected from HBr in acetic acid, or a mixture of acetyl bromide and 2-propanol in Solvent 3 selected from THF, $CH_3CN$, IPAc, MeTHF and a solvent mixture thereof to produce the compound of Formula (I).

In aspect 2B aspect, within the scope of aspect 1, the invention provides a method of making a compound having a structure of Formula (I);

comprising (1) contacting a compound of Formula (II), with a mixture of a metal-base alkoxide selected from LiOtBu, $K_2CO_3$, $KHCO_3$, $Et_3N$, NaOtBu, KOtBu, LiOH, $LiOH*H_2O$, LiOMe, and a mixture thereof, in Solvent 1 selected from $CH_3CH_2C(CH_3)_2OH$, $C(CH_3)_3OH$, $CH(CH_3)_2OH$, $CH_3CH_2OH$, $CH_3OH$, THF, EtOAc, IPAc, MeTHF, acetone, MIBK, $CH_3CN$, NMP, DMF, DCM, $H_2O$ and a solvent mixture thereof; and followed by an alkylating agent selected from methyl iodide, dimethylsulfate, dimethyl carbonate, methyl tosylate, and a mixture thereof;

for 24 to 72 hours and at a temperature sufficient for alkylation and to produce a compound of Formula (III):

and (2) contacting the compound of Formula (III), with Reagent 2 selected from n-BuLi, n-HexLi and PhLi in Solvent 2 selected from hexanes, THF, MeTHF and a solvent mixture thereof;

for a time and at −30 to −10° C. sufficient for lithium halogen exchange, and followed by an alkylating agent selected from benzyl chloromethyl ether for a time and at −30 to −10° C. sufficient for alkylation, and a strong acid selected from HBr in acetic acid, or a mixture of acetyl bromide and 2-propanol in Solvent 3 selected from THF, $CH_3CN$, IPAc, MeTHF and a solvent mixture thereof to produce the compound of Formula (I).

In aspect 3A, the invention provides a method of making a compound having a structure of Formula (Ia):

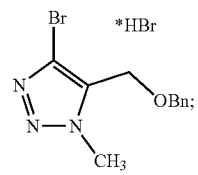

(Ia)

comprising contacting a compound of Formula (IIIa):

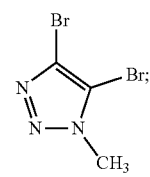

(IIIa)

with n-BuLi in hexanes;

for <1 hour and at −30 to −10° C. sufficient for lithium halogen exchange, followed by benzyl chloromethyl ether;

for 5 to 24 hours and at −30 to −10° C. sufficient for alkylation and 33 wt % HBr in acetic acid in $CH_3CN$ to produce the compound of Formula (Ia).

In aspect 3B, the invention provides a method of making a compound having a structure of Formula (Ia):

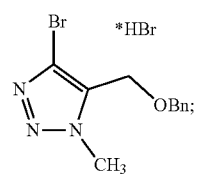

(Ia)

comprising (1) contacting a compound of Formula (IIa):

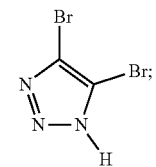

(IIa)

with a mixture of $CH_3CH_2C(CH_3)_2OH$ and LiOtBu, in THF, at <40° C. for 1 to 2 hours; followed by adding $CH_3I$ and continuing to age for 24 to 48 hours to produce a compound of Formula (IIIa):

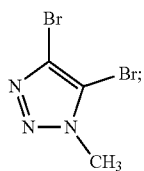

(IIIa)

and (2) contacting the compound of Formula (IIIa), with n-BuLi in hexanes;

for <1 hour and at −30 to −10° C. sufficient for lithium halogen exchange, followed by benzyl chloromethyl ether for 5 to 24 hours and at −30 to −10° C. sufficient for alkylation, and 33 wt % HBr in acetic acid in CH₃CN to produce the compound of Formula (Ia).

In aspect 4A, the invention provides a method of making a compound having a structure of Formula (IV) or a salt thereof:

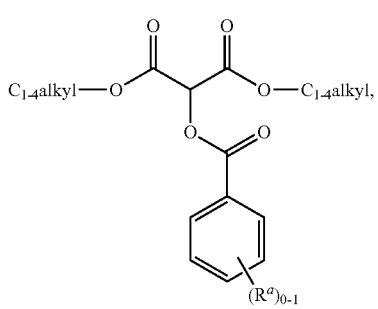

(IV)

wherein $R^a$ is —N(C$_{1-4}$ alkyl)$_2$;

comprising contacting a compound of Formula (V):

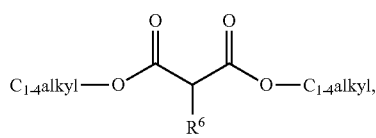

(V)

wherein $R^6$ is halogen;

with a compound of Formula (VI) or a salt thereof:

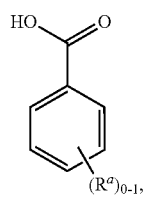

(VI)

wherein $R^a$ is —N(C$_{1-4}$ alkyl)$_2$;

in presence of an inorganic base and a phase-transfer catalyst in Solvent 4 that is a polar aprotic solvent, or a solvent mixture thereof;

for a time and at a temperature sufficient for reaction completion to produce the compound of Formula (IV) or a salt thereof.

In aspect 5A, within the scope of aspect 4A, the invention provides a method of making a compound having a structure of Formula (IVa) or a salt thereof:

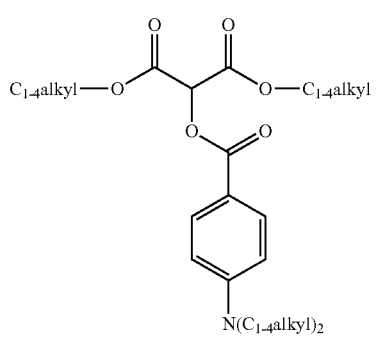

(IVa)

comprising contacting a compound of Formula (V) with a compound of Formula (VIa) or a salt thereof:

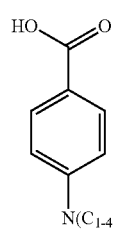

(VIa)

in presence of KHCO₃ and (C$_{1-4}$ alkyl)$_4$NBr, in Solvent 4 selected from DMF, CH₃CN, NMP, DMAc, HMPA, DMPU, DME, THF, and a solvent mixture thereof;

for a time and at 25 to 35° C. sufficient for reaction completion to produce the compound of Formula (IVa) or a salt thereof.

In aspect 6A, the invention provides a method of making a compound having a structure of Formula (IVb):

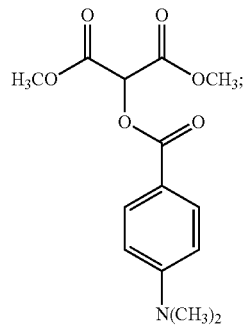

(IVb)

comprising contacting a compound of Formula (Va):

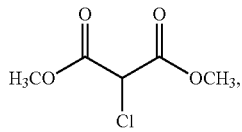
(Va)

with a compound of Formula (VIa):

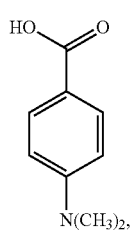
(VIa)

in presence of KHCO$_3$ and (Et)$_4$NBr in DMF;

for 4 to 72 hours and at 25 to 35° C. sufficient for reaction completion to produce the compound of Formula (IVb).

In aspect 7A, the invention provides a method of making a compound of Formula (VII) or a stereoisomer or a salt thereof:

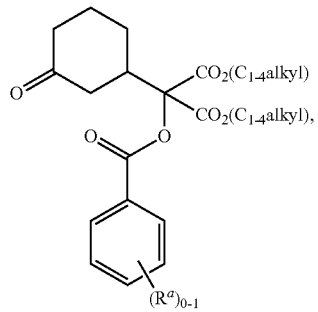
(VII)

wherein R$^a$ is —N(C$_{1-4}$ alkyl)$_2$;

comprising contacting a compound of Formula (VIII) or a salt thereof:

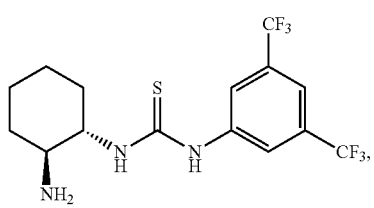
(VIII)

in presence of

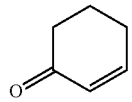

and a co-catalyst selected from

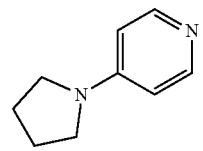 [SMILES: c1cc(N2CCCC2)ccn1]

and 4-DMAP, with or without an aqueous base, in Solvent 5 that is a nonpolar solvent, or a solvent mixture thereof;

for a time and at a temperature sufficient for reaction completion to produce the compound of Formula (VII) or a stereoisomer or a salt thereof.

In aspect 8A, within the scope of aspect 7A, the invention provides a method of making a compound having a structure of Formula (VIIa) or a salt thereof:

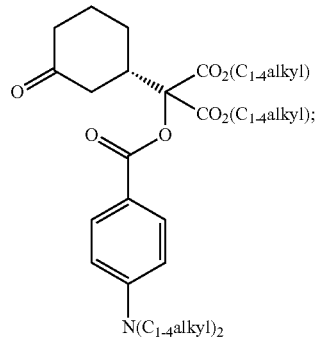
(VIIa)

comprising contacting a compound of Formula (VIII) or a salt thereof;

in presence of

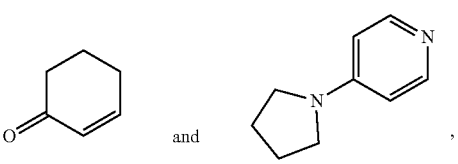 [SMILES: O=C1C=CCCC1 ; "and" ; c1cc(N2CCCC2)ccn1 ; ","]

with or without aqueous KOH, in Solvent 5 selected from toluene, CH$_2$Cl$_2$, trifluorotoluene, 1,2-dichlorobenzene, and a solvent mixture thereof;

for a time and at 25 to 35° C. sufficient for reaction completion to produce the compound of Formula (VIIa) or a salt thereof.

In aspect 9A, the invention provides a method of making a compound having a structure of Formula (VIIb):

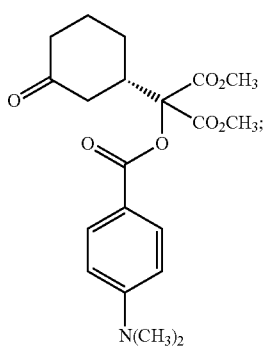
(VIIb)

comprising contacting a compound of Formula (VIII) or a salt thereof;
in presence of

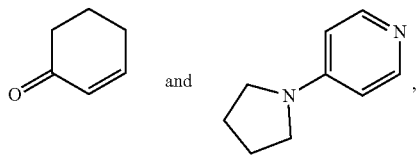 [SMILES: O=C1C=CCCC1 ; c1cc(N2CCCC2)ccn1]
and with or without aqueous KOH, in toluene;
for 24 to 48 hours and at 25 to 35° C. sufficient for reaction completion to produce the compound of Formula (VIIb).

In aspect 10A, the invention provides a method of making a compound of Formula (IX) or a stereoisomer or a salt thereof:

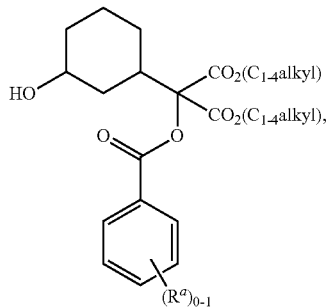
(IX)

wherein $R^a$ is —N($C_{1-4}$ alkyl)$_2$;
comprising contacting a compound of Formula (VII) or a salt thereof:

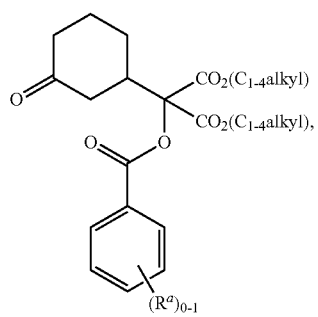
(VII)

wherein $R^a$ is —N($C_{1-4}$ alkyl)$_2$;
with a transition-metal catalyst in presence of a diprotic acid in Solvent 6 that is a protic or polar aprotic solvent or a solvent mixture thereof;
for a time and at a temperature sufficient for ketone reduction to produce the compound of Formula (IX) or a stereoisomer or a salt thereof.

In aspect 11A, within the scope of aspect 10A, the invention provides a method of making a compound of Formula (IXa) or a salt thereof:

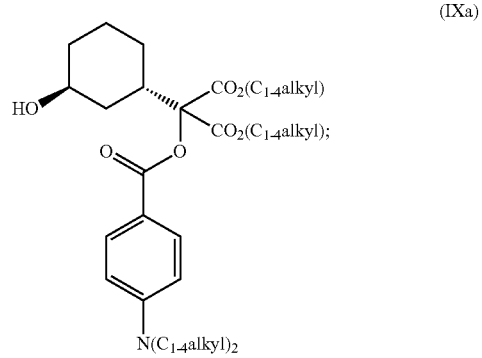
(IXa)

comprising contacting a compound of Formula (VIIa) or a salt thereof:

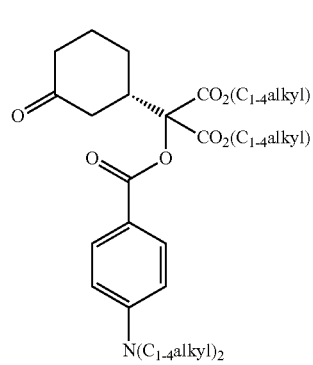
(VIIa)

with a transition-metal catalyst selected from IrCl$_4$, IrCl$_4$*hydrate or [Ir(COD)Cl]$_2$ in presence of phosphorous acid in Solvent 6 selected from IPA, MeOH, EtOH, t-AmOH, H$_2$O, NMP, DMF, DMAc, sulfolane, and a solvent mixture thereof;
for a time and at 65 to 100° C. sufficient for ketone reduction to produce the compound of Formula (IXa) or a salt thereof.

In aspect 12A, the invention provides a method of making a compound of Formula (IXb):

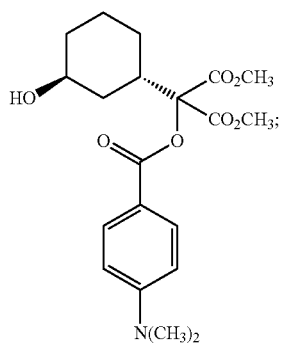
(IXb)

comprising contacting a compound of Formula (VIIb):

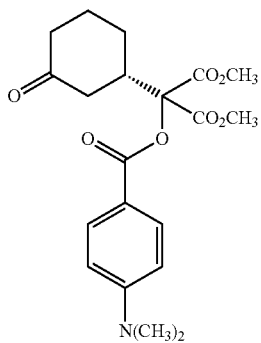
(VIIb)

with $IrCl_4$*hydrate or $[Ir(COD)Cl]_2$ in presence of phosphorous acid in IPA/$H_2O$ or a solvent mixture thereof; for 24 to 96 hours and at 80 to 85° C. sufficient for ketone reduction to produce the compound of Formula (IXb).

In aspect 13A, the invention provides a method of making a compound of Formula (Xa) or a salt thereof:

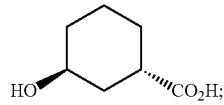
(Xa)

comprising (1) contacting a compound of Formula (IXa) or a salt thereof:

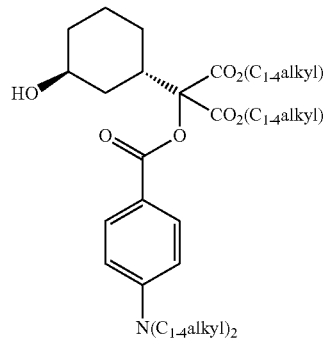
(IXa)

with Reagent 3 selected from NaOH, KOH, LiOH, tetraalkylammonium hydroxide, and a mixture thereof, in an aqueous $R^7$—OH solution, wherein $R^7$ are independently $C_{1-6}$ alkyl;

for up to 48 hours at 80 to 85° C. sufficient for hydrolysis of all three ester moieties to produce the compound of Formula (XI);

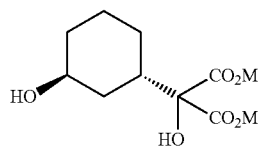
(XI)

wherein M is selected from a metal element selected from Li, Na, and K, and tetraalkylammonium;

(2) contacting an acid in a protic solvent; and (3) contacting periodic acid in a protic solvent;

for up to 48 hours at 20-25° C. sufficient for oxidation to produce the compound of Formula (Xa) or a salt thereof.

In aspect 13B, the invention provides a method of making a compound of Formula (Xa) or a salt thereof:

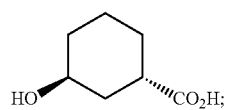
(Xa)

comprising (1) contacting a compound of Formula (XIX) or a salt thereof:

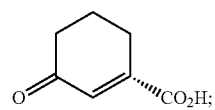
(XIX)

with an ene reductase biocatalyst in the presence of an aqueous phosphate buffer, GDH, NADPH and glucose with or without an organic cosolvent selected from DMSO, IPA, dioxane, acetone and a mixture thereof;

for a time and at a temperature sufficient to produce the compound of Formula (XX);

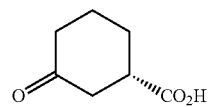
(XX)

followed by (2) addition of a keto reductase biocatalyst with or without an organic solvent selected from DMSO, IPA, dioxane, acetone and a mixture thereof;

for additional time and at a temperature sufficient to produce the compound of Formula (Xa) or a salt thereof.

In another aspect, the invention provides a method of making a compound of Formula (Xa) or a salt thereof:

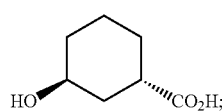
(Xa)

comprising (1) contacting a compound of Formula (XIX) or a salt thereof:

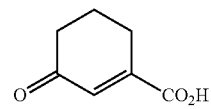
(XIX)

with an ene reductase biocatalyst selected from ERED-302, ERED-303, and ERED-211, in the presence of an aqueous phosphate buffer, GDH, NADPH and glucose with or without an organic cosolvent selected from DMSO, IPA, dioxane, acetone and a mixture thereof; for a time at 25 to 35° C. sufficient to produce the compound of Formula (XX);

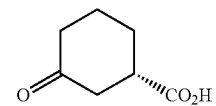
(XX)

followed by (2) addition of a keto reductase biocatalyst with or without an organic solvent selected from DMSO, IPA, dioxane, acetone and a mixture thereof; for an additional time at 25 to 35° C. sufficient to produce the compound of Formula (Xa) or a salt thereof.

In another aspect, the invention provides a method of making a compound of Formula (Xa) or a salt thereof:

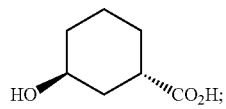
(Xa)

comprising (1) contacting a compound of Formula (XIX) or a salt thereof:

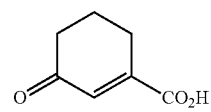
(XIX)

with an ene reductase biocatalyst selected from ERED-302, ERED-303, and ERED-211, in the presence of an aqueous phosphate buffer, GDH, NADPH and glucose with or without an organic cosolvent selected from DMSO, IPA, dioxane, acetone and a mixture thereof; for at least 14 hours at 25 to 35° C. sufficient to produce the compound of Formula (XX);

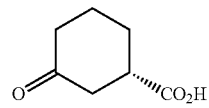
(XX)

followed by (2) addition of KRED-P2-G03 with or without an organic solvent selected from DMSO, IPA, dioxane, acetone and a mixture thereof; for at least an additional 2 hours at 25 to 35° C. sufficient to produce the compound of Formula (Xa) or a salt thereof.

In aspect 13C, the invention provides a method of making a compound of Formula (Xa) or a salt thereof:

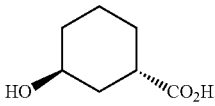
(Xa)

comprising contacting a compound of Formula (XIX) or a salt thereof:

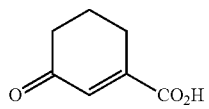
(XIX)

with a combination of an ene reductase biocatalyst with a keto reductase biocatalyst in the presence of an aqueous phosphate buffer, GDH, NADPH and glucose with or without an organic solvent selected from DMSO, IPA, dioxane, acetone and a mixture thereof; for a time and at a temperature sufficient to produce the compound of Formula (Xa) or a salt thereof.

In another aspect, the invention provides a method of making a compound of Formula (Xa) or a salt thereof:

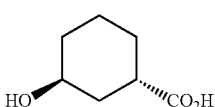
(Xa)

comprising contacting a compound of Formula (XIX) or a salt thereof:

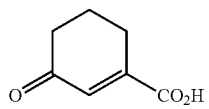
(XIX)

with a combination of an ene reductase biocatalyst selected from ERED-302, ERED-303, and ERED-211; with a keto reductase biocatalyst in the presence of an aqueous phosphate buffer, GDH, NADPH and glucose with or without an organic solvent selected from DMSO, IPA, dioxane, acetone and a mixture thereof;

for a time at 20 to 35° C. sufficient to produce the compound of Formula (Xa) or a salt thereof.

In another aspect, the invention provides a method of making a compound of Formula (Xa) or a salt thereof:

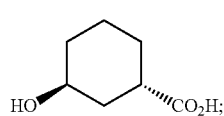

comprising contacting a compound of Formula (XIX) or a salt thereof:

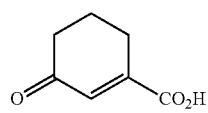

with a combination of an ene reductase biocatalyst selected from ERED-302, ERED-303, and ERED-211; with KRED-P2-G03 in the presence of an aqueous phosphate buffer, GDH, NADPH and glucose with or without an organic solvent selected from DMSO, IPA, dioxane, acetone and a mixture thereof;

for at least 14 hours at 20 to 35° C. sufficient to produce the compound of Formula (Xa) or a salt thereof.

In aspect 13D, the invention provides a method of making a compound of Formula (Xa) or a salt thereof:

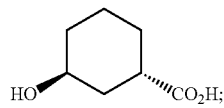

comprising (1) contacting a compound of Formula (XXI) thereof:

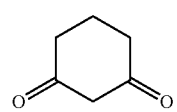

with a sulfonyl chloride reagent in an aprotic polar solvent and an inorganic or organic base;

for a time and at a temperature sufficient for O-sulfonylation to produce the compound of Formula (XXII);

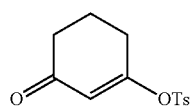

(2) either (a) contacting the compound of Formula (XXII) with a transition-metal catalyst, a phosphine ligand and an organic or inorganic base in the presence of ($C_{1-4}$ alkyl)-OH purged with carbon monoxide;

for a time, at a temperature and pressure sufficient for carbonylation to produce the compound of Formula (XXIII);

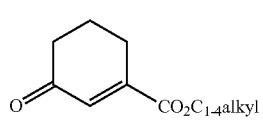

then followed by contacting a compound of Formula (XXIII) with an aqueous base to produce a compound of Formula (XIX) or a salt thereof:

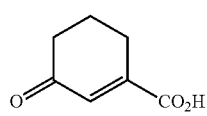

or (b) contacting the compound of Formula (XXII) with a transition-metal catalyst, a phosphine ligand in presence of an inorganic or organic base, in water and another polar aprotic solvent; purged with carbon monoxide;

for a time, at a temperature and pressure sufficient for carbonylation to produce the compound of Formula (XIX) or a salt thereof;

(3) contacting the compound of Formula (XIX) or a salt thereof with an ene reductase biocatalyst in the presence of an aqueous phosphate buffer, GDH, NADPH and glucose with or without an organic cosolvent selected from DMSO, IPA, dioxane, acetone and a mixture thereof;

for a time and at a temperature sufficient to produce the compound of Formula (XX);

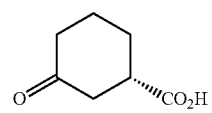

followed by (4) addition of a keto reductase biocatalyst with or without an organic solvent selected from DMSO, IPA, dioxane, acetone and a mixture thereof;

for additional time and at a temperature sufficient to produce the compound of Formula (Xa) or a salt thereof.

In aspect 13E, the invention provides a method of making a compound of Formula (Xa) or a salt thereof:

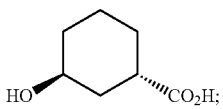

comprising (1) contacting a compound of Formula (XXI) thereof:

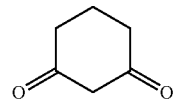
(XXI)

with p-toluenesulfonyl chloride in ethyl acetate and triethylamine;
for at least 12 hours at 0 to 10° C. sufficient for O-sulfonylation to produce the compound of Formula (XXII);

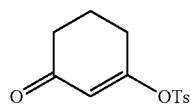
(XXII)

(2) either (a) contacting the compound of Formula (XXII) with palladium(II) acetate, 1,3-bis(diphenylphosphino)propane and N,N-diisopropylethylamine in the presence of ($C_{1-4}$ alkyl)-OH purged with carbon monoxide;
for at least 12 hours at 20 to 60° C. and a carbon monoxide pressure sufficient for carbonylation to produce the compound of Formula (XXIII);

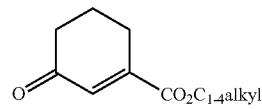
(XXIII)

then followed by contacting a compound of Formula (XXIII) with aqueous base to produce a compound of Formula (XIX) or a salt thereof:

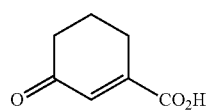
(XIX)

or (b) contacting the compound of Formula (XXII) with a transition-metal catalyst selected from Pd(OAc)$_2$, PdCl$_2$(CH$_3$CN)$_2$, and Pd(DPPP)Cl$_2$, a phosphine ligand selected from 1,3-bis(diphenylphosphino)propane, rac-BINAP, Xantphos, Josiphos SL-J001-1, Josiphos SL-J009-1-G3 palladacycle, and BIPHEP, and an inorganic or organic base selected from K$_2$CO$_3$, N,N-diisopropylethylamine, triethylamine, t-butyltetramethyl guanidine, tetramethyl guanidine, KHCO$_3$, DBU, Na$_2$CO$_3$, and KOAc, in water and a polar aprotic solvent selected from EtOAc, 2-MeTHF, CH$_3$CN, DMAc, THF, and a mixture thereof, purged with carbon monoxide;
for at least 12 hours at 20 to 60° C. and a carbon monoxide pressure sufficient for carbonylation to produce the compound of Formula (XIX) or a salt thereof;
(3) contacting the compound of Formula (XIX) or a salt thereof with an ene reductase biocatalyst selected from ERED-302, ERED-303, and ERED-211, in the presence of an aqueous phosphate buffer, GDH, NADPH and glucose with or without an organic cosolvent such as DMSO, IPA, dioxane or acetone
for a time at 20 to 35° C. sufficient to produce the compound of Formula (XX);

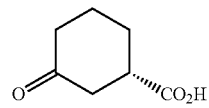
(XX)

followed by (4) addition of a keto reductase biocatalyst with or without an organic solvent selected from DMSO, IPA, dioxane, acetone and a mixture thereof;
for an additional time at 25 to 35° C. sufficient to produce the compound of Formula (Xa) or a salt thereof.

In aspect 13F, the invention provides a method of making a compound of Formula (Xa) or a salt thereof:

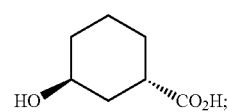
(Xa)

comprising (1) contacting a compound of Formula (XXI) thereof:

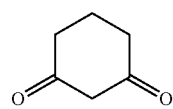
(XXI)

with a sulfonyl chloride reagent in an aprotic polar solvent and an inorganic or organic base;
for a time and at a temperature sufficient for O-sulfonylation to produce the compound of Formula (XXII);

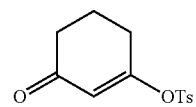
(XXII)

(2) either (a) contacting the compound of Formula (XXII) with a transition-metal catalyst, a phosphine ligand and an organic amine base in the presence of ($C_{1-4}$ alkyl)-OH purged with carbon monoxide;
for a time, at a temperature and pressure sufficient for carbonylation to produce the compound of Formula (XXIII);

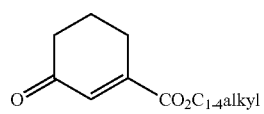
(XXIII)

then followed by contacting a compound of Formula (XXIII) with an aqueous base to produce a compound of Formula (XIX) or a salt thereof:

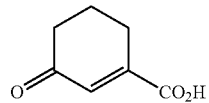

(XIX)

or (b) contacting the compound of Formula (XXII) with a transition-metal catalyst, a phosphine ligand in presence of an inorganic or organic base, in water and another polar aprotic solvent; purged with carbon monoxide;

for a time and at a temperature and carbon monoxide pressure sufficient for carbonylation to produce the compound of Formula (XIX) or a salt thereof;

(3) contacting a compound of Formula (XIX) or a salt thereof, with a combination of an ene reductase biocatalyst with a keto reductase biocatalyst in the presence of an aqueous phosphate buffer, GDH, NADPH and glucose with or without an organic solvent selected from DMSO, IPA, dioxane, acetone and a mixture thereof;

for a time and at a temperature sufficient to produce the compound of Formula (Xa) or a salt thereof.

In aspect 13G, the invention provides a method of making a compound of Formula (Xa) or a salt thereof:

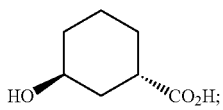

(Xa)

comprising (1) contacting a compound of Formula (XXI) thereof:

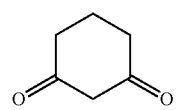

(XXI)

with p-toluenesulfonyl chloride in ethyl acetate and triethylamine;

for at least 12 hours at 0 to 10° C. sufficient for O-sulfonylation to produce the compound of Formula (XXII);

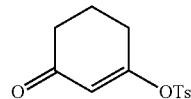

(XXII)

(2) either (a) contacting the compound of Formula (XXII) with palladium(II) acetate, 1,3-bis(diphenylphosphino) propane and N,N-diisopropylethylamine in the presence of ($C_{1-4}$ alkyl)-OH purged with carbon monoxide;

for at least 12 hours at 20 to 60° C. and a carbon monoxide pressure sufficient for carbonylation to produce the compound of Formula (XXIII);

(XXIII)

then followed by contacting a compound of Formula (XXIII) with aqueous base to produce a compound of Formula (XIX) or a salt thereof:

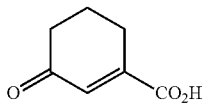

(XIX)

or (b) contacting the compound of Formula (XXII) with a transition-metal catalyst selected from Pd(OAc)$_2$, PdCl$_2$(CH$_3$CN)$_2$, and Pd(DPPP)Cl$_2$, a phosphine ligand selected from 1,3-bis(diphenylphosphino)propane, rac-BINAP, Xantphos, Josiphos SL-J001-1, Josiphos SL-J009-1-G3 palladacycle, and BIPHEP, and an inorganic or organic base selected from K$_2$CO$_3$, diisopropylethylamine, triethylamine, t-butyltetramethyl guanidine, tetramethyl guanidine, KHCO$_3$, DBU, Na$_2$CO$_3$, and KOAc, in water and a polar aprotic solvent selected from EtOAc, 2-MeTHF, CH$_3$CN, DMAc, THF, and a mixture thereof; purged with carbon monoxide;

for at least hours at 20 to 60° C. and a carbon monoxide pressure sufficient for carbonylation to produce the compound of Formula (XIX) or a salt thereof;

(3) contacting the compound of Formula (XIX) or a salt thereof, with a combination of an ene reductase biocatalyst selected from ERED-302, ERED-303, and ERED-211; with KRED-P2-G03 in the presence of an aqueous phosphate buffer, GDH, NADPH and glucose with or without an organic solvent selected from DMSO, IPA, dioxane, acetone and a mixture thereof;

for at least 14 hours at 20 to 35° C. sufficient to produce the compound of Formula (Xa) or a salt thereof.

In aspect 14A, the invention provides a method of making the compound of Formula (Xa):

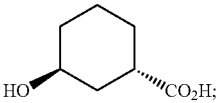

(Xa)

comprising (1) contacting a compound of Formula (IXb) or a salt thereof:

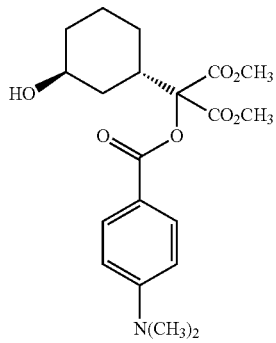

(IXb)

with NaOH in an aqueous IPA solution for at least 12 hours at 80 to 85° C. sufficient to produce the compound of Formula (XIa);

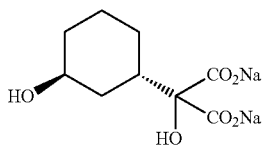

(XIa)

(2) contacting aqueous HCl; and
(3) contacting periodic acid in an aqueous IPA solution; for up to 48 hours at 20-25° C. sufficient for oxidation to produce the compound of Formula (Xa).

In aspect 15A, the invention provides a method of making a compound of Formula (XII) or a stereoisomer or a salt thereof:

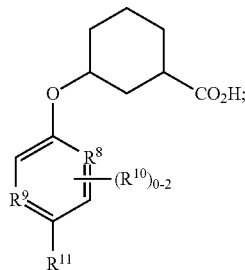

(XII)

wherein: $R^8$ and $R^9$ are independently N, CH or C($C_{1-6}$ alkyl);
$R^{10}$ is independently $C_{1-4}$ alkyl or halogen; and
$R^{11}$ is independently Br, Cl or I;
comprising contacting a compound of Formula (XIII) or a salt thereof:

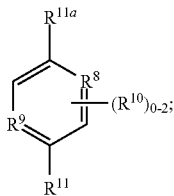

(XIII)

wherein: $R^1$, $R^9$, $R^{10}$ and $R^{11}$ are the same as above in the Formula (XII) and $R^{11a}$ is halogen;
with the compound of Formula (X) or a stereoisomer or a salt thereof:

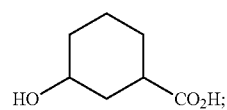

(X)

in presence of a metal alkoxide in Solvent 7 that is a polar aprotic or nonpolar solvent, or a solvent mixture thereof;
for a time and at a temperature sufficient for reaction completion to produce the compound of Formula (XII) or a stereoisomer or a salt thereof.

In aspect 16A, within the scope of aspect 15A, the invention provides a method of making a compound of Formula (XIIa) or a salt thereof:

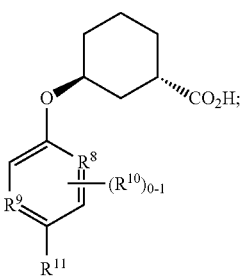

(XIIa)

comprising contacting a compound of Formula (XIIIa) or a salt thereof:

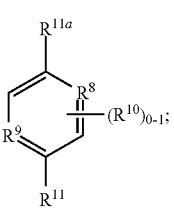

(XIIIa)

with the compound of Formula (Xa) or a salt thereof:

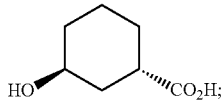
(Xa)

in presence of a metal alkoxide selected from KOtBu, KHMDS, NaHMDS, and potassium amylate; in Solvent 7 selected from DMF, MTBE, DMAc, NMP, DMPU, THF, 2-MeTHF, CPME, diisopropyl ether, toluene and a solvent mixture thereof;

for a time and at 20 to 35° C. sufficient for reaction completion to produce the compound of Formula (XIIa) or a salt thereof.

In aspect 17A, the invention provides a method of making a compound of Formula (XIIb) or a salt thereof:

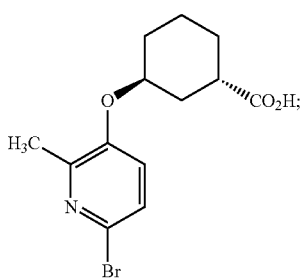
(XIIb)

comprising contacting a compound of Formula (XIIIb) or a salt thereof:

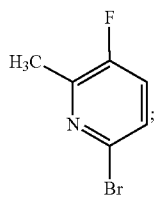
(XIIIb)

with the compound of Formula (Xa) or a salt thereof:

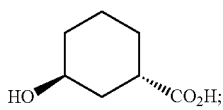
(Xa)

in presence of KOtBu in a DMF/MTBE mixture;

for 18 to >48 hours and at 20 to 35° C. sufficient for fluoride displacement to produce the compound of Formula (XIIb) or a salt thereof.

In aspect 18A, the invention provides a method of making a compound of Formula (XIVc) or a stereoisomer or a salt thereof:

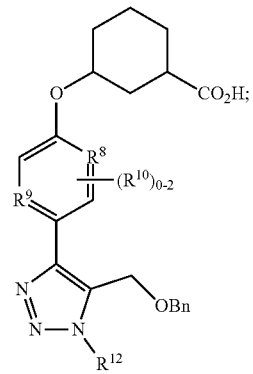
(XIVc)

wherein: $R^8$ and $R^9$ are independently N, CH or $C(C_{1-6}$ alkyl);
$R^{10}$ is independently $C_{1-4}$ alkyl or halogen; and
$R^{12}$ is $C_{1-4}$ alkyl;
comprising (1) contacting a compound of Formula (I):

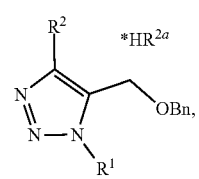
(I)

wherein $R^1$ is $C_{1-6}$ alkyl; and $R^2$ and $R^{2a}$ are halogen;
with an organometallic reagent and with or without an inorganic reagent in Solvent 8 that is a polar aprotic, or nonpolar solvent, or a solvent mixture thereof;
for a time and at a temperature sufficient for metal-halogen exchange; then
(2) contacting a compound of Formula (XII) or a stereoisomer or a salt:

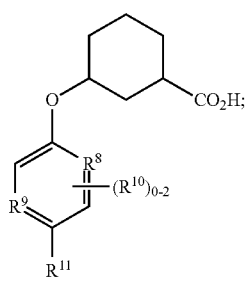
(XII)

wherein: $R^8$ and $R^9$ are independently N, CH or $C(C_{1-6}$ alkyl);
$R^{10}$ is independently $C_{1-4}$ alkyl or halogen; and
$R^{11}$ is Br or Cl;
with the metal-halogen exchanged product and a Palladium catalyst in Solvent 8;
for a time and at a temperature sufficient for C—C coupling; and
(3) contacting a metal binding agent in Solvent 8;
for a time and at a temperature sufficient for reaction quench to produce the compound of Formula (XIVc) or a stereoisomer or a salt thereof.

In aspect 19A, within the scope of aspect 18A, the invention provides a method of making a compound of Formula (XIVd) or a salt thereof:

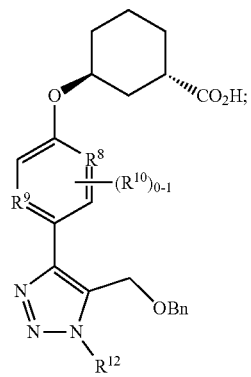

(XIVd)

wherein: $R^8$ and $R^9$ are independently N, CH or C($C_{1-4}$ alkyl);
$R^{10}$ is independently $C_{1-4}$ alkyl or halogen; and
$R^{12}$ is $C_{1-4}$ alkyl;
comprising (1) contacting a compound of Formula (I),
with the organometallic reagent that is a Grignard reagent selected from i-PrMgCl, i-PrMgCl*LiCl, and i-PrMgBr or an organolithium reagent selected from methyllithium, n-butyllithium, iso-propyllithium, sec-butyllithium, tert-butyllithium, and phenyllithium; with or without an inorganic reagent selected from $ZnCl_2$, $ZnBr_2$, and $ZnI_2$ in Solvent 8 selected from THF, 2-MeTHF, DMF, DMA, DMPU, NMP, 1,4-dioxane and a solvent mixture thereof;
for a time and at −5 to 25° C. sufficient for metal-halogen exchange and organozinc formation;
(2) contacting a compound of Formula (XIIa) or a salt:

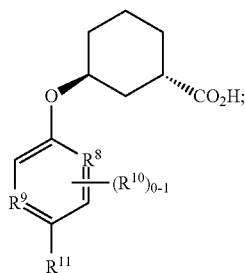

(XIIa)

with the metal-halogen exchanged product that is organometallic reagent and a Palladium catalyst selected from $PdCl_2$(Xantphos), Pd(dppf)$Cl_2$ or Pd(OAc)$_2$+Brettphos, BINAP, dppf, DPEPhos and xantphos in Solvent 8;
for a time and at −5 to 40° C. sufficient for C—C coupling; and
(3) contacting a metal binding agent selected from tribasic sodium ethylenediaminetetraacetic acid or dibasic sodium ethylenediaminetetraacetic acid in Solvent 8;
for a time and at −5 to 25° C. sufficient for reaction quench to produce the compound of Formula (XIVd) or a salt thereof.

In another aspect, within the scope of aspect 18A, the invention provides a method of making a compound of Formula (XIVd) or a salt thereof,
comprising (1) contacting a compound of Formula (I),
with the organometallic reagent that is a Grignard reagent selected from i-PrMgCl (2.15 M in THF), i-PrMgCl*LiCl (1.3 M in THF), and i-PrMgBr (2.9 M in 2-MeTHF) or an organolithium reagent selected from methyllithium, n-butyllithium, iso-propyllithium, sec-butyllithium, tert-butyllithium, and phenyllithium; with or without an inorganic reagent selected from $ZnCl_2$, $ZnBr_2$, and $ZnI_2$ in Solvent 8 selected from THF, 2-MeTHF, DMF, DMA, DMPU, NMP, 1,4-dioxane and a solvent mixture thereof;
for a time and at −5 to 25° C. sufficient for metal-halogen exchange and organozinc formation;
(2) contacting a compound of Formula (XIIa) or a salt:

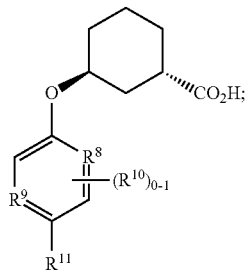

(XIIa)

with the metal-halogen exchanged product that is organometallic reagent and a Palladium catalyst selected from $PdCl_2$(Xantphos), Pd(dppf)$Cl_2$ or Pd(OAc)$_2$+Brettphos, BINAP, dppf, DPEPhos and xantphos in Solvent 8;
for a time and at −5 to 40° C. sufficient for C—C coupling; and
(3) contacting a metal binding agent selected from tribasic sodium ethylenediaminetetraacetic acid or dibasic sodium ethylenediaminetetraacetic acid in Solvent 8;
for a time and at −5 to 25° C. sufficient for reaction quench to produce the compound of Formula (XIVd) or a salt thereof.

In aspect 20A, the invention provides a method of making a compound of Formula (XIVe), isolated as either the free acid or a salt thereof selected from potassium, tetramethylammonium, tert-butylamine, dicyclohexylamine and tromethamine salt:

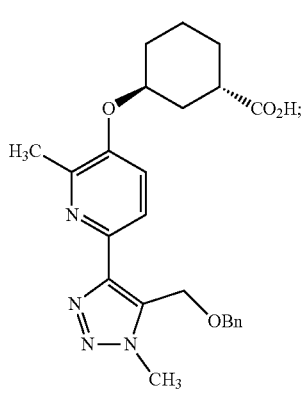

(XIVe)

comprising (1) contacting a compound of Formula (Ia):

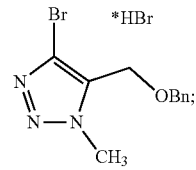

with i-PrMgCl (2.15 M in THF), with or without ZnCl$_2$, in THF;
for a time and at −5 to 25° C. sufficient for metal-halogen exchange and organozinc formation (if ZnCl$_2$ present);
(2) contacting a compound of Formula (XIIb) or a salt thereof:

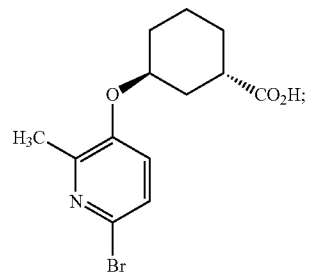

with i-PrMgCl (2.15 M in THF), with or without ZnCl$_2$, the organomagnesium (or organozinc) Reagent and PdCl$_2$(Xantphos) in THF;
for >12 hours and at −5 to 40° C. sufficient for C—C coupling; and
(3) sequentially contacting tribasic sodium ethylenediaminetetraacetic acid or dibasic sodium ethylenediaminetetraacetic acid in the THF solvent mixture, with or without sodium percarbonate and sodium bisulfite (or sodium metabisulfite);
for >1 hour and at −5 to 25° C. sufficient for reaction quench to produce the compound of Formula (XIVe), then isolated as either the free acid or a salt thereof selected from potassium, tetramethylammonium, tert-butylamine, dicyclohexylamine and tromethamine salt.

In aspect 20B, the invention provides a method of making a compound of Formula (XIVe), isolated as either the free acid or a salt thereof selected from potassium, tetramethylammonium, tert-butylamine, dicyclohexylamine and tromethamine salt:

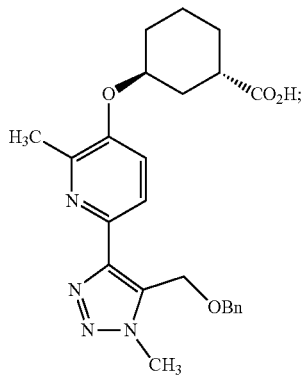

comprising (1) contacting a compound of Formula (Ia):

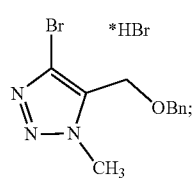

with i-PrMgCl (2.15 M in THF) in THF;
for a time and at −5 to 25° C. sufficient for metal-halogen exchange and;
(2) contacting a compound of Formula (XIIb) or a salt thereof.

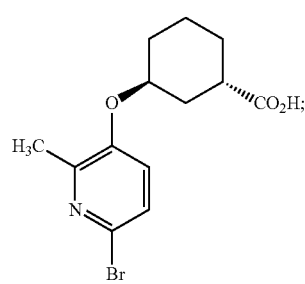

with i-PrMgCl (2.15 M in THE), ZnCl$_2$, the Organomagnesium Reagent and PdCl$_2$(Xantphos) in THF;
for >12 hours and at −5 to 40° C. sufficient for C—C coupling; and
(3) sequentially contacting tribasic sodium ethylenediaminetetraacetic acid or dibasic sodium ethylenediaminetetraacetic acid in the THF solvent mixture, sodium percarbonate and sodium bisulfite (or sodium metabisulfite);
for >1 hour and at −5 to 25° C. sufficient for reaction quench to produce the compound of Formula (XIVe), then isolated as either the free acid or a salt thereof selected from potassium, tetramethylammonium, tert-butylamine, dicyclohexylamine and tromethamine salt.

In another aspect, the invention provides a method of making a compound of Formula (XIVe), isolated as either the free acid or a salt thereof selected from potassium, tetramethylammonium, tert-butylamine, dicyclohexylamine and tromethamine salt:

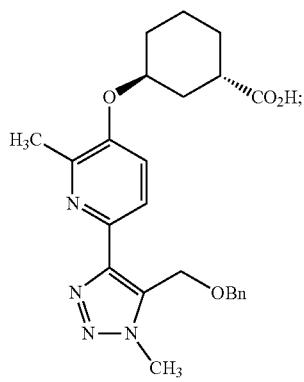

(XIVe)

comprising (1) contacting a compound of Formula (Ia):

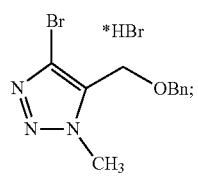

(Ia)

with i-PrMgCl (2.15 M in THF) and ZnCl$_2$ in THF;
for a time and at −5 to 25° C. sufficient for metal-halogen exchange and organozinc formation;
(2) contacting a compound of Formula (XIIb) or a salt thereof:

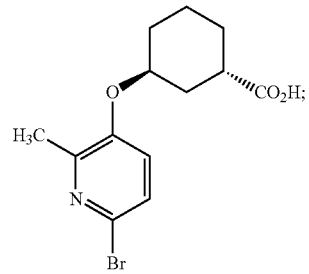

(XIIb)

with i-PrMgCl (2.15 M in THF), the Organozinc Reagent and PdCl$_2$(Xantphos) in THF;
for >12 hours and at −5 to 40° C. sufficient for C—C coupling; and
(3) contacting tribasic sodium ethylenediaminetetraacetic acid in the THF solvent mixture;
for 1 hour and at −5 to 25° C. sufficient for reaction quench to produce the compound of Formula (XIVe), then isolated as either the free acid or a salt thereof selected from potassium, tetramethylammonium, tert-butylamine, dicyclohexylamine and tromethamine salt.

In aspect 21A, the invention provides a method of making a compound of Formula (XV) or a stereoisomer or a salt thereof:

(XV)

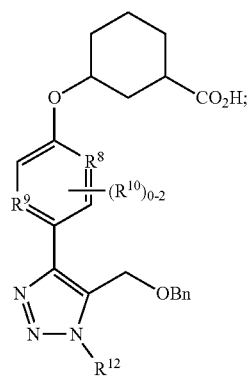

wherein: $R^8$ and $R^9$ are independently N, CH or C(C$_{1-6}$ alkyl);
$R^{10}$ is independently C$_{1-4}$ alkyl or halogen; and
$R^{12}$ is C$_{1-4}$ alkyl;
comprising contacting a compound of Formula (XIVc) or a stereoisomer or a salt thereof:

(XIVc)

with a transition-metal catalyst and with or without an inorganic or organic acid in Solvent 9 that is a polar protic or polar aprotic solvent, or a solvent mixture thereof;

for a time and at a temperature sufficient for hydrogenolysis to produce the compound of Formula (XV) or a stereoisomer or a salt thereof.

In aspect 22A, within the scope of aspect 21A, the invention provides a method of making a compound of Formula (XVa) or a salt thereof:

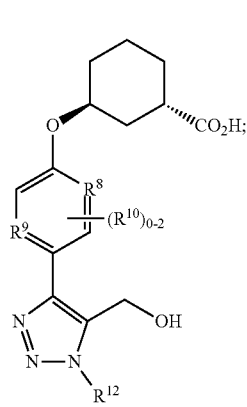

(XVa)

wherein: $R^8$ and $R^9$ are independently N, CH or C($C_{1-4}$ alkyl);

$R^{10}$ is independently $C_{1-4}$ alkyl or halogen; and $R^{12}$ is $C_{1-4}$ alkyl;

comprising contacting a compound of Formula (XIVd) or a salt thereof:

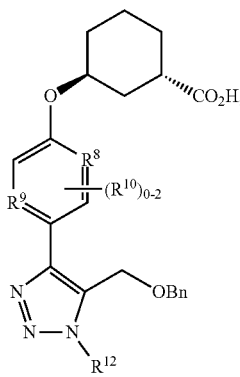

(XIVd)

with a transition-metal catalyst selected from 5-20 wt % Pd/C, with or without an inorganic or organic acid selected from citric acid, oxalic acid, $H_2SO_4$ in Solvent 9 selected from EtOH, MeOH, water, THF, DMAc, NMP, IPA, t-AmOH, MeTHF, DMF, $CH_3CN$, EtOAc, IPOAc and a solvent mixture thereof;

for a time and at 20 to 60° C. sufficient for hydrogenolysis to produce the compound of Formula (XVa) or a salt thereof.

In another aspect, within the scope of aspect 21A, the invention provides a method of making a compound of Formula (XVa) or a salt thereof:

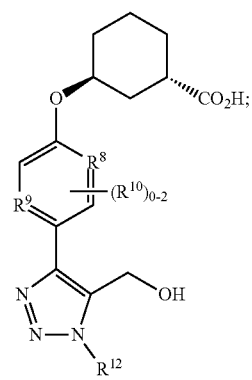

(XVa)

wherein: $R^8$ and $R^9$ are independently N, CH or C($C_{1-4}$ alkyl);

$R^{10}$ is independently $C_{1-4}$ alkyl or halogen; and $R^{12}$ is $C_{1-4}$ alkyl;

comprising contacting a compound of Formula (XIVd) or a salt thereof:

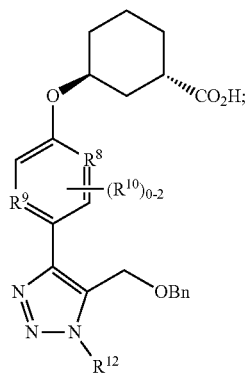

(XIVd)

with a transition-metal catalyst selected from 5-20 wt % Pd/C, with or without an inorganic or organic acid selected from citric acid, oxalic acid, $H_2SO_4$ in Solvent 9 selected from EtOH, MeOH, THF, DMAc, NMP, IPA, t-AmOH, MeTHF, MeTHF, DMF, $CH_3CN$, EtOAc, IPOAc and a solvent mixture thereof;

for a time and at 20 to 60° C. sufficient for hydrogenolysis to produce the compound of Formula (XVa) or a salt thereof.

In aspect 23A, the invention provides a method of making a compound of Formula (XVb):

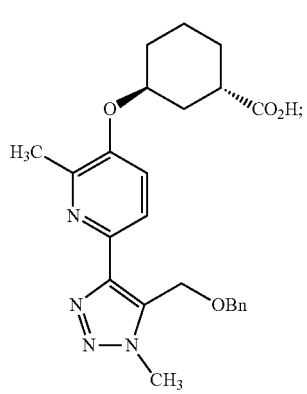
(XVb)

comprising contacting a compound of Formula (XIVe) or a salt thereof:

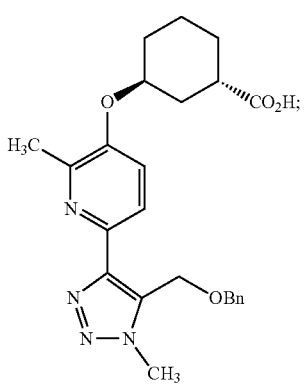
(XIVe)

with 10 wt % Pd/C and with or without citric acid in Solvent 9 selected from EtOH, MeOH, water, THF, DMAc, NMP, and a solvent mixture thereof;

for >12 hours and at 20 to 60° C. sufficient for hydrogenolysis to produce the compound of Formula (XVb).

In another aspect, the invention provides a method of making a compound of Formula (XVb):

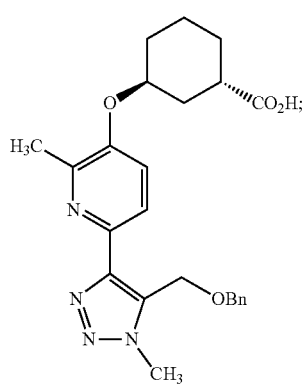
(XVb)

comprising contacting a compound of Formula (XIVf):

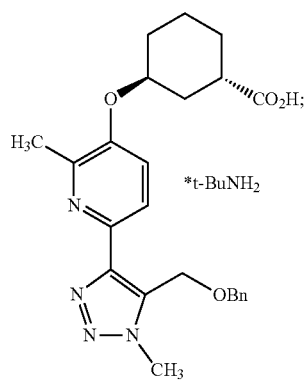
(XIVf)

with 10 wt % Pd/C and citric acid in Solvent 9 selected from EtOH, MeOH, THF, DMAc, NMP, and a solvent mixture thereof;

for >12 hours and at 20 to 60° C. sufficient for hydrogenolysis to produce the compound of Formula (XVb).

In aspect 24A, the invention provides a method of making a compound of Formula (XVI) or a stereoisomer or a salt thereof:

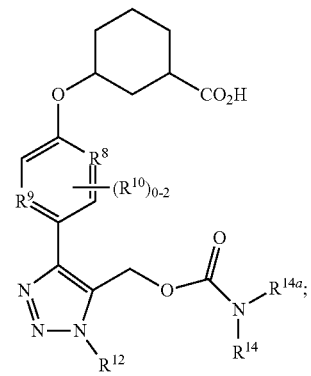
(XVI)

wherein: $R^8$ and $R^9$ are independently N, CH or C($C_{1-6}$ alkyl);

$R^{10}$ is independently $C_{1-4}$ alkyl or halogen;

$R^{12}$ is $C_{1-4}$ alkyl; and $R^{14}$ and $R^{14a}$ are independently $C_{1-6}$ alkyl;

comprising contacting a compound of Formula (XV) or a stereoisomer or a salt thereof:

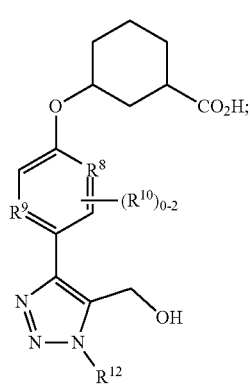
(XV)

with a compound of Formula (XVII) or a salt thereof:

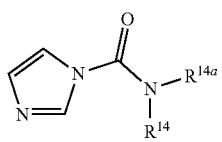
(XVII)

wherein $R^{14}$ and $R^{14a}$ are independently $C_{1-6}$ alkyl;

in presence of a metal alkoxide in Solvent 9 that is a polar protic or polar aprotic solvent, or a solvent mixture thereof;

for a time and at a temperature sufficient for carbamate formation to produce the compound of Formula (XVI) or a stereoisomer or a salt thereof.

In aspect 25A, within the scope of aspect 24A, the invention provides a method of making a compound of Formula (XVIa) or a salt thereof:

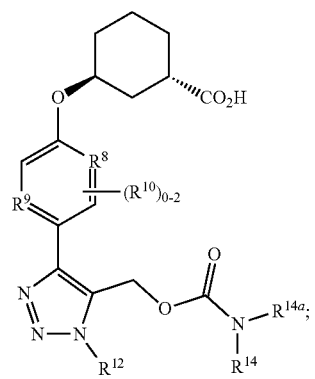
(XVIa)

wherein: $R^8$ and $R^9$ are independently N, CH or C($C_{1-4}$ alkyl);

$R^{10}$ is independently $C_{1-4}$ alkyl or halogen;

$R^{12}$ is $C_{1-4}$ alkyl; and $R^{14}$ and $R^{14a}$ are independently $C_{1-4}$ alkyl;

comprising contacting a compound of Formula (XVa) or a salt thereof:

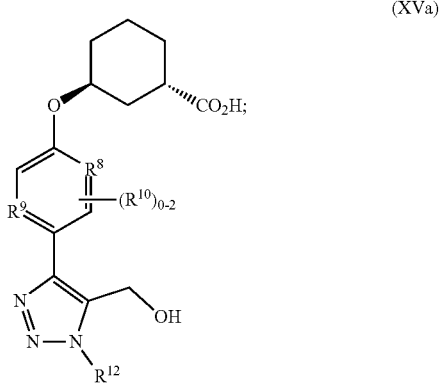
(XVa)

with a compound of Formula (XVII) or a salt thereof:

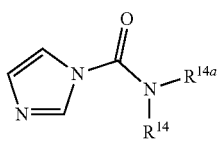
(XVII)

in presence of a metal alkoxide selected from KOtBu (20 wt % in THF) or KOtBu (1 M in THF) in Solvent 9 selected from t-AmOH, DMF, THF, $CH_3CN$, MEK, NMP, DMAc, acetone, MIBK, 2-MeTHF and a solvent mixture thereof;

for a time and at 20-75° C. sufficient for carbamate formation to produce the compound of Formula (XVIa) or a salt thereof.

In aspect 26A, the invention provides a method of making a compound of Formula (XVIb) or salt thereof:

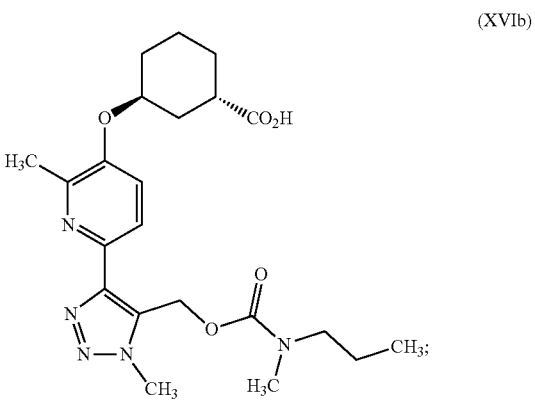 [SMILES: CCCN(C)C(=O)OCc1c(-c2ccc(O[C@H]3CCC[C@H](C(=O)O)C3)c(C)n2)nnn1C]
(XVIb)

comprising contacting a compound of Formula (XVb) or a salt thereof:

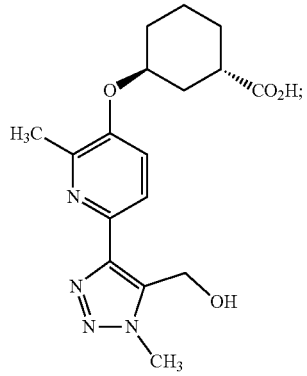

(XVb)

with a compound of Formula (XVIIa) or a salt thereof:

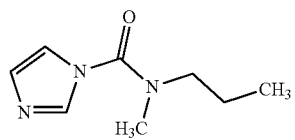

(XVIIa)

in presence of KOtBu (20 wt % in THF) in Solvent 9 selected from t-AmOH, DMF, THF, CH₃CN, MEK and a solvent mixture thereof;

for a time and at 20-75° C. sufficient for carbamate formation to produce the compound of Formula (XVIb) or a salt thereof.

In aspect 26B, the invention provides a method of making a compound of Formula (XVIb) or salt thereof:

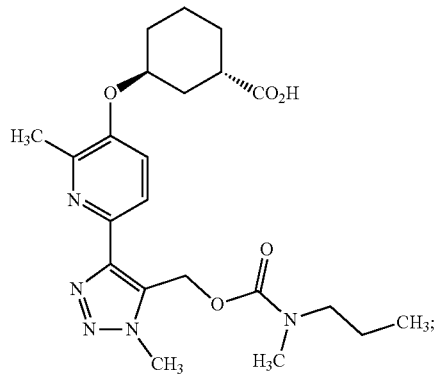

(XVIb)

comprising contacting a compound of Formula (XVb) or a salt thereof:

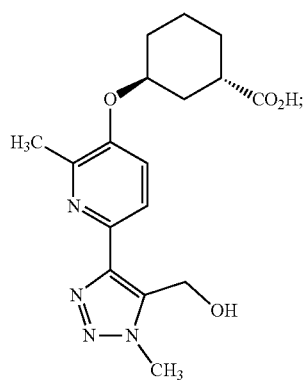

(XVb)

with a compound of Formula (XVIIa):

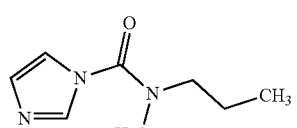

(XVIIa)

*oxalic acid in presence of KOtBu (20 wt % in THF) in Solvent 9 selected from t-AmOH, DMF, THF, CH₃CN, MEK and a solvent mixture thereof;

for a time and at 20-75° C. sufficient for carbamate formation to produce the compound of Formula (XVIb) or a salt thereof.

In aspect 27A, the invention provides a compound of Formula (Ib) or a salt thereof:

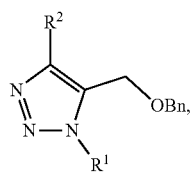

(Ib)

wherein $R^1$ is $C_{1-6}$ alkyl; and $R^2$ is halogen.

In aspect 28A, the invention provides a compound of Formula (Ic) or a salt thereof:

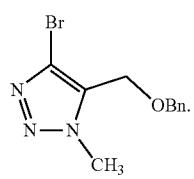

(Ic)

In aspect 29A, the invention provides a compound of Formula (IV) or a salt thereof:

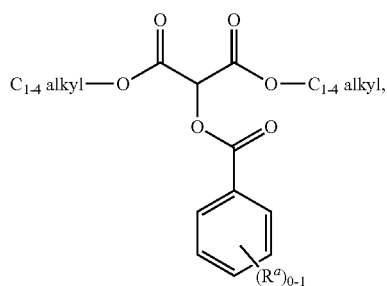

(IV)

wherein $R^a$ is —$N(C_{1-4}$ alkyl$)_2$.

In aspect 30A, the invention provides a compound of Formula (IVa) or a salt thereof:

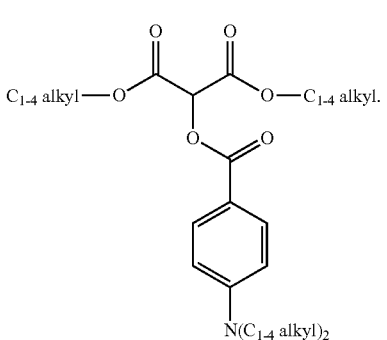

(IVa)

In aspect 31A, the invention provides a compound of Formula (IVb) or a salt thereof:

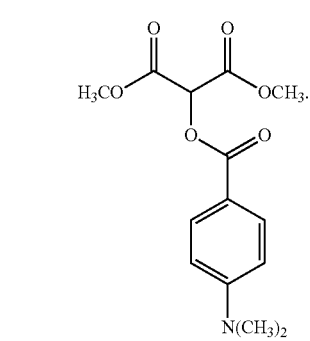

(IVb)

In aspect 32A, the invention provides a compound of Formula (VII) or a stereoisomer or a salt thereof:

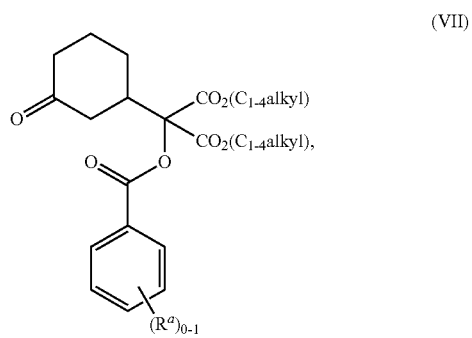

(VII)

wherein $R^a$ is —$N(C_{1-4}$ alkyl$)_2$.

In aspect 33A, the invention provides a compound of Formula (VIIa) or a salt thereof:

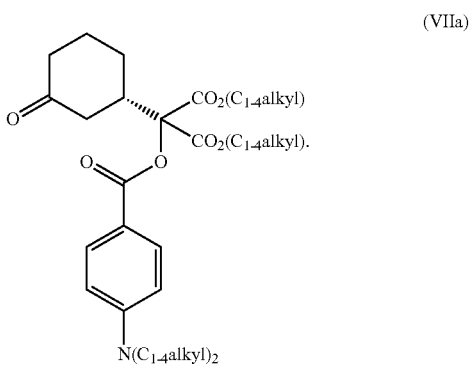

(VIIa)

In aspect 34A, the invention provides a compound of Formula (VIIb) or a salt thereof:

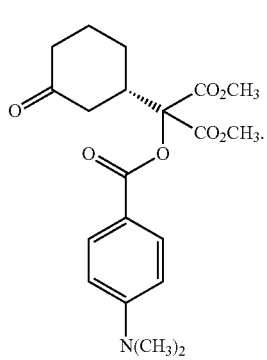

(VIIb)

In aspect 35A, the invention provides a compound of Formula (IX) or a stereoisomer or a salt thereof:

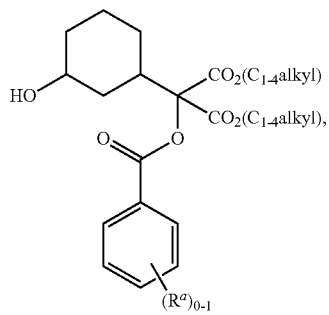

(IX)

wherein $R^a$ is —N(C$_{1-4}$ alkyl)$_2$.

In aspect 36A, the invention provides a compound of Formula (IXa) or a salt thereof:

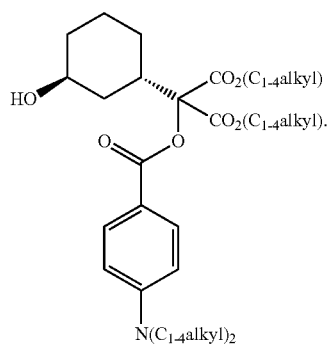

(IXa)

In aspect 37A, the invention provides a compound of Formula (IXb) thereof:

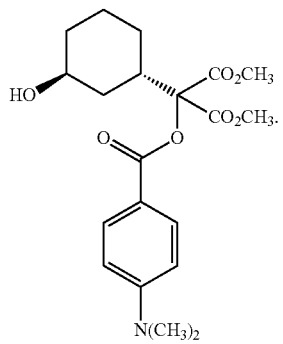

(IXb)

In aspect 38A, the invention provides a compound of Formula (XII) or a stereoisomer or a salt thereof:

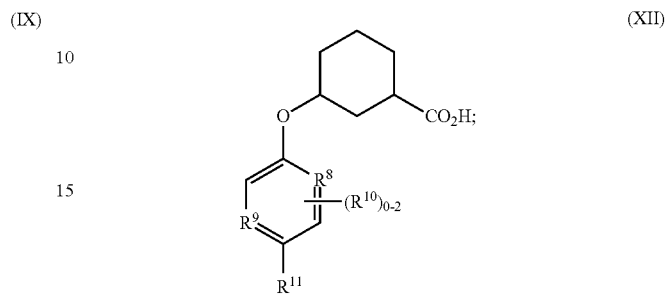

(XII)

wherein: $R^8$ and $R^9$ are independently N, CH or C(C$_{1-6}$ alkyl);
$R^{10}$ is independently C$_{1-4}$ alkyl or halogen; and
$R^{11}$ is independently Br, Cl or I.

In aspect 39A, within the scope of aspect 38A, the invention provides a compound of Formula (XIIa) or a salt thereof:

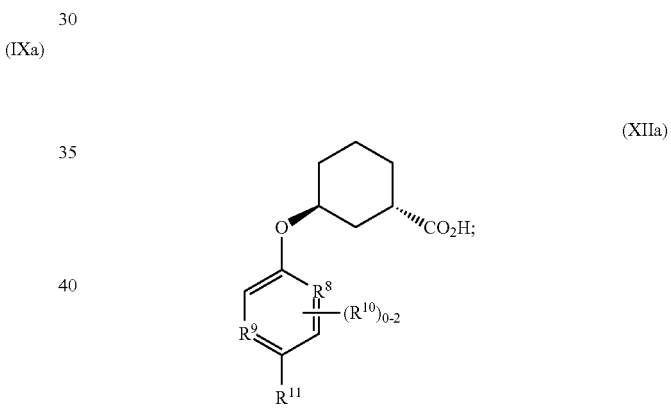

(XIIa)

wherein: $R^8$ and $R^9$ are independently N, CH or C(C$_{1-4}$ alkyl);
$R^{10}$ is independently C$_{1-4}$ alkyl or halogen; and
$R^{11}$ is independently Br, Cl or I.

In aspect 40A, the invention provides a compound of Formula (XIIb) or a salt thereof:

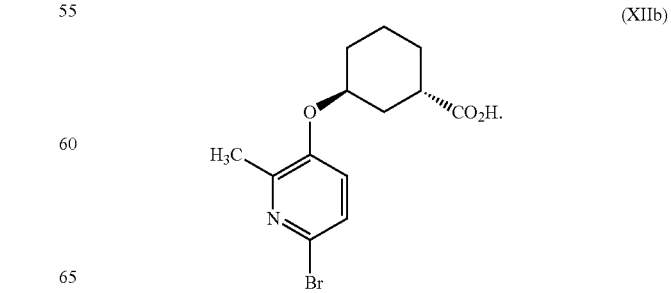

(XIIb)

In aspect 41A, the invention provides a compound of Formula (XIV) or a stereoisomer or a salt thereof:

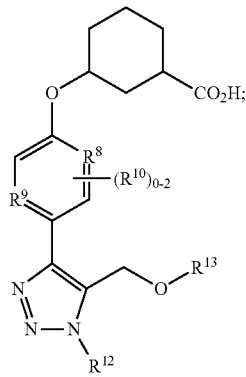

(XIV)

wherein: $R^8$ and $R^9$ are independently N, CH or C($C_{1-6}$ alkyl);
$R^{10}$ is independently $C_{1-4}$ alkyl or halogen;
$R^{12}$ is $C_{1-4}$ alkyl; and
$R^{13}$ is independently H, $C_{1-4}$ alkyl or benzyl.

In aspect 42A, within the scope of aspect 41A, the invention provides a compound of Formula (XIVa) or a salt thereof:

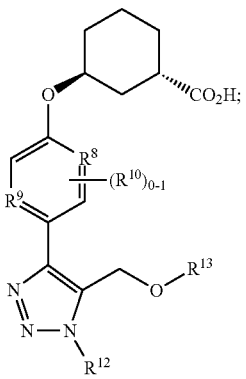

(XIVa)

wherein: $R^8$ and $R^9$ are independently N, CH or C($C_{1-4}$ alkyl);
$R^{10}$ is independently $C_{1-4}$ alkyl or halogen;
$R^{12}$ is $C_{1-4}$ alkyl; and
$R^{13}$ is independently H, $C_{1-4}$ alkyl or benzyl.

In aspect 43A, the invention provides a compound of Formula (XIVb) or a salt thereof:

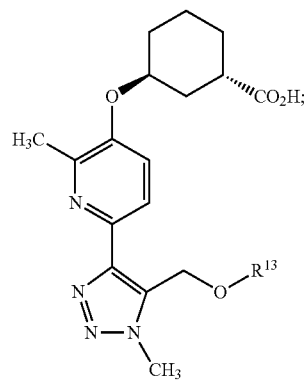

(XIVb)

wherein: $R^{13}$ is independently H or benzyl.

In aspect 44A, the invention provides a compound of Formula (XVIIa):

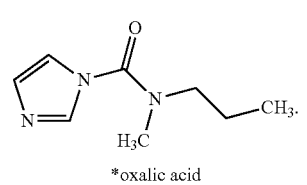

(XVIIa)

*oxalic acid

In aspect 45A, the invention provides a method of making a compound of Formula (XVII) or a salt thereof:

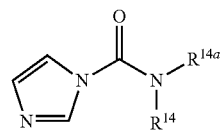

(XVII)

wherein $R^{14}$ and $R^{14a}$ are independently $C_{1-6}$ alkyl;
comprising contacting a compound of Formula (XVIII):

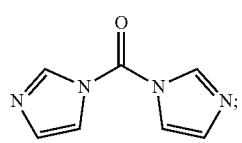

(XVIII)

with $NHR^{14}R^{14a}$ in presence of Solvent 10 that is a polar protic, aprotic, or nonpolar solvent or a solvent mixture thereof;
for a time and at −5 to 25° C. sufficient for carboxamide formation to produce the compound of Formula (XVII).

In aspect 46A, the invention provides a method of making a compound of Formula (XVIIa):

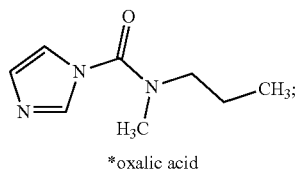

(XVIIa)

*oxalic acid comprising contacting a compound of Formula (XVIII):

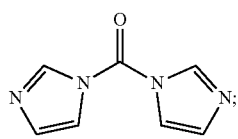

(XVIII)

with N-methylpropylamine, in presence of Solvent 10 selected from DCM, t-AmOH, water, MTBE, acetonitrile, THF, MeTHF, acetone, MEK, MIBK, MeOAc, EtOAc, IPAc, DMF, NMP, DMAc, and a solvent mixture thereof;
for at least 1 hour and at −5 to 25° C. sufficient for carboxamide formation;
followed by adding $(HO_2C)_2$ to produce the compound of Formula (XVIIa).

In aspect 47A, the invention provides a method of making a compound of Formula (XVIIa);
comprising contacting a compound of Formula (XVIII);
with N-methylpropylamine in presence of Solvent 10 selected from DCM, t-AmOH, water, MTBE, acetonitrile, and a solvent mixture thereof;
for at least 1 hour and at −5 to 25° C. sufficient for carboxamide formation;
followed by adding $(HO_2C)_2$ to produce the compound of Formula (XVIIa).

In aspect 48A, the invention provides a method of making a compound of Formula (XVI) or a stereoisomer or a salt thereof,
comprising the step of aspect 21A;
then the step of aspect 24A;
wherein all formulae and variables are as defined as in aspects 21A and 24A.

In aspect 49A, the invention provides a method of making a compound of Formula (XVIa) or a stereoisomer or a salt thereof,
comprising the step of aspect 22A;
then the step of aspect 25A;
wherein all formulae and variables are as defined as in aspects 22A and 25A.

In aspect 50A, the invention provides a method of making a compound of Formula (XVIb) or a stereoisomer or a salt thereof,
comprising the step of aspect 23A;
then the step of aspect 26A;
wherein all formulae and variables are as defined as in aspects 23A and 26A.

In aspect 51A, the invention provides a method of making a compound of Formula (XVI) or a stereoisomer or a salt thereof,
comprising steps (1), (2) and (3) of aspects 18A;
the step of aspect 21A;
then the step of aspect 24A;
wherein all formulae and variables are as defined as in aspects 18A, 21A and 24A.

In aspect 52A, the invention provides a method of making a compound of Formula (XVIa) or a stereoisomer or a salt thereof,
comprising steps (1), (2) and (3) of aspects 19A;
the step of aspect 22A;
then the step of aspect 25A;
wherein all formulae and variables are as defined as in aspects 19A, 22A and 25A.

In aspect 53A, the invention provides a method of making a compound of Formula (XVIb) or a stereoisomer or a salt thereof,
comprising steps (1), (2) and (3) of aspects 20A;
the step of aspect 23A;
then the step of aspect 26A;
wherein all formulae and variables are as defined as in aspects 20A, 23A and 26A.

In aspect 54A, the invention provides a method of making a compound of Formula (XVI) or a stereoisomer or a salt thereof,
comprising the step of aspect 15A;
steps (1), (2) and (3) of aspects 18A;
the step of aspect 21A;
then the step of aspect 24A;
wherein all formulae and variables are as defined as in aspects 15A, 18A, 21A and 24A.

In aspect 55A, the invention provides a method of making a compound of Formula (XVIa) or a stereoisomer or a salt thereof,
comprising the step of aspect 16A;
steps (1), (2) and (3) of aspects 19A;
the step of aspect 22A;
then the step of aspect 25A;
wherein all formulae and variables are as defined as in aspects 16A, 19A, 22A and 25A.

In aspect 56A, the invention provides a method of making a compound of Formula (XVIb) or a stereoisomer or a salt thereof,
comprising the step of aspect 17A;
steps (1), (2) and (3) of aspects 20A;
the step of aspect 23A;
then the step of aspect 26A or 26B;
wherein all formulae and variables are as defined as in aspects 17A, 20A, 23A and 26A or 26B.

In another aspect, the invention provides a method of making a compound of Formula (XVIb) or a stereoisomer or a salt thereof,
comprising the step of aspect 17A;
steps (1), (2) and (3) of aspects 20A;
the step of aspect 23A;
then the step of aspect 26A;
wherein all formulae and variables are as defined as in aspects 17A, 20A, 23A and 26A.

In another aspect, the invention provides a method of making a compound of Formula (XVIb) or a stereoisomer or a salt thereof,
comprising the step of aspect 17A;
steps (1), (2) and (3) of aspects 20A;
the step of aspect 23A;
then the step of aspect 26B;
wherein all formulae and variables are as defined as in aspects 17A, 20A, 23A and 26B.

Definitions

The presence of reaction impurities and/or processing impurities may be determined by analytical techniques known in the art, such as, for example, chromatography, nuclear magnetic resonance spectroscopy, mass spectrometry, and/or infrared spectroscopy.

Other embodiments include those described in the Detailed Description and/or in the claims.

To facilitate understanding of the disclosure set forth herein, a number of additional terms are defined below. Generally, the nomenclature used herein and the laboratory procedures in organic chemistry, medicinal chemistry, and pharmacology described herein are those well-known and commonly employed in the art. Unless defined otherwise, all technical and scientific terms used herein generally have the same meaning as commonly understood by one of ordinary skill in the art to which this disclosure belongs.

The term "acceptable" with respect to a formulation, composition or ingredient, as used herein, means having no persistent detrimental effect on the general health of the subject being treated.

"API" refers to an active pharmaceutical ingredient.

The term "halo" refers to fluoro (F), chloro (Cl), bromo (Br), or iodo (I).

The term "alkyl" refers to a hydrocarbon chain that may be a straight chain or branched chain, containing the indicated number of carbon atoms. For example, $C_{1-10}$ indicates that the group may have from 1 to 10 (inclusive) carbon atoms in it. Non-limiting examples include methyl, ethyl, iso-propyl, tert-butyl, n-hexyl.

The term "haloalkyl" refers to an alkyl, in which one or more hydrogen atoms is/are replaced with an independently selected halo.

The term "alkoxy" refers to an —O-alkyl radical (e.g., —OCH$_3$).

The term "haloalkoxy" refers to an —O-haloalkyl radical (e.g., —OCF$_3$).

The term "alkylene" refers to a branched or unbranched divalent alkyl (e.g., —CH$_2$—).

The term "aryl" refers to a 6-carbon monocyclic, 10-carbon bicyclic, or 14-carbon tricyclic aromatic ring system wherein 0, 1, 2, 3, or 4 atoms of each ring may be substituted by a substituent, and wherein the ring comprising a monocyclic radical is aromatic and wherein at least one of the fused rings comprising a bicyclic or tricyclic radical is aromatic e.g. tetrahydronaphthyl. Examples of aryl groups also include phenyl, naphthyl and the like.

The term "cycloalkyl" as used herein includes saturated cyclic hydrocarbon groups having 3 to 10 carbons, preferably 3 to 8 carbons, and more preferably 3 to 6 carbons, wherein the cycloalkyl group may be optionally substituted. Preferred cycloalkyl groups include, without limitation, cyclopropyl, cyclobutyl, cyclopentyl, cyclopentenyl, cyclohexyl, cyclohexenyl, cycloheptyl, and cyclooctyl. The term "cycloalkylene" as used herein refers to divalent cycloalkyl.

The term "heteroaryl" refers to an aromatic 5-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively), wherein 0, 1, 2, 3, or 4 atoms of each ring may be substituted by a substituent, and wherein the ring comprising a monocyclic radical is aromatic and wherein at least one of the fused rings comprising a bicyclic or tricyclic radical is aromatic (but does not have to be a ring which contains a heteroatom, e.g. tetrahydroisoquinolinyl. Examples of heteroaryl groups also include pyridyl, furyl or furanyl, imidazolyl, benzimidazolyl, pyrimidinyl, thiophenyl or thienyl, quinolinyl, indolyl, thiazolyl, and the like.

The term "heterocyclyl" refers to a nonaromatic 5-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively), wherein 0, 1, 2 or 3 atoms of each ring may be substituted by a substituent. Examples of heterocyclyl groups include piperazinyl, pyrrolidinyl, dioxanyl, morpholinyl, tetrahydrofuranyl, and the like. The term "heterocycloalkylene" refers to divalent heterocyclyl.

The term "Brønsted acid" refers to a proton (H$^+$) donor.

The term "Lewis acid" refers to a chemical species that can accept an electron pair from an electron donor compound.

The term "Brønsted base" refers to a proton (H$^+$) acceptor.

The term "Lewis base" refers to a chemical species that can donate an electron pair to an electron acceptor compound.

The term "transition metal catalyst" refers to a coordination complex that has any of various metallic elements such as palladium and nickel that have valence electrons in two shells instead of only one and, when added to a chemical reaction, increases the rate of reaction.

A protic solvent refers to a solvent that has a hydrogen atom bound to an oxygen (as in a hydroxyl group) or a nitrogen (as in an amine group).

An aprotic solvent refers to a solvent that is not a hydrogen bond donor.

A polar solvent refers to a solvent with large dipole moments or partial charges; they contain bonds between atoms with very different electronegativities, such as oxygen and hydrogen.

Solvent mixture refers to a combination of two or more solvents.

In addition, atoms making up the compounds of the present embodiments are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}$C and $^{14}$C.

EXAMPLES

The following Examples are put forth so as to provide those of ordinary skill in the art with a complete disclosure and description of how to make and use the present invention, and are not intended to limit the scope of what the inventors regard as their invention, nor are they intended to represent that the experiments below were performed or that they are all of the experiments that may be performed. It is to be understood that exemplary descriptions written in the present tense were not necessarily performed, but rather that the descriptions can be performed to generate data and the like of a nature described therein. Efforts have been made to ensure accuracy with respect to numbers used (e.g., amounts, temperature, etc.), but some experimental errors and deviations should be accounted for.

The starting materials used in the synthetic sequence of the invention are known, made by known methods, or are commercially available. The skilled artisan will also recognize that conditions and reagents described herein that can be interchanged with alternative art-recognized equivalents. For example, in one reactions, hydrochloric acid can be interchanged with other acids, such as hydrobromic acid, sulfuric acid, etc.

The skilled artisan will recognize a variety of analytical methods that can be used to characterize the compounds described herein, including, for example, $^1$H nuclear magnetic resonance spectroscopy (NMR), heteronuclear NMR, mass spectrometry (MS), liquid chromatography (LC), and infrared (IR) spectroscopy. The foregoing list is a subset of characterization methods available to a skilled artisan and is not intended to be limiting.

To further illustrate the foregoing, the following non-limiting, exemplary synthetic schemes are included. Variations of these examples within the scope of the claims are within the purview of one skilled in the art and are considered to fall within the scope of the invention as described, and claimed herein. The reader will recognize that the skilled artisan, provided with the present disclosure, and skill in the art is able to prepare and use the invention without exhaustive examples.

The following abbreviations have the indicated meanings:
AcOH=acetic acid
t-AmOH=tert-amyl alcohol
aq=aqueous
BINAP=(2,2'-bis(diphenylphosphino)-1,1'-binaphthyl)
BOMCl=benzyl chloromethyl ether
Brettphos=2-(Dicyclohexylphosphino)3,6-dimethoxy-2',4',6'-triisopropyl-1,1'-biphenyl
n-BuBr=butyl bromide
n-BuLi=butyl lithium
CDCl$_3$=deuterated chloroform
CH$_3$CN=acetonitrile
CH$_3$I=methyl iodide
CDI=carbonyldiimidazole
CO$_2$=carbon dioxide
CPME=cyclopentylmethyl ether
d=doublet
DCM=dichloromethane
DMAc=dimethylacetamide
4-DMAP=4-dimethylaminopyridine
DME=1,2-dimethoxyethane
DMF=dimethylformamide
DMPU=N, N'-Dimethylpropyleneurea
DMSO=dimethylsulfoxide
DMSO-d$_6$=deuterated dimethylsulfoxide
DPEPhos=Bis[(2-diphenylphosphino)phenyl] ether
Dppf=1,1'-Ferrocenediyl-bis(diphenylphosphine)
DPPP=1,3-Bis(diphenylphosphino)propane
equiv=equivalent(s)
ERED=ene-reductase
ESI=electrospray ionization
Et$_3$N=trimethylamine
(Et)$_4$NBr or Et$_4$NBr=tetraethylammonium bromide
EtOAc=ethyl acetate
EtOH=ethanol
g=gram(s)
GDH=Glucose dehydrogenase
h=hour(s)
H$_2$=dihydrogen
HCl=hydrogen chloride (usually as a solution)
HBr=hydrogen bromide (usually as a solution)
n-HexLi=hexyllithium
HIO3=iodic acid
HIO$_4$=periodic acid
HMPA=hexamethylphosphoramide
H$_2$O=water
H$_3$PO$_4$=phosphoric acid
H$_2$SO$_4$=sulfuric acid
I$_2$=iodine
IPA=isopropyl alcohol
IPAc=isopropyl acetate
IrCl$_4$=iridium tetrachloride
IrCl$_4$*hydrate=iridium tetrachloride hydrate
[Ir(COD)Cl]$_2$=Bis(1,5-cyclooctadiene)diiridium(I) dichloride
iPrMgCl=isopropylmagnesium chloride
iPrMgCl*LiCl=isopropylmagnesium chloride lithium chloride complex
iPrMgBr=isopropylmagnesium bromide
KCl=potassium chloride
K$_2$CO$_3$=potassium carbonate
KHCO$_3$=potassium bicarbonate
KHMDS=potassium bis(trimethylsilyl)amide
KOtBu=potassium tert-butoxide
KOH=potassium hydroxide
kg=kilogram(s)
KRED=keto-reductase
L=liter(s)
LCAP=Liquid Chromatography Area Percent
LC/MS=liquid chromatography mass spectrometer
LiCl=lithium chloride
LiOtBu=lithium tert-butoxide
LiOH=lithium hydroxide
LiOH*H$_2$O=lithium hydroxide hydrate
LiOMe=lithium methoxide
LRMS=low resolution mass spectrometry
m=multiplet
M=molar
mg=milligram(s)
MEK=methyl ethyl ketone
MeOH or CH$_3$OH=methanol
MeTHF=2-methyltetrahydrofuran
2-MeTHF or CH$_3$THF=2-methyltetrahydrofuran
MgCl$_2$=magnesium chloride
MgClBr=magnesium chloride bromide
MHz=megahertz
MIBK=methyl isobutyl ketone
min=minute(s)
mL=milliliter(s)
mmol=millimole(s)
MTBE=methyl tert-butyl ether
NaCl=sodium chloride
Na$_2$CO$_3$=sodium carbonate
NADPH=nicotinamide adenine dinucleotide phosphate hydrogen
Na$_3$EDTA*xH$_2$O=ethylenediaminetetraacetic acid trisodium salt hydrate
Na$_2$EDTA*2H$_2$O=ethylenediaminetetraacetic acid diodium salt dihydrate
NaHMDS=potassium bis(trimethylsilyl)amide
NaOtBu=sodium tert-butoxide
NaOH=sodium hydroxide
NaOMe=sodium methoxide
NH$_2$C(CH$_3$)$_3$=tert-butylamine
NH$_4$OH or NH$_3$H$_2$O=ammonium hydroxide
NH$_4$OAc=ammonium acetate
NMP=N-methyl-2-pyrrolidone
Pd/C=palladium on carbon
PdCl$_2$(Xantphos)=dichloro[9,9-dimethyl-4,5-bis(diphenylphosphino)-xanthene]palladium(II)
Pd(dppf)Cl$_2$=[1,1'-Bis(diphenylphosphino)ferrocene]dichloropalladium(II)
Pd(OAc)$_2$=palladium(II) acetate PhLi=phenyl lithium
P(OH)$_3$=phosphorous acid
ppm=parts per million
PTFE=poyltetrafluoroethylene
RT=retention time
s=singlet
t=triplet
t-BuOH=tert-butanol
THF=tetrahydrofuran
TFA=trifluoroacetic acid
° C.=degrees Celsius
UPLC/MS=ultra Performance liquid chromatography mass spectrometer
vol=volumes
wt=weight
Xantphos=[5-(diphenylphosphino)-9,9-dimethyl-9H-xanthen-4-yl](diphenyl)-phosphine
ZnBr$_2$=zinc bromide
ZnClBr=zince chloride bromide
ZnCl$_2$=zinc chloride
ZnI$_2$=zinc iodide A number of embodiments of the invention have been described. Nevertheless, it will be understood that various modifications may be made without departing from the spirit and scope of the invention. Accordingly, other embodiments are within the scope of the following claims.

EXPERIMENTAL METHODS

Example 1: Preparation of 4,5-dibromo-1-methyl-1H-1,2,3-triazole

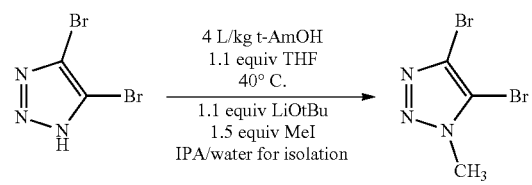

A 10 L reactor under nitrogen protection was charged t-AmOH (2.0 L, 4.0 mL/g) and adjusted temperature to 20° C. The reaction mixture was sequentially charged 4,5-dibromo-1H-1,2,3-triazole (500 g, 1.0 equiv, limiting reagent), and THF (175 g, 1.1 eq.), followed by LiOtBu (195 g, 1.1 eq.) in portions to the reactor, maintaining internal temperature <40° C. The reaction mixture was warmed to 40° C. and stirred for 1 hour; and then charged CH$_3$I (470 g, 1.5 eq.), and continued to age at 40° C. for 24 h. The reaction mixture was warmed to 50° C. and concentrated to 3.0 mL/g under vacuum (80 torr) while maintaining the internal temperature <60° C.; and then charged IPA (1.0 L, 2.0 mL/g) and water (4.0 L, 8.0 mL/g). The reaction mixture was warmed to 60° C., and age for 2 h. The resulting homogenous solution was then cooled to 0° C. over 5 h and aged overnight. The resulting slurry was filtered, washed sequentially with IPA:H$_2$O (35:65) precooled to 0-5° C. (1.0 L, 2 mL/g), followed by water (1.5 L, 3 mL/g) at ambient temperature and dried under vacuum at 50° C. to afford 430 g (82-81% yield) of 4,5-dibromo-1-methyl-1H-1,2,3-triazole as a white solid.

$^1$H NMR (400 MHz, CDCl$_3$) δ 4.10 (s, 3H). $^{13}$C NMR: (100 MHz, CDCl$_3$) δ 122.70, 112.98, 36.89.

LC/MS (ESI) Calcd for [C$_3$H$_3$Br$_2$N$_3$+H]$^+$=239.88, found 239.88.

UHPLC method conditions: Column: Phenomenex Kinetex C8, 1.7 µm, 2.1×50 mm; Mobile phase A: 0.05% TFA in acetonitrile:water (5:95); Mobile phase B: 0.05% TFA in acetonitrile:water (95:5); Temperature: 40° C.; Gradient: 0 min (0% B), 2.0 min (100% B), 2.5 min (100% B); Flow: 1.0 mL/min; 220 nm; UPLC RT 1.02 min.

Example 2: Preparation of 5-((benzyloxy)methyl)-4-bromo-1-methyl-1H-1,2,3-triazole bromide Salt

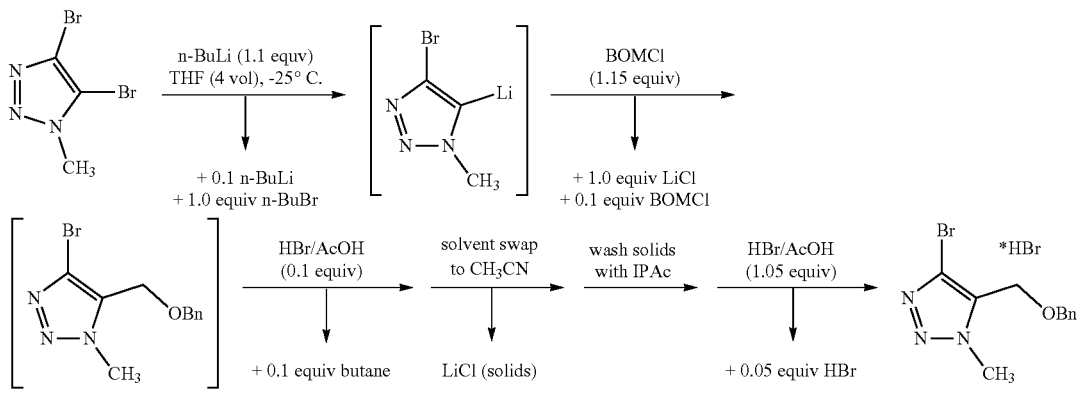

A 10 L reactor under nitrogen protection was charged THF (4.0 L, 4.0 mL/g) and 4,5-dibromo-1-methyl-1H-1,2,3-triazole (1.00 kg, 1.0 equiv, limiting reagent) at 20° C. The solution was cooled to −25° C. and charged n-BuLi (2.5 M in n-Hexane solution, 1.26 kg, 1.1 equiv) dropwise, maintaining the internal temperature <−20° C. After an additional 20 min., the thick suspension was charged BOMCl (0.75 kg, 1.15 equiv), maintaining the internal temperature <−20° C. After 2 h, the reaction mixture was charged 33% HBr in AcOH solution (0.10 kg, 0.10 equiv) and stirred for 30 min at −20° C. The reaction mixture was then warmed to 15° C. and concentrated to 2.0-2.5 mL/g under vacuum (50 torr), maintaining the internal temperature <40° C.; and then charged CH$_3$CN (5.0 L, 5 mL/g) to concentrated solution and continued to distill batch to 2.0-2.5 mL/g, maintaining the internal temperature <40° C. The reaction mixture was charged CH$_3$CN (3.0 L, 3.0 mL/g), warmed suspension to 20° C. and aged for 1 h. The reaction slurry was filtered and washed waste solids with IPAc (2×2.0 L, 2×2.0 mL/g). The combined filtrate was then adjusted to 20° C. and charged with 33% HBr in AcOH solution (1.07 kg, 1.05 equiv) dropwise over at least 1 h. After an additional 1 h, the resulting slurry was filtered, washed sequentially with IPAc:CH$_3$CN (1:1) (3.0 L, 3 mL/g), followed by IPAc (3.0 L, 3 mL/g) and dried under vacuum at 40° C. to afford 1.27 g (83% yield) of 5-((benzyloxy)methyl)-4-bromo-1-methyl-1H-1,2,3-triazole bromide salt as a white solid.

$^1$H NMR: (500 MHz, DMSO-d$_6$) δ 7.29-7.37 (m, 5H), 6.35 (br s, 1H), 4.61 (s, 2H), 4.51 (s, 2H), 4.04 (s, 3H). $^{13}$C NMR: (100 MHz, DMSO-d$_6$) δ 137.48, 132.61, 128.42, 127.86 (2 C's), 121.01, 71.86, 58.62, 36.02. LC/MS (ESI) Calcd for [C$_{11}$H$_{12}$BrN$_3$O+H]$^+$=282.02, found 282.02.

UHPLC method conditions: Column: Phenomenex Kinetex C8, 1.7 μm, 2.1×50 mm; Mobile phase A: 0.05% TFA in acetonitrile:water (5:95); Mobile phase B: 0.05% TFA in acetonitrile:water (95:5); Temperature: 40° C.; Gradient: 0 min (0% B), 2.0 min (100% B), 2.5 min (100% B); Flow: 1.0 mL/min; 220 nm; UPLC RT 1.32 min.

Example 3: Preparation of dimethyl 2-((4-(dimethylamino)benzoyl)oxy)malonate

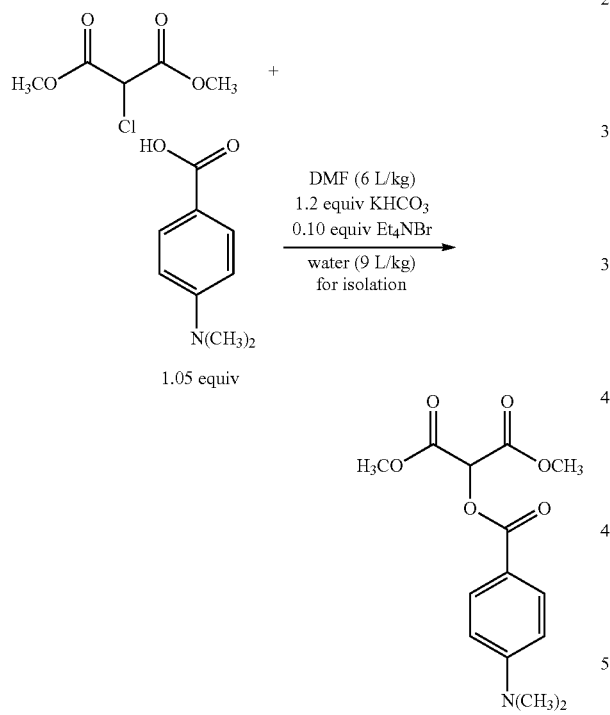

A 5 L reactor under nitrogen protection was charged DMF (900 mL, 3.0 mL/g) and adjusted temperature to 20° C. Sequentially charged 4-dimethylaminobenzoic acid (299.4 g, 1.05 equiv, limit), potassium bicarbonate (203.5 g, 1.20 equiv.), and Et$_4$NBr (35.6 g, 0.10 eq.), followed by additional DMF (900 mL, 3.0 L/kg) as rinse. Reaction mixture was then warmed 30° C. and charged dimethyl chloromalonate (300.0 g, 94.0 wt %, 1.69 moles, limiting reagent), and continued to age at 30° C. overnight. Cooled reaction mixture to 15-20° C. and charged water (2.7 L, 9.0 mL/g) slowly over 2 h. After an additional 4 h the resulting slurry was filtered, washed sequentially with DMF:H$_2$O (1:1.5) (750 mL, 2.5 mL/g), followed by 2-propanol (2×750 mL, 2×2.5 mL/g) and dried under vacuum at 45-50° C. to afford 473 g (95% yield) of dimethyl 2-((4-(dimethylamino)benzoyl)oxy)malonate as a white solid. $^1$H NMR (400 MHz, DMSO): δ 7.81 (d, J=9.1 Hz, 2H), 6.76 (d, J=9.1 Hz, 2H), 5.80 (s, 1H), 3.78 (s, 6H), 3.02 (s, 6H). $^{13}$C NMR (100 MHz, DMSO): δ 165.17, 164.36, 153.82, 131.29, 113.48, 110.88, 71.50, 53.04, 39.53. Found: 295.11 g/mol. LC/MS (ESI) Calcd for [C$_{14}$H$_{17}$NO$_6$+H]$^+$=296.11, found 296.11.

UHPLC method conditions: Column: Supelco Ascentis Express C18, 2.7 μm, 2.1×50 mm; Mobile phase A: 0.05% TFA in MeOH:water (20:80); Mobile phase B: 0.05% TFA in MeOH:acetonitrile (20:80); Temperature: 40° C.; Gradient: 0 min (0% B), 2.0 min (100% B), 2.5 min (100% B); Flow: 1.0 mL/min; 229 nm; UPLC RT 1.25 min.

Example 4: Preparation of dimethyl (S)-2-((4-(dimethylamino)benzoyl)oxy)-2-(3-oxocyclohexyl)malonate

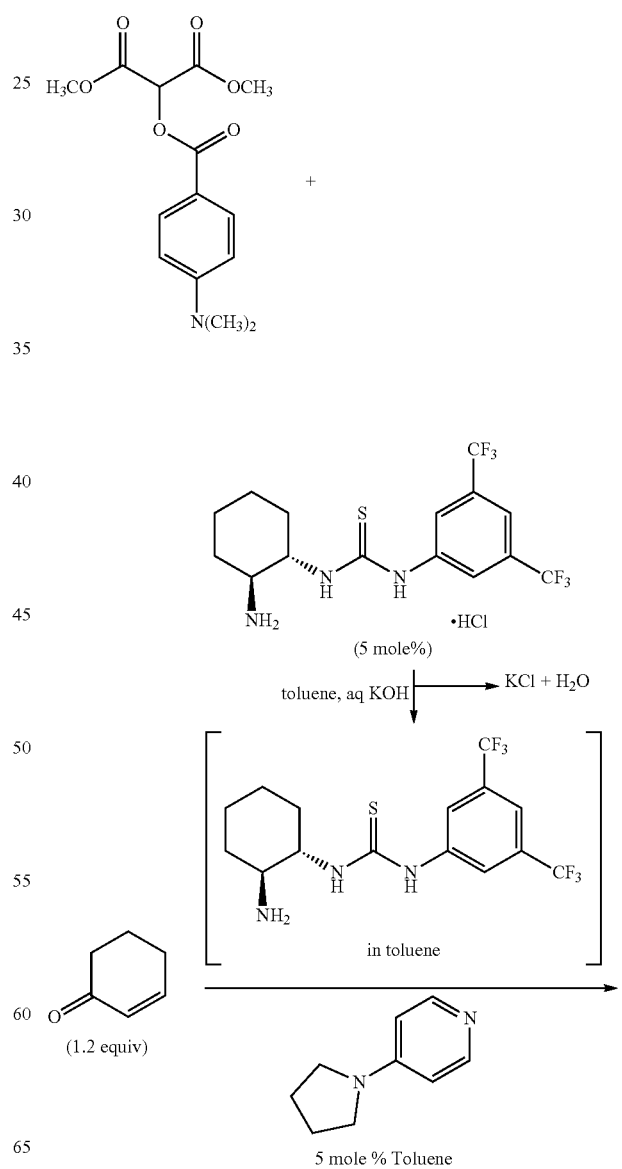

-continued

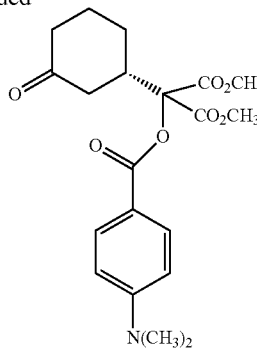

A 2 L reactor under nitrogen protection was charged toluene (100 mL, 1.0 mL/g) and 1-((1S,2S)-2-aminocyclohexyl)-3-(3,5-bis(trifluoromethyl)phenyl)thiourea hydrochloride (7.07 g, 0.05 equiv.) at 20° C. Charged 1 N aqueous KOH (50 mL, 0.5 mL/g) and let agitate for 1 h. Lower aqueous layer was then removed and remaining upper toluene layer was sequentially charged dimethyl 2-((4-(dimethylamino)benzoyl)oxy)malonate (100.0 g, 335.3 mmoles, 1.0 equiv., limiting reagent), 4-pyrrolidinopyridine (2.54 g, 0.05 equiv.) and additional toluene (300 mL, 3.0 mL/g). Warmed reaction mixture to 33° C. to produce a homogeneous solution and then charged 2-cyclohexen-1-one (39.42 g, 1.2 equiv.) in one portion. After 48 h, resulting slurry was charged with 2-propanol (63 mL, 0.63 mL/g) in a single portion, followed by heptane (800 mL, 8.0 mL/g) slowly over 3 h. Slurry was cooled to 20° C., and after aging overnight, filtered, washed sequentially with 5% IPA in 2:1 heptane:toluene (300 mL, 3.0 mL/g) followed by heptane (300 mL, 3.0 mL/g) and dried under vacuum at 45-50° C. to afford 114.7 g (87-88% yield) of dimethyl (S)-2-((4-(dimethylamino)benzoyl)oxy)-2-(3-oxocyclohexyl)malonate as a white solid.

$^1$H NMR (400 MHz, DMSO-$d_6$) δ: 7.81 (d, J=8.8 Hz, 2H), 6.75 (d, J=9.1 Hz, 2H), 3.72 (s, 3H), 3.72 (s, 3H) 3.02 (s, 6H), 2.72-2.58 (m, 1H), 2.54-2.34 (m, 3H), 2.28-2.16 (m, 2H), 2.08-1.95 (m, 1H), 1.93-1.80 (m, 1H), 1.69-1.52 (m, 1H). Note: the singlets at 3.72 correspond to the methyl ester peaks. Although in theory they should not be diastereotopic and thus should be magnetically equivalent and give rise to a 6H singlet, due to slow rotation, they actually appear as two overlapping 3H singlets, and hence the repeat of the 3.72 peak is not a typographical error. $^{13}$C NMR: (100 MHz, DMSO-$d_6$) δ: 208.29, 165.92, 164.47, 153.74, 131.29, 114.11, 110.85, 82.94, 52.77, 43.19, 41.95, 40.18, 25.37, 23.41. (One carbon signal not observed.) LC/MS (ESI) Calcd for $[C_{20}H_{25}NO_7+H]^+$=392.17, found 392.17.

UHPLC method conditions: Column: Supelco Ascentis Express C18, 2.7 μm, 2.1×50 mm; Mobile phase A: 0.05% TFA in MeOH:water (20:80); Mobile phase B: 0.05% TFA in MeOH:acetonitrile (20:80); Temperature: 40° C.; Gradient: 0 min (0% B), 2.0 min (100% B), 2.5 min (100% B); Flow: 1.0 mL/min; 229 nm; UPLC RT 1.28 min Chiral HPLC method conditions: Column: Phenomenex Lux Cellulose-2, 3 μm, 4.6×150 mm; Mobile phase A: 0.05% TFA in MeOH:water (20:80); Mobile phase B: 0.05% TFA in MeOH:acetonitrile (20:80); Temperature: 30° C.; Gradient: 0 min (20% B), 2.0 min (20% B), 5.0 min (55% B), 12.0 min (63% B), 18.0 min (100% B), 21.0 min (100% B); Flow: 1.2 mL/min; 229 nm; HPLC RT desired enantiomer 11.89 min; HPLC RT undesired enantiomer 9.94 min.

Example 5: Preparation of dimethyl 2-((4-(dDimethylamino)benzoyl)oxy)-2-((1S,3S)-3 hydroxycyclohexyl)malonate

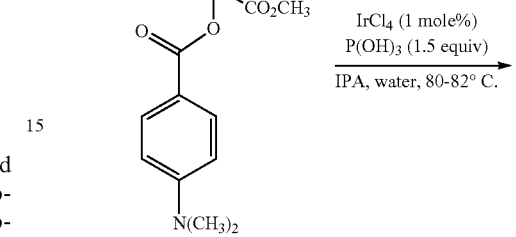

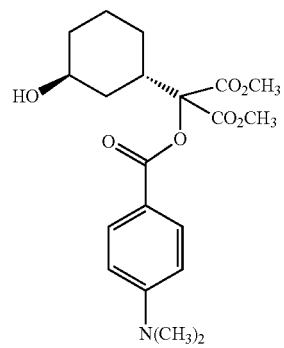

A 5 L reactor under nitrogen protection was charged with dimethyl (S)-2-((4-(dimethylamino)benzoyl)oxy)-2-(3-oxocyclohexyl)malonate (364 g, 930 mmoles, 1.0 equiv., limiting reagent), phosphorous acid (114.4 g, 1.50 equiv.), 2-propanol (730 mL, 2.0 mL/g), $H_2O$ (1100 mL, 3 mL/g) and $[Ir(COD)Cl]_2$ (3.27 g, 0.005 equiv.), in that order, at 20° C. The reaction mixture was then warmed to gentle reflux (~80° C. internal temperature) and the mixture was observed to become homogenous upon warming. After 24 h, the reaction mixture was cooled to 20° C. to produce a suspension. The reaction mixture was then sequentially charged with $H_2O$ (182 mL, 0.5 mL/g) in a single portion, aged for 5 h, and $H_2O$ (1638 mL, 4.5 mL/g) over 2 h. The resulting slurry was then aged overnight, filtered and washed sequentially with 1:4 2-propanol:$H_2O$ (1100 mL, 3.0 mL/g) and then $H_2O$ (1100 mL, 3.0 mL). The wet cake was dried under vacuum at 50° C. with $N_2$ sweep to afford 333 g (91% corrected isolated yield) of dimethyl 2-((4-(dimethylamino) benzoyl)oxy)-2-((1S,3S)-3 hydroxycyclohexyl)malonate as a white solid.

Alternatively, a 4 L reactor under nitrogen protection was charged with 2-propanol (200 mL, 2.0 mL/g), dimethyl (S)-2-((4-(dimethylamino)benzoyl)oxy)-2-(3-oxocyclohexyl)malonate (100 g, 255.5 mmoles, 1.0 equiv., limiting reagent), phosphorous acid (33 g, 1.50 equiv.), $IrCl_4.xH_2O$ (0.89 g, 0.01 equiv.), 2-propanol (200 mL, 2.0 mL/g), and $H_2O$ (50 mL, 0.5 mL/g) in this order at 20° C. The reaction mixture is not homogenous at 20° C. The reaction mixture was then warmed to gentle reflux (80-82° C. internal temperature) and the mixture was observed to become homogenous during warming. After 48 h, the reaction mixture was cooled to 20° C. The reactor was charged with $H_2O$ (350 mL, 3.5 mL/g) over 2 h. After this addition, charged seeds of dimethyl 2-((4-(dimethylamino)benzoyl)oxy)-2-((1S, 3S)-3 hydroxycyclohexyl)malonate (100 mg, 0.01 equiv.) at 20° C. and aged the mixture overnight. The next day, charged H$_2$O (1200 mL, 12.0 mL/g) over 6 h. The resulting slurry was aged overnight. The next day, the slurry was filtered and washed sequentially with 1:4 2-propanol:H$_2$O (300 mL, 3.0 mL/g) and then H$_2$O (300 mL, 3.0 mL). The wet cake was dried under vacuum at 50° C. with N$_2$ sweep to afford 90 g (82% corrected isolated yield) of dimethyl 2-((4-(dimethylamino)benzoyl)oxy)-2-((1S,3S)-3 hydroxycyclohexyl)malonate as a solid.

$^1$H NMR (400 MHz, DMSO-d$_6$) δ 7.79 (d, J=9.1 Hz, 2H), 6.75 (d, J=9.1 Hz, 2H), 4.03-3.96 (m, 1H), 3.67 (s, 6H), 3.01 (s, 6H), 2.66-2.54 (m, 1H), 1.74-1.56 (m, 4H), 1.54-1.43 (m, 1H), 1.43-1.11 (m, 3H). $^{13}$C NMR (100 MHz, DMSO-d6): 166.32, 164.64, 153.63, 131.14, 114.61, 110.82, 84.06, 63.79, 52.40, 52.39, 38.28, 33.62, 31.75, 26.78, 19.52. LC/MS (ESI) Calcd for [C$_{20}$H$_{27}$NO$_7$+H]$^+$=394.19, found 394.19.

UHPLC method conditions: Column: Supelco Ascentis Express C18, 2.7 μm, 2.1×50 mm; Mobile phase A: 0.05% TFA in MeOH:water (20:80); Mobile phase B: 0.05% TFA in MeOH:acetonitrile (20:80); Temperature: 40° C.; Gradient: 0 min (0% B), 2.0 min (100% B), 2.5 min (100% B); Flow: 1.0 mL/min; 229 nm; UPLC RT 1.24 min Chiral HPLC method conditions: Column: Phenomenex Lux Cellulose-2, 3 μm, 4.6×150 mm; Mobile phase A: 0.05% TFA in MeOH:water (20:80); Mobile phase B: 0.05% TFA in MeOH:acetonitrile (20:80); Temperature: 30° C.; Gradient: 0 min (50% B), 2.0 min (50% B), 11.0 min (80% B), 12.0 min (100% B), 15.0 min (100% B); Flow: 1.2 mL/min; 229 nm; HPLC RT desired trans enantiomer 10.8 min; HPLC RT undesired trans enantiomer 5.9 min; HPLC RT undesired major cis enantiomer 5.0 min; HPLC RT undesired minor cis enantiomer 9.8 min.

Example 6: Preparation of (1S,3S)-3-hydroxycyclohexane-1-carboxylic Acid

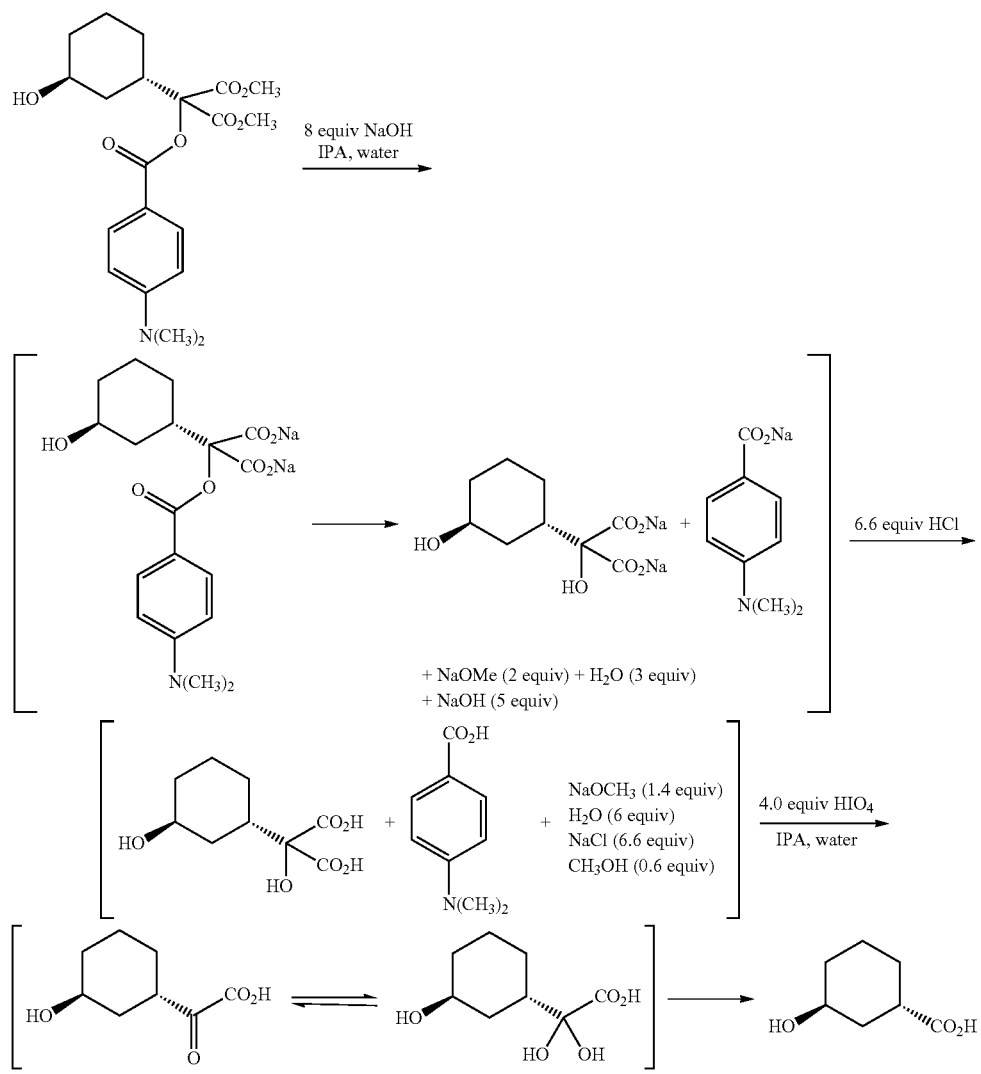

A 5 L jacketed reactor under nitrogen protection at 20° C. was charged 2-propanol (300 mL, 1 mL/g), water (450 mL, 1.5 L/kg, dimethyl 2-((4-(dimethylamino)benzoyl)oxy)-2-((1S,3S)-3 hydroxycyclohexyl)malonate (300 g, 1.00 equiv., limiting reagent) and 2-propanol (60 mL, 0.2 L/kg) as rinse. The resulting suspension was then charged with 10 N aqueous NaOH (460 mL, 6.0 equiv) and water (300 mL, 1.0

L/kg) as rinse. The reaction mixture was then heated to 80-85° C. and aged for at least 16 h. The reaction mixture was then cooled to 5-15° C. and charged with 6M aqueous hydrochloric acid (620 mL, 4.88 equiv.) over at least 2 h, maintaining the internal temperature <15° C. After an additional 4 h, the reaction mixture was filtered and washed with water (2×300 mL, 2×1 mL/g). The combined filtrate was then transferred to a new reactor, and washed with MTBE (1500 mL, 5 mL/g). The lower product-rich aqueous layer was then transferred into a new reactor, rinsing with water (150 mL, 0.5 mL/g), followed by charging 2-propanol (300 mL, 1 mL/g). The reaction stream was then charged with a solution of $H_5IO_6$ (435 g, 2.50 equiv.) in water (300 mL, 1 mL/g) over at least 2 h, maintaining the internal temperature <22° C. After an additional 17 h, charged potassium chloride (600 g, 2 g/g), and after an additional 1.5 h, the mixture was filtered and the solids washed with 20 wt % aqueous potassium chloride (2×300 mL, 2×1 mL/g). The combined filtrate was then washed twice successively with 2-methyltetrahydrofuran (2×1200 mL, 2×4 mL/g). The combined organic layers were then charged with 20 wt % aqueous sodium chloride (1200 mL, 4 mL/g) and cysteine hydrochloride (120 g, 0.40 g/g). After mixing for at least 0.5 h, the layers were split, and the upper organic layer was washed with a solution of 20 wt % aqueous sodium chloride (1200 mL, 4 mL/g).

The product-rich organic layer was then concentrated in vacuo (internal temperature <40° C.), charged 2-methyltetrahydrofuran (900 mL, 3 mL/g), reconcentrated and then charged with 2-methyltetrahydrofuran (900 mL, 3 mL/g). The solution is then concentrated to 1 g/mL, followed by put-take distillation with additional 2-methyltetrahydrofuran (3×300 mL, 3×1 mL/g). The resulting ~1 mL/g solution was then polish filtered and charged with a mixture of heptane:toluene (3:1, 300 mL, 1 g/mL). The resulting slurry was then aged for at least 2 h at 15-25° C., followed by addition of heptane:toluene (3:1, 900 mL, 3 g/mL) over at least 1 h. After aging overnight, the slurry was cooled to 0° C., aged for at least 3 h, filtered, washed with toluene (300 mL, 1 g/mL) and dried in a vacuum oven overnight at 50° C. with an $N_2$ sweep to afford 72.2 g (1S,3S)-3-hydroxycyclohexane-1-carboxylic acid as an off-white solid (66% "as-is" yield).

Alternatively, a 1 L jacketed reactor under nitrogen protection at 20° C. was charged 10 M sodium hydroxide (200 mL, 2 mL/g, ~8 equiv.), followed by water (300 mL, 3 mL/g). Dimethyl 2-((4-(dimethylamino)benzoyl)oxy)-2-((1S,3S)-3 hydroxycyclohexyl)malonate was then charged (91.12 g, 95.13% QNMR potency, 1.00 equiv., limiting reagent) followed by 2-propanol (100 mL, 1 mL/g). The suspension was heated to reflux (internal temperature ~82° C.) and aged for 14.5 h. The reaction mixture was then cooled to 7-8° C. and charged with 3M aqueous hydrochloric acid (569 mL, ~5.7 mL/g, ~7.75 equiv.) over 4 h. After an additional 26 h at 7-8° C., the reaction mixture was warmed to 20° C., filtered and washed with water (200 mL, 2 mL/g). The combined filtrate was then transferred to a new reactor and charged with water (50 mL, 0.5 mL/g) and 2-propanol (200 mL, 2 mL/g). The reaction stream was then charged with a solution of periodic acid (232.09 g, 4.00 equiv.) in water (200 mL, 2 mL/g) over 2.5 h to control off-gassing, followed by aging for an additional 27 h. Potassium chloride (199.9 g, 2 g/g) was then charged, and after an additional 18 h, the mixture was filtered and the solids washed with 20 wt % aqueous potassium chloride (200 mL, 2 mL/g). The combined filtrate was then washed twice successively with 2-methyltetrahydrofuran (2×400 mL, 800 mL total, 8 mL/g). The lower aqueous layer was then washed with an additional 2-methyltetrahydrofuran (800 mL, 8 mL/g). The combined organic layers were then charged with 20 wt % aqueous potassium chloride (500 mL, 5 mL/g) and cysteine hydrochloride (25 g, 0.25 g/g). The layers were split, and the upper organic layer was washed with a solution of 20 wt % aqueous potassium chloride (500 mL, 5 mL/g) and cysteine hydrochloride (25 g, 0.25 g/g). The upper organic layer was then washed with 20 wt % aqueous potassium chloride (500 mL, 5 mL/g).

The turbid product-rich organic layer was then concentrated in vacuo (rotovap; bath temperature: 50° C.) to 2 mL/g, followed by adding 2-methyltetrahydrofuran (200 mL, 2 mL/g). The mixture was then charged with activated carbon (Darco G-60; 2 g; 0.02 g/g), and after agitating overnight (~18 h), the mixture was filtered and washed with 2-methyltetrahydrofuran (2×50 mL, 2×0.5 mL/g). The combined filtrate was then concentrated in vacuo (internal pressure: 200 torr, internal solution temperature at steady-state distillation: 39-41° C.) to -100 mL (~1 mL/g), cooled to 20° C., and sequentially charged with heptane (45 mL, 0.45 mL/g) over 25 min, followed by (1S,3S)-3-hydroxycyclohexane-1-carboxylic acid seeds (369 mg, 0.0037 g/g). After aging overnight (~16 h), the slurry was charged with additional heptane (355 mL, 3.55 mL/g) over 4-6 h, filtered and washed with 1:4 2-methyltetrahydrofuran:heptane (100 mL, 1 mL/g) followed by heptane (100 mL, 1 mL/g). The wet cake was then re-slurried (with agitation) with toluene (100 mL, 1 mL/g), and after removal of the solvent under vacuum, further dried in a vacuum oven overnight at 50° C. with an $N_2$ sweep to afford 20.76 g (1S,3S)-3-hydroxycyclohexane-1-carboxylic acid as an off-white solid (95.01% potency by $^1H$ QNMR, 62.1% corrected isolated yield).

$^1$H NMR (400 MHz, $d_4$-MeOH) δ 3.93-4.00 (m, 1H), 2.67-2.75 (m, 1H), 1.65-1.85 (m, 4H), 1.45-1.63 (m, 4H). $^{13}$C NMR: (100 MHz, d4-MeOH) δ 179.64, 66.88, 39.11, 36.51, 33.75, 29.27, 21.05. LC/MS (DCI) Calcd for $[C_7H_{12}O_3+H]^+$=145.086, found 145.0865.

HPLC method conditions: Column: Supelco Ascentis Express C18, 2.7 μm, 4.6×150 mm; Mobile phase A: 0.05% MSA in water:$CH_3CN$ (98:2); Mobile phase B: 0.05% MSA in water:$CH_3CN$ (10:90); Temperature: 25° C.; Gradient: 0 min (0% B), 7.0 min (100% B), 9.0 min (100% B); Flow: 0.8 mL/min; 210 nm; HPLC RT 4.62 min.

Chiral HPLC method conditions: Column: Chiralpak AD-3, 3 μm, 4.6×150 mm; Mobile phase A: 0.03% MSA in heptane:EtOH (85:15), isocratic for 15 min; Temperature: 25° C.; Flow: 1.0 mL/min; 210 nm; HPLC RT desired trans enantiomer 7.67 min; HPLC RT undesired trans enantiomer 9.29 min; HPLC RT undesired major/minor cis diastereomers 6.89 min.

Example 7: Preparation of 1-((1S,2S)-2-aminocyclohexyl)-3-(3,5-bis(trifluoromethyl)phenyl)thiourea hydrochloride

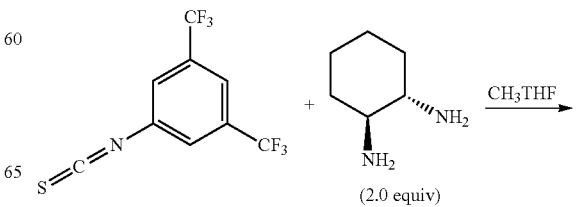

-continued

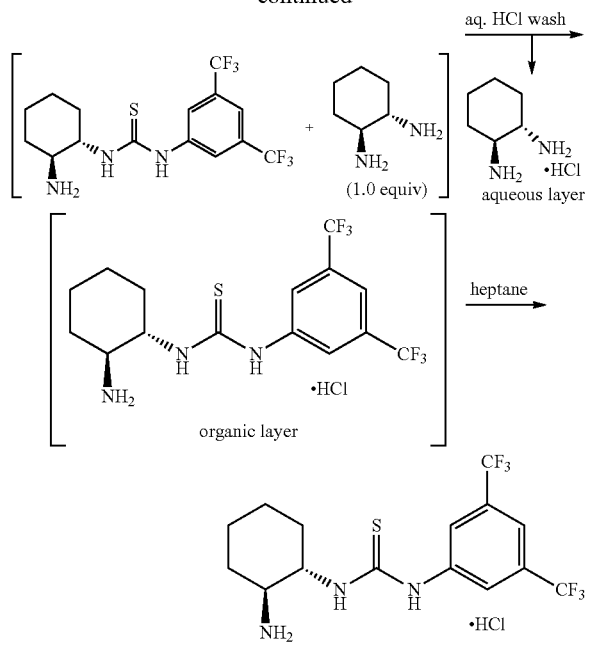

A 4 L reactor under nitrogen protection was sequentially charged 2-MeTHF (280 mL, 1.0 mL/g), a solution of (1S, 2S)-(+)-1,2-diaminocyclohexane (235.8 g, 2.0 equiv.) in 2-MeTHF (840 mL, 3 mL/g) and 2-MeTHF (280 mL, 1.0 mL/g) as rinse. The resulting solution was cooled to −10° C. and then charged with a solution of 3,5-bis(trifluoromethyl) phenyl isocyanate (280 g, 1032 mmoles, 1.0 equiv., limiting reagent) in 2-MeTHF (840 mL, 3 mL/g) over 4.5 h. The reaction mixture was then charged with 6 N aqueous HCl (560 mL, 2.0 mL/g) slowly over 30 min., maintaining internal temperature <20° C. After an additional 10 min., the layers were split and the lower aqueous layer discarded. The upper organic layer was then concentrated under vacuum (320 mbar) to 4.0 mL/g, maintaining the internal temperature between 40-45° C. Charged fresh 2-MeTHF (560 mL, 2.0 mL/g) and continued concentration to 3.0 mL/g. Reaction mixture was then placed under $N_2$ at 1 atm and adjusted to an internal temperature of 40-45° C. Charged heptane (2520 mL, 9.0 mL/g) slowly over 3.5 h, and the resulting slurry was cooled from 40-45° C. to 20° C. over 2 h. After aging overnight, the slurry was filtered, washed sequentially with heptane:2-MeTHF (3:1) (840 mL, 3.0 mL/g) followed by heptane (840 mL, 3.0 mL/g) and dried under vacuum at 45-50° C. to afford 298 g (74-75% yield) of 1-((1S,2S)-2-aminocyclohexyl)-3-(3,5-bis(trifluoromethyl)phenyl)thiourea hydrochloride as a white solid.

$^1$H NMR (400 MHz, DMSO-$d_6$) δ 10.75-11.24 (m, 1H), 8.77-8.99 (m, 1H), 8.26-8.45 (m, 2H), 7.96-8.26 (m, 3H), 7.60-7.76 (m, 1H), 5.70-5.73 (m, 1H), 4.23-4.43 (m, 1H), 2.95-3.17 (m, 1H), 1.94-2.18 (m, 2H), 1.59-1.80 (m, 2H), 1.39-1.57 (m, 1H), 1.11-1.39 (m, 3H). $^{13}$C NMR: (100 MHz, DMSO-$d_6$) δ 181.3, 142.7, 130.5 (q, J=33.0 Hz), 122.0, 123.7 (q, J=272.9 Hz), 116.3, 55.0, 53.5, 30.9, 29.6, 24.3, 23.6. LC/MS (ESI) Calcd for $[C_{15}H_{17}F_6N_3S+H]^+$=386.11, found 386.11.

HPLC method conditions: Column: Supelco Ascentis Express C18, 2.7 μm, 4.6×50 mm; Mobile phase A: 0.05% TFA in acetonitrile:water (5:95); Mobile phase B: 0.05% TFA in acetonitrile:water (95:5); Temperature: 50° C.; Gradient: 0 min (0% B), 15.0 min (100% B), 18.0 min (100% B); Flow: 1.2 mL/min; 229 nm; HPLC RT 6.53 min.

Example 8: Preparation of (1S,3S)-3-((6-bromo-2-methylpyridin-3-yl)Oxy)cyclohexane-1-carboxylic Acid

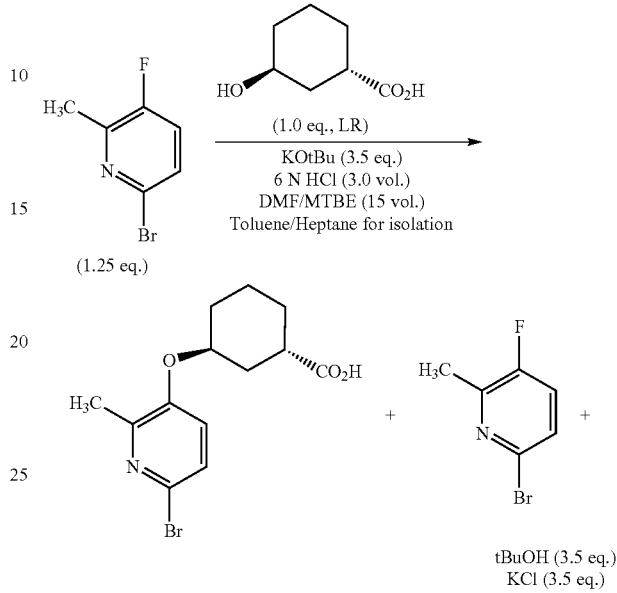

A 100 mL reactor under nitrogen protection was charged MTBE (45 mL, 7.5 mL/g) followed by KOtBu (11.2 g, 2.4 equiv.) at 20° C. In a separate addition funnel was charged DMF (45 mL, 7.5 mL/g) followed by (1S,3S)-3-hydroxy-cyclohexane-1-carboxylic acid (6.0 g, 1.0 equiv, limiting reagent), which was dissolved readily and resulted in a clear solution. The contents of the addition funnel were then added dropwise to MTBE/KOtBu mixture over 90-120 min, maintaining the internal temperature below 30° C. After an additional 30 min, the resulting well-dispersed suspension was charged 6-bromo-3-fluoro-2-methylpyridine (7.84 g, 1.00 equiv.) and the contents of the reactor were heated to 33° C. After 6 h, added KOtBu (2.4 g, 1.00 equiv) as a solid followed by 6-bromo-3-fluoro-2-methylpyridine (1.96 g, 0.25 equiv.) After aging for an additional 24 h, the contents of the reactor were cooled to 25° C. and charged dropwise with water (48 mL, 8.0 mL/g), maintaining the internal temperature below 30° C. After an additional 15 min., charged MTBE (24 mL, 4.0 mL/g) and stirred the resulting biphasic solution for 15 min at 25° C. The layers were then split, and the upper organic layer was discarded. The lower product-rich aq. layer was then washed with additional MTBE (24 mL, 4.0 mL/g), and the upper organic layer was discarded. The product-rich aqueous layer was then charged with MeTHF (60 mL, 10.0 mL/g) and acidified to pH 5-7 using 6N HCl (18 mL, 3.0 mL/g). The layers were then split, and the resulting upper product-rich organic layer was washed twice with water (2×18 mL, 2×3 mL/g), concentrated under vacuum at 45° C. to 6.0 mL/g. The resulting solution was solvent swapped into Toluene (48 mL, 8.0 mL/g) under constant-volume distillation conditions, and the resulting solution treated with carbon Zeta Plus 55SP (0.9 g, 0.15 equiv) for 2 hours and filtered. The resulting solution was then concentrated under reduced pressure, seeded for crystallization using 1 wt % of the desired product, followed by addition of heptane (108 mL, 18.0 mL/g) over 4-6 h. After aging overnight, the resulting slurry was filtered, washed sequentially with toluene/heptane (1:3) mixture (18 mL, 3.0 mL/g), heptane (18 mL, 3.0 mL/g) and dried under vacuum at 45° C. to afford 10.1 g (78% yield) of the desired product as a brown solid.

Alternatively,

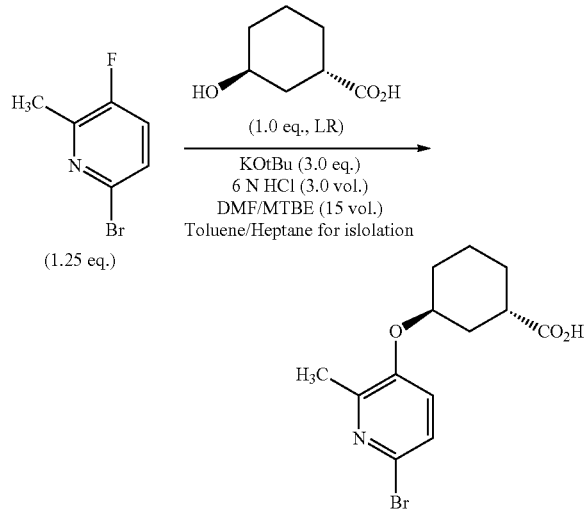

A 100 mL reactor under nitrogen protection was charged MTBE (45 mL, 7.5 mL/g) followed by KOtBu (14.0 g, 3.0 equiv.) at 20° C. In a separate addition funnel was charged DMF (45 mL, 7.5 mL/g) followed by (1S,3S)-3-hydroxy-cyclohexane-1-carboxylic acid (6.0 g, 1.0 equiv, limiting reagent). The (1S,3S)-3-hydroxycyclohexane-1-carboxylic acid dissolved readily and resulted in a clear solution. The contents of the addition funnel were then added dropwise to MTBE/KOtBu mixture over 15-30 min, maintaining the internal temperature below 30° C. After an additional 30 min, the resulting well-dispersed suspension was charged 6-bromo-3-fluoro-2-methylpyridine (9.8 g, 1.25 equiv.) and the contents of the reactor were heated to 33° C. After 24 h, the contents of the reactor were cooled to 25° C. and charged dropwise with water (48 mL, 8.0 mL/g) to maintain the internal temperature below 30° C. After an additional 15 min., charged MTBE (18 mL, 3.0 mL/g) and stirred the resulting biphasic solution for 15 min at 25° C. The layers were then split, and the upper organic layer was discarded. The product-rich aqueous layer was then charged with toluene (48 mL, 8.0 mL/g) and acidified to pH 5-7 using 6N HCl (18 mL, 3.0 mL/g). The layers were then split, and the resulting upper product-rich organic layer was concentrated under vacuum at 45° C. to 6.0 mL/g. The resulting solution was then charged heptane (108 mL, 18.0 mL/g) dropwise over 2-4 h and aged overnight. The resulting slurry was then filtered and washed sequentially with toluene/heptane (1:3) mixture (18 mL, 3.0 mL/g) and heptane (18 mL, 3.0 mL/g) and dried under vacuum at 45° C. to afford 7.9 g (61% yield) (1S,3S)-3-((6-bromo-2-methylpyridin-3-yl)oxy)cyclo-hexane-1-carboxylic acid as a brown solid.

$^1$H NMR (400 MHz, CDCl$_3$) δ 11.61-10.99 (m, 1H), 7.27-7.14 (m, 1H), 7.07-6.95 (m, 1H), 4.68-4.50 (m, 1H), 2.91-2.77 (m, 1H), 2.56-2.39 (m, 3H), 2.15-2.04 (m, 1H), 2.04-1.82 (m, 3H), 1.81-1.57 (m, 4H). $^{13}$C NMR (100 MHz, CDCl$_3$) δ 181.3, 151.2, 150.9, 130.1, 125.5, 121.9, 72.3, 38.2, 31.8, 29.4, 27.9, 20.2, 19.1. LC/MS (ESI) Calcd for $[C_{13}H_{16}BrNO_3+H]^+$=314.04, found 314.04.

Analytical: Column: Phenomex Kinetex C8, 150×4.6 mm, 2.6 μm; Mobile phase A: 0.05% TFA in water; Mobile phase B: 0.05% TFA in methanol:acetonitrile (80:20); Temperature: 27° C.; Gradient: 0 min (44% B), 1.0 min (44% B), 17.0 min (60% B), 18.0 min (60% B), 25.0 min (90% B), 28.0 min (90% B), 30.0 min (100% B), 30.1 min (44% B), 35 min (44% B); Flow: 0.8 mL/min; 220 nm; HPLC RT 14.88 min.

Example 9: Preparation of (1S, 3S)-3-((6-(5-((ben-zyloxy)methyl)-1-methyl-1H-1,2,3-triazol-4-yl)-2-methylpyridin-3-yl)oxy)cyclohexane-1-carboxylic Acid tert-butylamine Salt

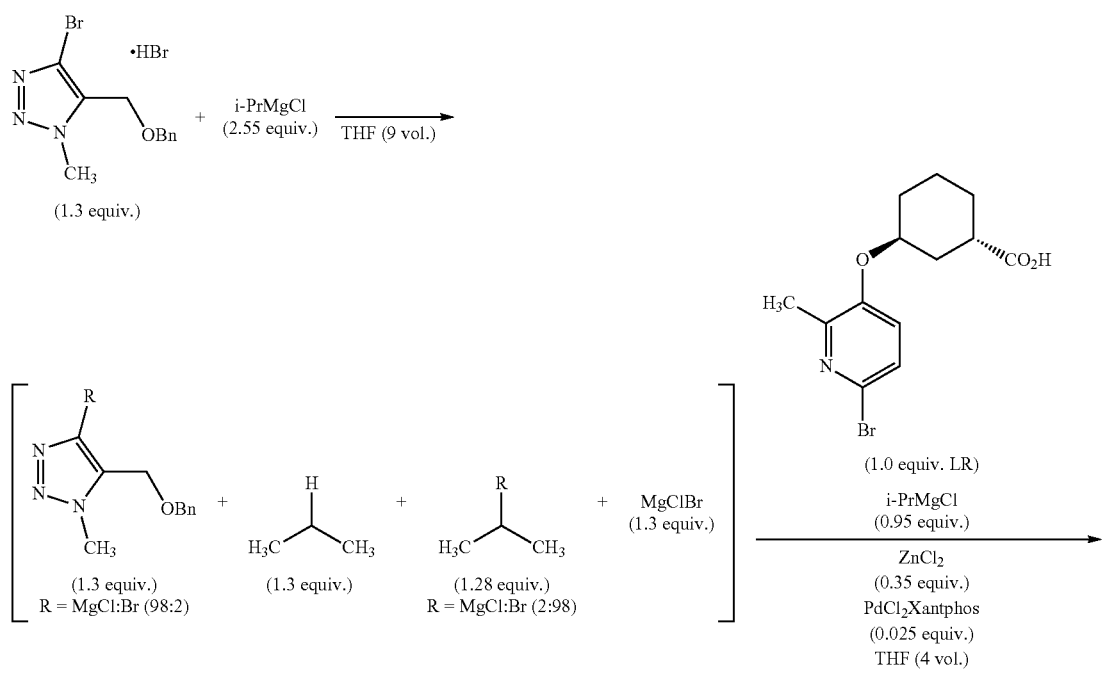

-continued
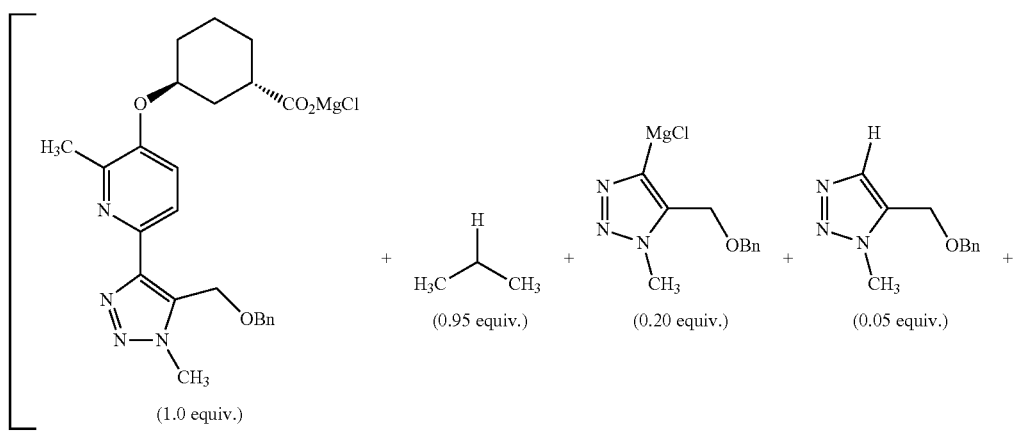
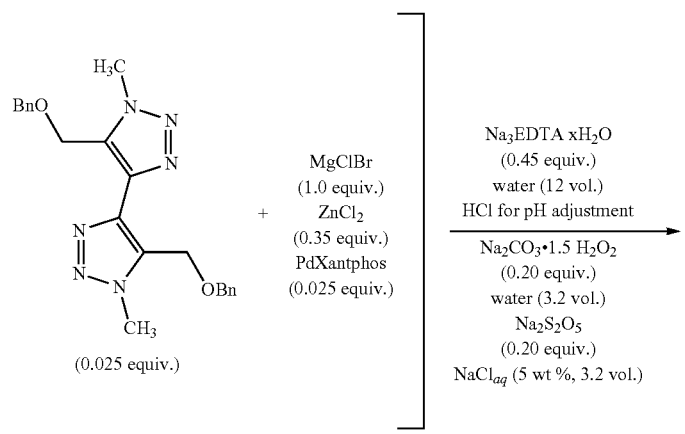
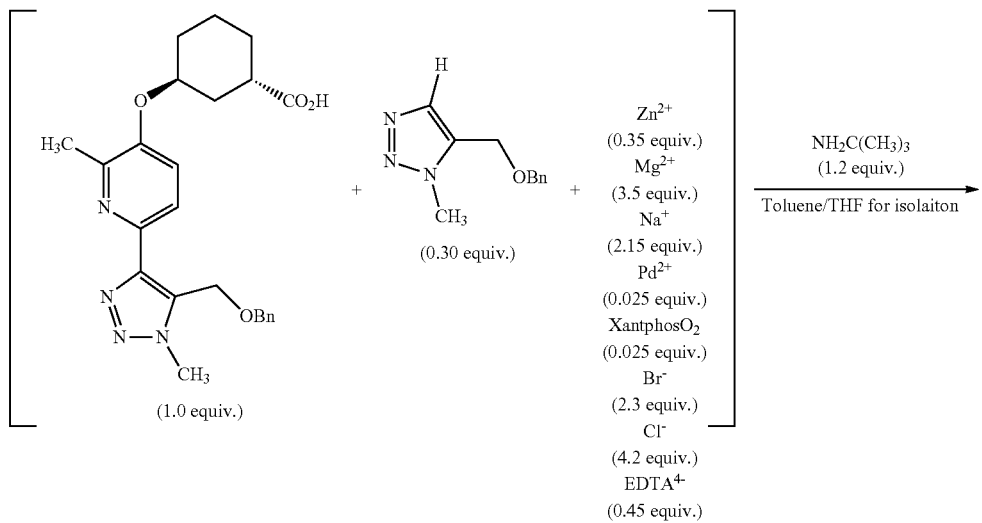

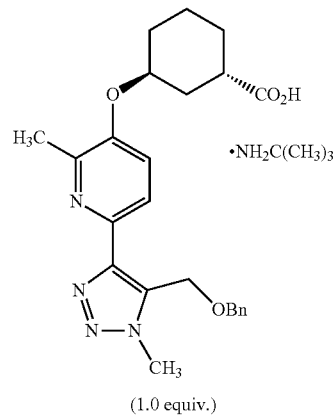

(1.0 equiv.)

Organomagnesium Preparation—A jacketed 250 mL Chemglass reactor equipped with an overhead stirring paddle was charged with 5-((benzyloxy)methyl)-4-bromo-1-methyl-1H-1,2,3-triazole bromide salt (36.05 g, 1.3 equiv.) and tetrahydrofuran (209 mL, 8.5 mL/g). The reactor was sealed, equipped with an inlet of nitrogen, and the slurry was degassed with a subsurface sparge of nitrogen for 30 minutes. The slurry was cooled to an internal temperature of 5° C. and allowed to age for 10 minutes. Isopropylmagnesium chloride (103 mL, 2.55 equiv., 1.90 M in THF) was charged over 30 minutes (Caution: Gas evolution!). After completion of the addition, the reactor was warmed to 20° C. After 3 hours the homogeneous organomagnesium solution was immediately used in the subsequent Negishi coupling (vide infra).

Negishi Coupling—A separate jacketed 1 L Chemglass reactor equipped with an overhead stirring paddle was charged with (1S,3S)-3-((6-bromo-2-methylpyridin-3-yl)oxy)cyclohexane-1-carboxylic acid (25.00 g, 1.0 equiv., limiting reagent), anhydrous zinc chloride (3.65 g, 0.35 equiv.), and tetrahydrofuran (85 mL, 3.4 mL/g). The reactor was sealed and equipped with an inlet of nitrogen and the headspace was flushed with nitrogen for 5 minutes. The resulting homogeneous solution was cooled to 0° C. and aged for 10 minutes with agitation. Isopropylmagnesium chloride (37.8 mL, 0.95 equiv., 1.90 M in THF) was charged over 15 minutes (Caution: Gas evolution!). After an additional 15 minutes the reactor was warmed to 20° C. and PdCl$_2$(Xantphos) (1.44 g, 0.025 equiv.) was charged in a single portion. The resulting heterogeneous solution was degassed with a subsurface sparge of nitrogen for 30 minutes. After degassing, the solution was warmed to 40° C. and aged for 10 minutes with agitation. The organomagnesium solution (vide supra) was charged over 10-15 minutes in a slow, steady stream. The resulting solution was agitated for 16 hours at 40° C. and subsequently cooled to 23° C. The reaction was quenched with tribasic sodium ethylenediaminetetraacetic acid (11.67 g, 0.45 equiv.) in water (300 mL) over 1 hour. The pH of the solution was adjusted to 4.0-5.0 with 6 N HCl (1.1 equiv.) and the biphasic mixture was agitated for 30 minutes. The phases were allowed to settle for 30 minutes and subsequently split. The organic layer was treated with a freshly prepared solution of sodium percarbonate (2.43 g, 0.20 equiv.) in water (80 mL, 3.2 mL/g) [Caution: Gas evolution! (CO$_2$)]. The resulting homogeneous mixture was agitated for 4 hours at 20° C. The oxidation was quenched with a solution of sodium metabisulfite (2.87 g, 0.20 equiv.) in 15 wt % NaCl$_{aq.}$ (80 mL, 3.2 mL/g). Toluene (75 mL, 3.0 mL/g) was charged and the resulting biphasic mixture was agitated for 30 minutes. The phases were allowed to settle for 30 minutes and subsequently split. The organic stream was concentrated under reduced pressure (100-150 torr) to a solution volume of 4 mL/g. The product rich organic layer was diluted with fresh toluene (150 mL, 6.0 mL/g) and subsequently concentrated under reduced pressure (100-150 torr) to a solution volume of 6 mL/g. The product rich organic layer was diluted with toluene (25 mL, 1.0 mL/g) and tetrahydrofuran (25 mL, 1.0 mL/g). The resulting solution was polish filtered into a clean 250 mL jacketed Chemglass reactor and warmed to 55° C. One third of a solution of tert-butylamine (1.90 mL, 1.2 equiv.) in toluene (83 mL, 3.3 mL/g) and tetrahydrofuran (17 mL, 0.7 mL/g) was added in a single portion followed by seeds of the desired product (0.125 g, 0.5 wt %). The remaining two thirds of the amine solution was added in a dropwise manner over 60 minutes. After 30 minutes the slurry was slowly cooled to 0° C. over 2 hours. The slurry was aged at 0° C. for 14 hours. The solids were filtered and collected. The solids were sequentially washed with toluene:tetrahydrofuran (5:1) (75 mL, 3.0 mL/g) followed by toluene (75 mL, 3.0 mL/g) and dried in an oven vacuum at 65° C. under a sweep of nitrogen to afford 35.96 g (93.4%) of the desired product as a white solid.

Alternatively,

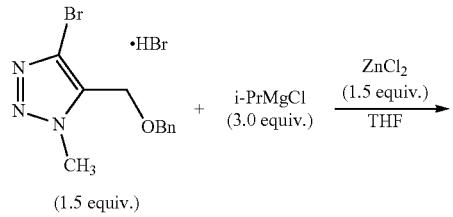

(1.5 equiv.)

-continued
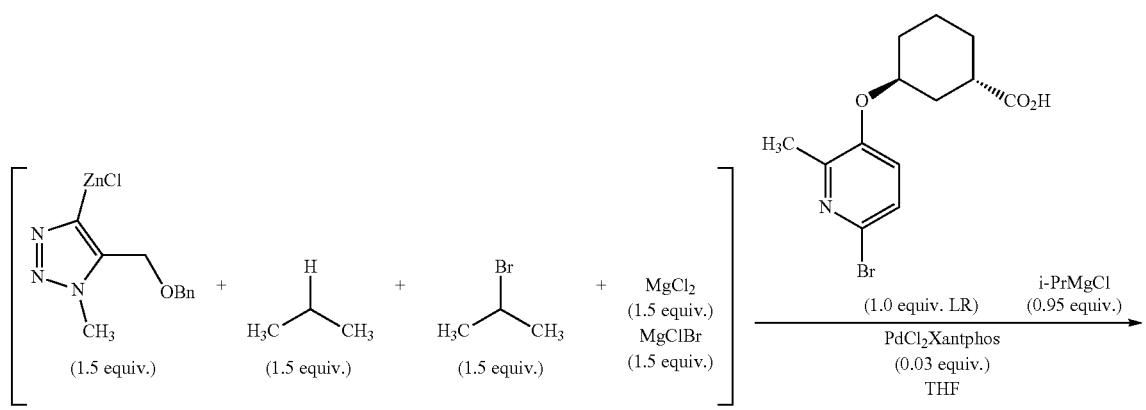
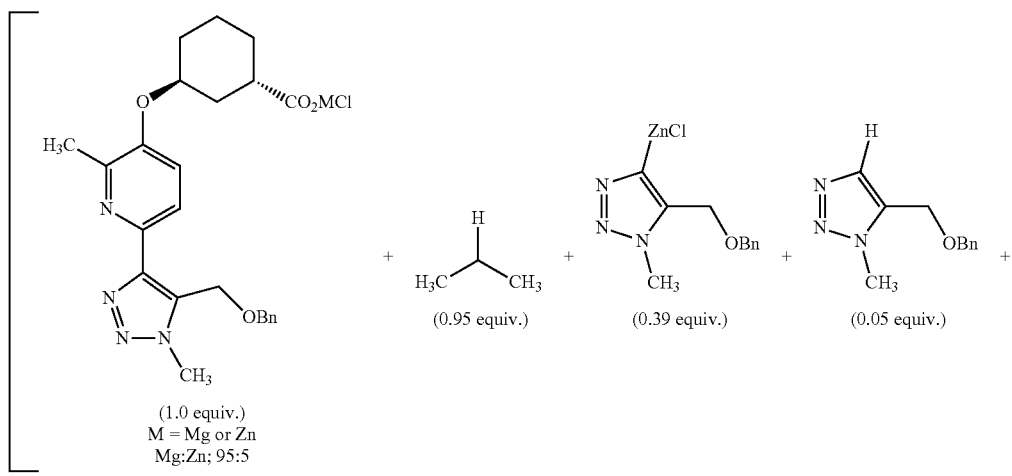
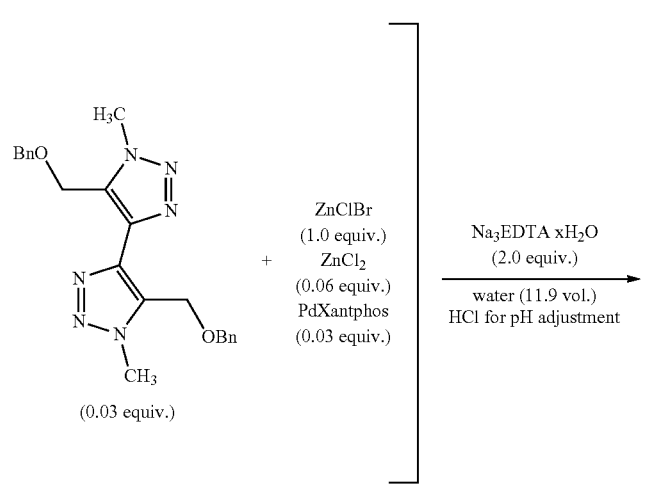

-continued

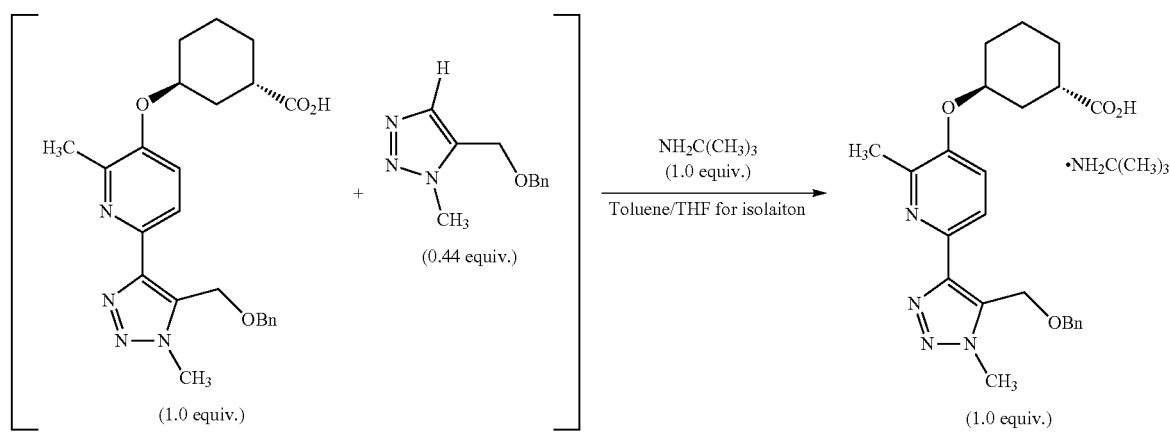

A 20 mL vial was charged with 5-((benzyloxy)methyl)-4-bromo-1-methyl-1H-1,2,3-triazole bromide salt (1.7059 g, 1.5 equiv.). The vial was sealed with a cap equipped with a PTFE-septum. The vial was equipped with an inlet of nitrogen and the headspace was flushed with nitrogen for 5 minutes. Tetrahydrofuran (8.90 mL, 8.95 mL/g) was charged to the vial. The resulting slurry was cooled to 0° C. and allowed to age for 10 minutes. Isopropylmagnesium chloride (4.11 mL, 3.0 equiv., 2.15 M in THF) was charged over 15 minutes (Caution: Gas evolution!). After 2 hours the vial was warmed to 23° C. and brought into a nitrogen atmosphere glovebox. Anhydrous zinc chloride (0.601 g, 1.5 equiv.) was charged in a single portion and the solution was agitated in the nitrogen atmosphere glovebox at 23° C. After 1 hour the homogeneous organozinc solution was removed from the nitrogen atmosphere glovebox and immediately used in the subsequent Negishi coupling (vide infra).

Negishi Coupling—A separate 40 mL vial was charged with (1S,3S)-3-((6-bromo-2-methylpyridin-3-yl)oxy)cyclohexane-1-carboxylic acid (1.00 g, 1.0 equiv., limiting reagent). The vial was sealed with a cap equipped with a PTFE-septum. The vial was equipped with an inlet of nitrogen and the headspace was flushed with nitrogen for 5 minutes. Tetrahydrofuran (4.03 mL, 4.0 mL/g) was charged to the vial. The resulting homogeneous solution was cooled to 0° C. and allowed to age for 10 minutes. Isopropylmagnesium chloride (1.30 mL, 0.95 equiv., 2.15 M in THF) was charged over 15 minutes (Caution: Gas evolution!). After 15 minutes the vial was warmed to 23° C. and PdCl$_2$(Xantphos) (0.0665 g, 0.03 equiv.) was charged in a single portion. The resulting heterogeneous solution was degassed by a subsurface sparge of nitrogen for 5 minutes. After degassing the solution, the organozinc solution (vide supra) was added over 10 minutes. The resulting solution was vigorously agitated at 23° C. After 21 hours a solution of tribasic sodium ethylenediaminetetraacetic acid (2.16 g, 2.0 equiv.) in water (12.0 mL) was added over 1 hour. The phases were split and the organic layer was concentrated under reduced pressure (100 torr) to a solution volume of 4 mL/g. The product rich organic layer was diluted with fresh tetrahydrofuran (8.0 mL, 8 mL/g). Solvent was removed under reduced pressure (100 torr) to a solution volume of 4 mL/g. The product rich organic layer was diluted with fresh tetrahydrofuran (8.0 mL, 8 mL/g). Solvent was removed under reduced pressure (100 torr) to a solution volume of 4 mL/g. The product rich organic layer was diluted with toluene (8.0 mL, 8.0 mL/g). One third of a solution of tert-butylamine (0.33 mL, 1.0 equiv.) in toluene (1.0 mL, 1.0 mL/g) was added in a single portion followed by seeds of (1S, 3S)-3-((6-(5-((benzyloxy)methyl)-1-methyl-1H-1,2,3-triazol-4-yl)-2-methylpyridin-3-yl)oxy)cyclohexane-1-carboxylic acid tert-butylamine salt (0.010 g, 1.0 wt %). The remaining two thirds of the amine solution was added in a dropwise manner over 20 minutes. After 15 hours the slurry was filtered and the solids were collected. The solids were sequentially washed with toluene:tetrahydrofuran (2:1) (6.0 mL, 6.0 mL/g) followed by toluene (6.0 mL, 6.0 mL/g) and dried in an oven vacuum at 50° C. under a sweep of nitrogen to afford 1.22 g (76%) of (1S, 3S)-3-((6-(5-((benzyloxy)methyl)-1-methyl-1H-1,2,3-triazol-4-yl)-2-methylpyridin-3-yl)oxy)cyclohexane-1-carboxylic acid tert-butylamine salt as a white solid.

$^1$H NMR (400 MHz, DMSO-d$_6$) δ 8.54-7.37 (br s, 3H), 7.81 (d, J=8.6 Hz, 1H), 7.54 (d, J=8.6 Hz, 1H), 7.33-7.19 (m, 5H), 5.18 (s, 2H), 4.69 (br s, 1H), 4.53 (s, 2H), 4.06 (s, 3H), 2.33-2.35 (m, 1H), 2.32 (s, 3H), 2.00-1.42 (m, 8H), 1.19 (s, 9H). $^{13}$C NMR: (100 MHz, DMSO-d6) δ 178.3, 151.2, 148.1, 144.5, 141.8, 138.4, 131.4, 128.7, 128.1, 128.0, 120.4, 119.5, 73.2, 72.0, 59.7, 49.8, 40.4 (overlaps with DMSO-d$_6$) 35.4, 33.4, 30.6, 29.1, 29.0, 21.3, 19.8. LC/MS (ESI) Calcd for [C$_{24}$H$_{28}$N$_4$O$_4$+H]$^+$=437.22, found 437.22.

Analytical: Column: Phenomenex Kinetex C8 2.6 um 4.6×150 mm; Mobile Phase A: 0.05% TFA in H$_2$O; Mobile Phase B: 0.05% TFA in MeOH:CH$_3$CN (80:20); Temperature: 27° C.; Gradient: 0 min (44% B), 1.0 min (44% B), 17.0 min (60% B), 18.0 min (60% B), 25.0 min (90% B), 28.0 min (90% B), 30.0 min (100% B), 30.1 min (44% B), 35.0 min (44% B); Flow: 0.8 mL/min; 220 nm; HPLC RT 17.849 min.

Example 10: Preparation of (1S, 3S)-3-((6-(5-(hydroxymethyl)-1-methyl-1H-1,2,3-triazol-4-yl)-2-methylpyridin-3-yl)oxy)cyclohexane-1-carboxylic Acid

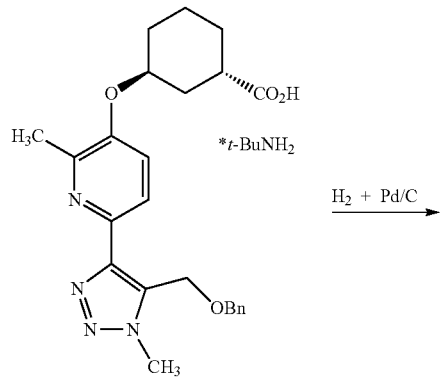

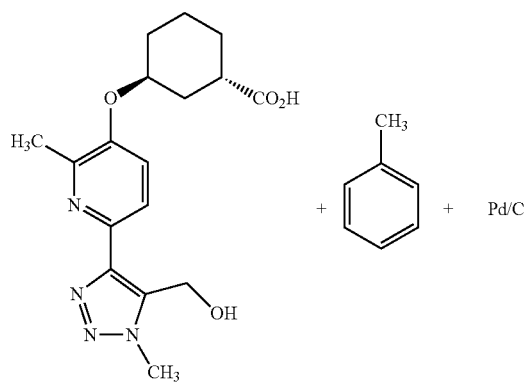

A stainless steel high-pressure reactor was charged with (1S, 3S)-3-((6-(5-((benzyloxy)methyl)-1-methyl-1H-1,2,3-triazol-4-yl)-2-methylpyridin-3-yl)oxy)cyclohexane-1-carboxylic acid tert-butylamine salt (1.00 g, 1.0 equiv., limiting reagent), citric acid monohydrate (0.411 g, 1.00 equiv.), Pd/C (10 wt %, wet) (0.100 g, 0.10 g/g), ethanol (6.0 mL, 6.0 mL/g) and water (2.0 ml, 2.0 ml/g). The reactor was sealed and overhead agitation was initiated. The atmosphere in the reactor was first replaced with nitrogen. The atmosphere in the reactor was then pressurized to 30 PSI hydrogen and the reactor was warmed to 40° C. After 25 h the reactor was cooled to 20-25° C. and filtered. The reactor and filter cake was then washed with ethanol:water (3:1) (2×2.0 mL, 2×2.0 mL/g). The combined filtrate was then concentrated under reduced pressure (<10 torr) to a solution volume of 5.0 mL/g. Water (7.0 mL, 9.0 mL/g) was then added over 2 hours. The resulting slurry was filtered, the solids sequentially washed with water:ethanol (3:1) (3.0 mL, 3.0 mL/g) followed by water (3.0 mL, 3.0 mL/g) and then dried in a vacuum oven at 50° C. under a sweep of nitrogen to afford 0.622 g (90%) of the desired product as a white solid.

Alternatively,

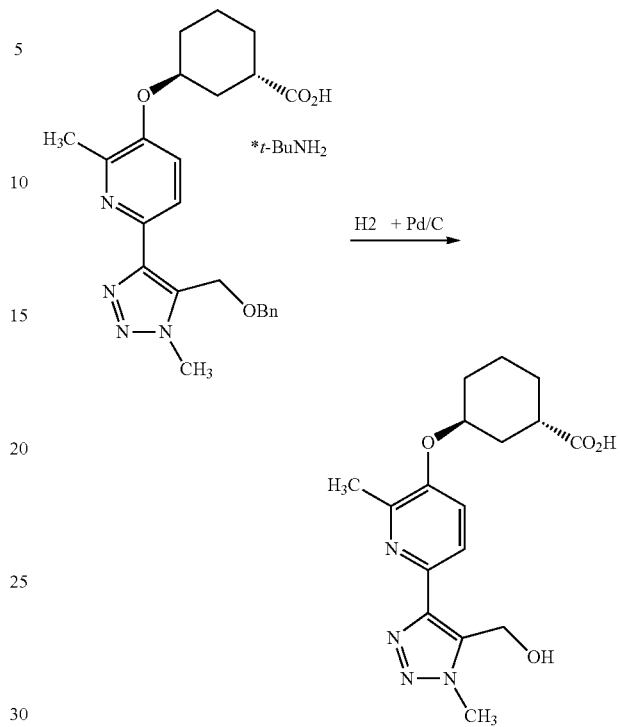

A stainless steel high-pressure reactor was charged with (1S, 3S)-3-((6-(5-((benzyloxy)methyl)-1-methyl-1H-1,2,3-triazol-4-yl)-2-methylpyridin-3-yl)oxy)cyclohexane-1-carboxylic acid tert-butylamine salt (1.00 g, 1.0 equiv., limiting reagent), anhydrous citric acid (0.508 g, 1.34 equiv.), Pd/C (10 wt %, wet) (0.100 g, 0.10 g/g) and ethanol (200 proof) (10.0 mL, 10.0 mL/g). The reactor was sealed and overhead agitation was initiated. The atmosphere in the reactor was replaced with nitrogen. The atmosphere in the reactor was pressurized to 30 PSI hydrogen and the reactor was warmed to 40° C. After 25 hours the reactor was cooled to 23° C. and filtered. The reactor and filter cake was washed twice with ethanol (2×2.0 mL, 2×2.0 mL/g). The combined organic layer was concentrated under reduced pressure (<10 torr) to a solution volume of 3.0 mL/g. Water (9.0 mL, 9.0 mL/g) was added over 2 hours. The solids were filtered and sequentially washed with water:ethanol (3:1) (3.0 mL, 3.0 mL/g) followed by water (3.0 mL, 3.0 mL/g) and dried in a vacuum oven at 50° C. under a sweep of nitrogen to afford 0.491 g (71%) of (1S, 3S)-3-((6-(5-(hydroxymethyl)-1-methyl-1H-1,2,3-triazol-4-yl)-2-methylpyridin-3-yl)oxy)cyclohexane-1-carboxylic acid as a white solid.

$^1$H NMR (500 MHz, DMSO-$d_6$) δ 12.09 (br s, 1H), 7.73 (d, J=8.4 Hz, 1H), 7.35 (d, J=8.5 Hz, 1H), 5.69 (br s, 1H), 4.89 (br s, 2H), 4.63 (br s, 1H), 3.94 (s, 3H), 3.28 (br s, 1 h), 2.37 (br s, 2H), 2.31 (s, 3H), 1.90-1.80 (m, 1H), 1.75-1.55 (m, 3H), 1.55-1.31 (m, 4H). $^{13}$C NMR: (125 MHz, CDCl$_3$) δ 176.4, 150.2, 147.7, 143.1, 142.0, 134.6, 120.6, 119.2, 71.5, 51.8, 37.7, 35.0, 31.7, 28.8, 27.8, 19.9, 19.4. LC/MS (ESI) Calcd for $[C_{17}H_{22}N_4O_4+H]^+$=347.17, found 347.17.

Analytical: Column: Phenomenex Kinetex C8 2.6 um 4.6×150 mm; Mobile Phase A: 0.05% TFA in H$_2$O; Mobile Phase B: 0.05% TFA in MeOH:CH$_3$CN (80:20); Temperature: 27° C.; Gradient: 0 min (44% B), 1.0 min (44% B), 17.0 min (60% B), 18.0 min (60% B), 25.0 min (90% B), 28.0 min (90% B), 30.0 min (100% B), 30.1 min (44% B), 35.0 min (44% B); Flow: 0.8 mL/min; 220 nm; HPLC RT 5.003 min.

Example 11: Preparation of N-methyl-N-propyl-1H-imidazole-1-carboxamide oxalic Acid Salt

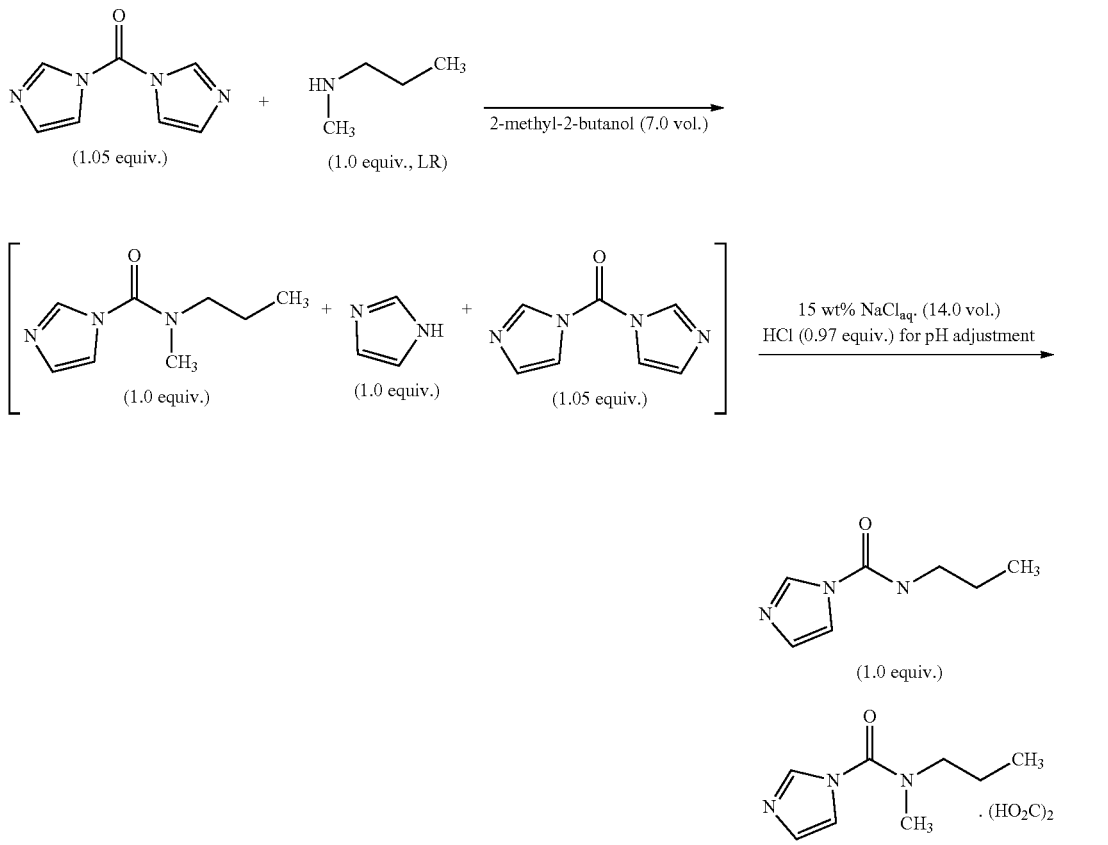

A 4 L reactor was charged with t-AmOH (900 mL, 6.0 mL/g) and 1,1'-carbonyldiimidazole (353 g, 1.05 equiv.). The addition port was rinsed with additional t-AmOH (150 mL, 1.0 mL/g). The resulting heterogeneous slurry was cooled to 0° C. and N-methylpropylamine (150 g, 1.0 equiv., limiting reagent) was added over 1 hour. After 17 hours the solution was warmed to 20° C. The reaction was quenched with water (525 mL, 3.5 mL/g) (Caution: Gas evolution!). Once the gas evolution ceased, the reactor was charged with 6 NHCl$_{aq.}$ (228 mL, 0.67 equiv.) and sodium chloride (92 g, 0.76 equiv.). The phases were separated and the organic layer was retained in the reactor. The reactor was charged with 15 wt % NaCl$_{aq.}$ (525 mL, 3.5 mL/g) and 6 N HCl$_{aq.}$ (51 mL, 0.15 equiv.). The phases were separated and the organic layer was retained in the reactor. The reactor was charged with 15 wt % NaCl$_{aq.}$ (525 mL, 3.5 mL/g) and 6 NHCl$_{aq.}$ (41 mL, 0.12 equiv.). The phases were separated and the organic layer was retained in the reactor. The reactor was charged with 15 wt % NaCl$_{aq.}$ (525 mL, 3.5 mL/g) and 6 NHCl$_{aq.}$ (10 mL, 0.03 equiv.). The phases were separated. The solution was warmed to 45° C. and concentrated under reduced pressure (75 torr) to a solution volume of 4 mL/g. The reactor was charged with fresh toluene (750 mL, 5.0 mL/g) and further concentrated under reduced pressure (75 torr) to a solution volume of 4 mL/g. The reactor was then charged with fresh toluene (900 mL, 6.0 mL/g) and allowed to cool to 23° C. The resulting slurry was polished filtered and the resulting product rich organic layer was charged to a clean 4 L reactor. The solution was warmed to 65° C. and a solution of anhydrous oxalic acid (190 g, 1.0 equiv.) in 2-propanol (750 mL, 5.0 mL/g) was added over 3 hours. The resulting slurry was aged for 8 hours at 65° C. and subsequently cooled to 0° C. over 4 hours. The solids were filtered and sequentially washed with toluene:2-propanol (7:1) (450 mL, 3.0 mL/g) followed by toluene (450 mL, 3.0 mL/g) and dried in a vacuum oven at 50° C. under a sweep of nitrogen to afford 406 g (77%) of N-methyl-N-propyl-1H-imidazole-1-carboxamide oxalic acid salt as a white solid.

$^1$H NMR (400 MHz, DMSO-d$_6$) δ 14.41-13.65 (br s, 2H), 8.31-8.04 (m, 1H), 7.62-7.50 (m, 1H), 7.19-7.06 (m, 1H), 3.32 (t, J=7.3 Hz, 2H), 3.00 (s, 3H), 1.60 (sextet, J=7.3 Hz, 2H), 0.84 (t, J=7.5 Hz, 3H). $^{13}$C NMR: (100 MHz, CDCl$_3$) δ 162.02, 151.28, 137.40, 128.01, 119.27, 51.79, 36.48, 20.29, 11.31. LC/MS (ESI) Calcd for [C$_8$H$_{13}$N$_3$O+H]$^+$=168.11, found 168.11.

Analytical: Column: Supelco Ascentis Express C18 2.7 um 4.6×100 mm; Mobile Phase A: 0.01 M NH$_4$OAc in CH$_3$CN:H$_2$O (5:95); Mobile Phase B: 0.01 M NH$_4$OAc in CH$_3$CN:H$_2$O (95:5); Temperature: 30° C.; Gradient: 0 min (0% B), 2.0 min (0% B), 15.0 min (25% B), 20.0 min (100% B), 24.0 min (100% B); Flow: 1.2 mL/min; 210 nm; HPLC RT 8.934 min.

Example 12: Preparation of (1S,3S)-3-((2-methyl-6-(1-methyl-5-(((methyl(propyl)carbamoyl)oxy)methyl)-1H-1,2,3-triazol-4-yl)pyridin-3-yl)oxy)cyclohexane-1-carboxylic Acid

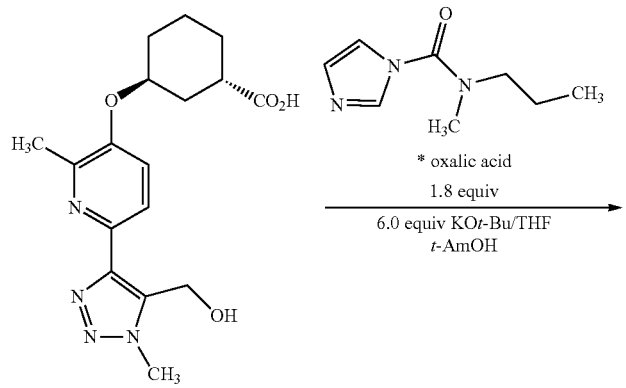

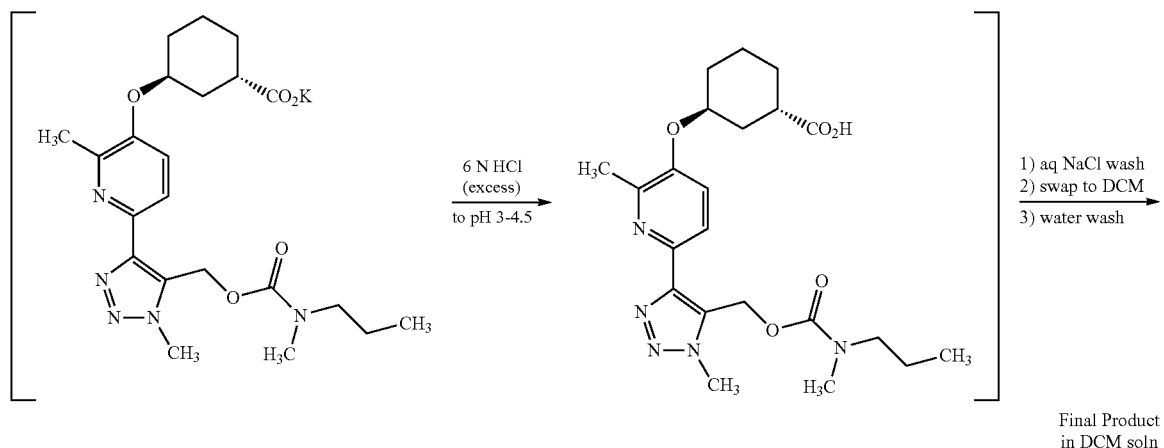

A 40 mL vial equipped with a magnetic stir bar, and N$_2$ inlet was sequentially charged (1S, 3S)-3-((6-(5-(hydroxymethyl)-1-methyl-1H-1,2,3-triazol-4-yl)-2-methylpyridin-3-yl)oxy)cyclohexane-1-carboxylic acid (0.446 g, 1.29 mmoles, 1.0 equiv., limiting reagent), N-methyl-N-propyl-1H-imidazole-1-carboxamide oxalic acid salt (0.596 g, 2.32 mmoles, 1.8 equiv.), and 2-methyl-2-butanol (5.4 mL, 12 L/kg). The resulting thick reaction slurry was then warmed to 55-60° C. and charged with KOtBu (20 wt % in THF, 4.7 mL, 7.8 mmoles, 6.0 equiv) dropwise over 45 min via syringe pump. After an additional 2 h, the resulting thinner reaction mixture was cooled to ambient temperature and charged with water (6.7 mL, 15 L/kg). 6 N aqueous HCl (1 mL, 1.2 L·kg) was then added dropwise to adjust the pH of the aqueous layer to 4.0 (target pH 3.0-4.5). The layers were separated and the lower aqueous layer back extracted with 2-methyl-2-butanol (4.0 mL, 9 L/kg). The combined product-rich aqueous layers were then washed with aqueous NaCl (2 g/L, 4.0 mL, 9.0 L/kg), and the resulting organic layer was concentrated on the rotovap to near dryness. The residue was then dissolved in DCM (5.5 mL, 12 L/kg) and washed with water (4.0 mL, 9 L/kg). The layers were then separated, and the lower product-rich DCM layer was polish filtered. The filter was then washed with DCM (2.0 mL, 4.5 L/kg) to afford a solution of (1S,3S)-3-((2-methyl-6-(1-methyl-5-(((methyl(propyl)carbamoyl)oxy)methyl)-1H-1,2,3-triazol-4-yl)pyridin-3-yl)oxy)cyclohexane-1-carboxylic acid in DCM.

$^1$H NMR (500 MHz, CDCl$_3$) δ 7.96 (d, J=8.4 Hz, 1H), 7.22 (d, J=8.5 Hz, 1H), 5.76 (d, J=9.9 Hz, 2H), 4.71 (br s, 1H), 4.14 (s, 3H), 3.28-3.22 (m, 1H), 3.15-3.07 (m, 1H), 2.99-2.85 (m, 3H), 2.81 (br s, 1H), 2.50 (s, 3H), 2.19-2.11 (m, 1H), 2.09-1.86 (m, 3H), 1.82-1.72 (m, 1H), 1.71-1.62 (m, 3H), 1.60-1.54 (m, 1H), 1.48-1.38 (m, 1H), 0.90-0.71 (m, 3H)*. Note peak from 0.90-0.71 is actually observed as two broad singlets each integrating to 1.5H supporting API exists as mixture of rotomers in CDCl$_3$. $^{13}$C NMR: (125 MHz, CDCl$_3$) δ 179.7, 155.8, 155.7, 150.7, 148.8, 145.3, 141.2, 129.9, 119.4, 118.9, 71.4, 55.1, 50.7, 38.0, 35.2, 35.1, 34.5, 33.8, 31.8, 29.2, 27.9, 20.8, 20.4, 20.1, 19.5, 10.84, 10.76. 27 carbons (vs 22 theoretical) due to observed mixture of rotomers. LC/MS (ESI) Calcd for [C$_{22}$H$_{31}$N$_5$O$_5$+H]$^+$=446.24, found 446.24.

HPLC method conditions: Column: Waters XBridge C8, 3.5 μm, 4.6×150 mm; Mobile phase A: 0.01M NH$_4$OAc in acetonitrile:water (20:80); Mobile phase B: 0.01M NH$_4$OAc in acetonitrile:water:MeOH (75:5:20); Temperature: 40° C.; Gradient: 0 min (0% B), 9.6 min (25% B), 19.2 min (100% B), 27.0 min (100% B); Flow: 1.0 mL/min; 233 nm; HPLC RT 14.20 min.

Example 13. Preparation of (1S,3S)-3-((2-methyl-6-(1-methyl-5-((((methyl(propyl)carbamoyl)oxy)methyl)-1H-1,2,3-triazol-4-yl)pyridin-3-yl)oxy)cyclohexane-1-carboxylic Acid

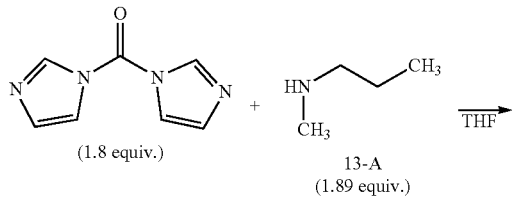

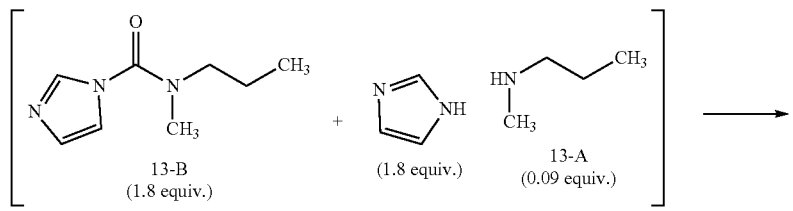

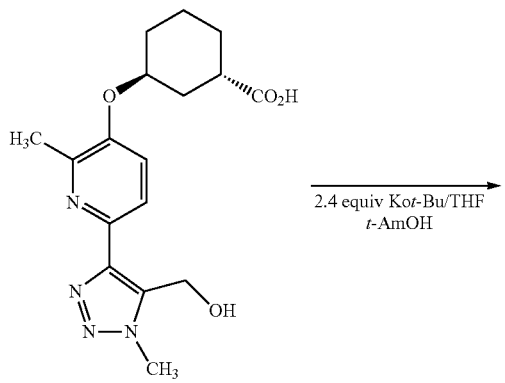

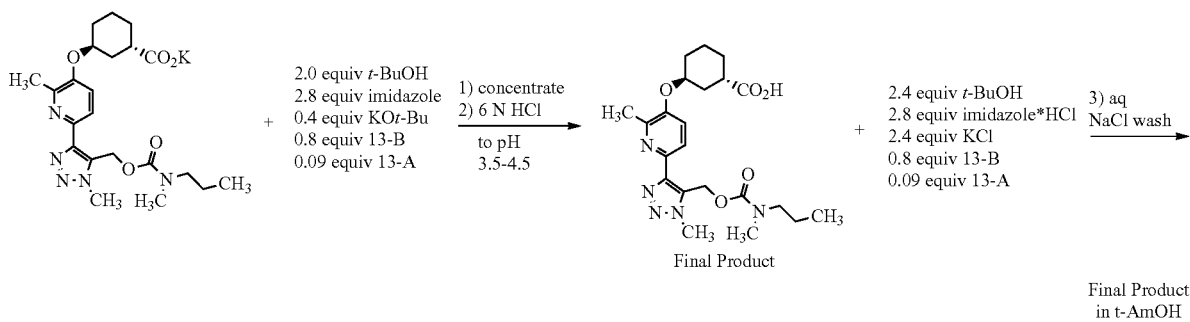

A 40 mL vial equipped with a magnetic stir bar, and N$_2$ inlet was sequentially charged CDI (0.842 g, 1.8 equiv) and THF (4.0 mL, 4.0 mL/g). Cooled the reaction mixture to 0° C. and added N-methylpropylamine (0.40 g, 1.89 equiv) dropwise over 20-45 minutes. After aging at 0-5° C. for an additional 30 min, the reaction mixture was warmed to room temperature and charged with 13-C (1.0 g, 1.0 equiv., limiting reagent) and 2-methyl-2-butanol (8.0 mL, 8 L/kg). The resulting solution was then warmed to 45-50° C. and charged with KOtBu (20 wt % in THF, 3.8 mL, 2.4 equiv) dropwise over 45 min via syringe pump. After an additional 2 h, the resulting thinner reaction mixture was cooled to ambient temperature and charged with water (3.0 mL, 3 L/kg). 6 N aqueous HCl (2.4 mL, 2.4 L·kg) was then added dropwise to adjust the pH of the aqueous layer to 4.0 (target pH 3.0-4.5). The lower aqueous layer was discarded, and the product-rich organic layer was then washed with aqueous NaCl (3 g/L, 3.0 mL, 3.0 L/kg) to obtain a solution of the final product in t-AmOH.

Bio-Catalytic Synthesis of
(1S,3S)-3-Hydroxycyclohexane-1-Carboxylic Acid

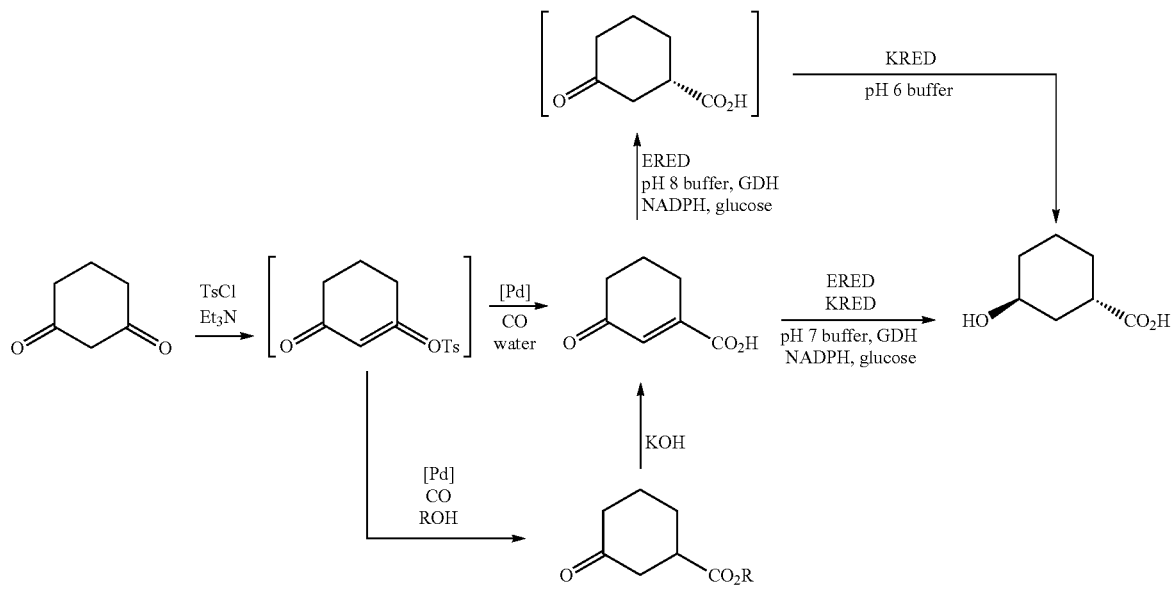

Example 14. Preparation of 3-oxocyclohex-1-en-1-yl 4-methylbenzenesulfonate

A 5 L Chemglass reactor under nitrogen was sequentially charged 1,3-cyclohexanedione (140.0 g, 1249 mmol, 1.0 equiv, limiting reagent), p-toluenesulfonyl chloride (250.0 g, 1311 mmol, 1.05 equiv) and ethyl-acetate (1400 mL, 10 L/kg). The resulting slurry was then cooled to 0-5° C. and charged with trimethylamine (151.6 g, 1498 mmol, 1.2 equiv) dropwise via addition funnel over ~35 minutes, keeping the internal temperature <10° C. After the addition was complete, rinsed the addition funnel with ethyl acetate (10 mL, 1 L/kg). After aging at 0-5° C. for an additional 1 h, warmed the reaction mixture to ambient temperature. After aging overnight, charged water (700 mL, 5 L/kg) and ethyl acetate (700 mL, 5 L/kg) and split resulting layers. The upper product-rich organic layer was then washed with sodium chloride (14 mass %) in water (140 mL, 2 L/kg), and the resulting product-rich organic layer was dried over MgSO$_4$ (140 g, 1 kg/kg), filtered and washed with ethyl acetate (78 mL, 0.6 L/kg) to afford the crude solution of the desired product in EtOAc. Solution was determined to contain ~15.6 wt % 3-oxocyclohex-1-en-1-yl 4-methylbenzenesulfonate based on comparing peaks for the desired product versus ethyl acetate, which based on total solution mass of 2114.36 g=329 g desired product (99% solution yield).

$^1$H NMR (500 MHz, CDCl$_3$) δ 7.75 (d, J=8.3 Hz, 2H), 7.33 (d, J=8.3 Hz, 2H), 5.70 (s, 1H), 2.41-2.38 (m, 5H), 2.25-2.22 (m, 2H), 1.93-1.87 (m, 2H).

HPLC method conditions: Column: Supelco Ascentis Express C18, 50×2.1 mm, 2.7 µm; Mobile phase A: 0.05% TFA in acetonitrile:water (5:95); Mobile phase B: 0.05% TFA in acetonitrile:water (95:5); Temperature: 40° C.; Gradient: 0 min (0% B), 2.0 min (100% B), 2.5 min (100% B); Flow: 1.0 mL/min; 232 nm; UHPLC RT 1.35 min.

Example 15. Preparation of methyl 3-oxocyclohex-1-ene-1-carboxylate

A mixture of palladium(II) acetate (935.0 mg, 4.165 mmoles, 0.05 equiv), 1,3-bis(diphenylphosphino)propane (2.06 g, 4.99 mmoles, 0.06 equiv) and methanol (40 mL, 1.8 L/kg) was prepared. To a 300 mL autoclave reactor charged 3-oxocyclohex-1-en-1-yl 4-methylbenzenesulfonate in EtOAc (141.7 g solution, ~15.6 wt %, 22.1 g 3-oxocyclohex-1-en-1-yl 4-methylbenzenesulfonate, 83.03 mmoles, 1.0 equiv, limiting reagent). Charged autoclave with Pd(OAc)$_2$/DPPP/MeOH mixture, followed by N,N-diisopropylethylamine. Autoclave was sealed and purged with 30 psi nitrogen 3 times, followed by purging with carbon monoxide 3 times. The autoclave was then pressurized to 30 psi and heated to 60° C. with agitation=700 RPM. After 15 h, autoclave was purged with nitrogen and the contents transferred to an amber glass bottle. The process above was then repeated 7 additional times, and all 8 reaction streams were combined for purification (theoretical product yield=102.35 g). The combined reaction mixtures were concentrated in vacuo, and the resulting residue was first charged with n-heptane (160 mL), EtOAc (80 mL) and water (160 mL). Residue did not fully dissolve, and liquids were decanted and saved. The remaining residue was then dissolved by adding EtOAc (240 mL), water (160 mL), and warming to 40° C. The saved n-heptane/EtOAc/water mixture was then added to the biphasic solution of EtOAc/water, and the layers were separated. The lower aqueous layer was back extracted with a mixture of n-heptane (160 mL) and EtOAc (160 mL). The combined organic layers were then concentrated on the rotovap to afford 110.39 g of an orange residue. The residue was then dissolved in EtOAc (200 mL), charged with Silica gel 60 (150 g), filtered and washed with EtOAc (160 mL). The combined filtrates were concentrated on the rotovap to afford 98.16 g of an orange liquid, which was then purified by ISCO chromatography using DCM/

EtOAc as mobile phase to afford 79.16 g (77% yield) of methyl 3-oxocyclohex-1-ene-1-carboxylate as a yellow oil.

$^1$H NMR (400 MHz, CDCl$_3$) δ 6.74 (s, 1H), 3.84 (s, 3H), 2.61-2.58 (m, 2H), 2.47-2.44 (m, 2H), 2.10-2.03 (m, 2H).

HPLC method conditions: Column: Acquity UHPLC HSS C18, 50×2.1 mm, 1.8 μm; Mobile phase A: 0.05% TFA in acetonitrile:water (5:95); Mobile phase B: 0.05% TFA in acetonitrile:water (95:5); Temperature: 40° C.; Gradient: 0 min (0% B), 2.0 min (100% B), 2.5 min (100% B); Flow: 1.0 mL/min; 240 nm; UHPLC RT 1.16 min.

Example 16. Preparation of 3-oxocyclohex-1-ene-1-carboxylic Acid

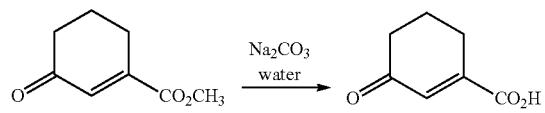

To a clean 500 mL reactor was charged sodium carbonate (54.6 g, 515 mmoles, 1.2 equiv) and water (400 mL, ~6 L/kg). After complete dissolution, charged methyl 3-oxocyclohex-1-ene-1-carboxylate (69.58 g, 429 mmoles, 1.0 equiv., limiting reagent) and warmed to 35° C. After ~24 h, added additional water (70 mL, ~1 L/kg) and split off lower aqueous layer from small amount of an upper orange oil. Slowly charged 3 N aqueous HCl until reached pH ~1, and then back extracted prdt with DCM (5×100 mL). The combined organic layers were then dried over Na$_2$SO$_4$, filtered and concentrated on the rotovap to afford 46.72 g of yellow solids. The solids were then charged with DCM (125 mL, ~1.8 L/kg), heated to 30-35° C. and then charged with n-heptane (650 mL, ~9.3 L/kg) dropwise over >1 h to induce crystallization. The resulting slurry was then filtered, washed with n-heptane (2×50 mL, 2×0.7 L/kg) and dried in vac oven @ 50° C. to afford 42.60 g (67% yield) of 3-oxocyclohex-1-ene-1-carboxylic acid as a pale yellow solid.

Alternatively,

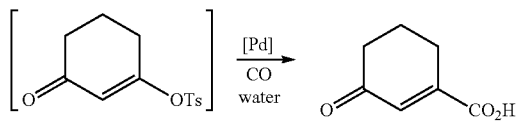

To a pressure-rated 4 mL vial in the glove-box was charged a stock solution of Pd(DPPP)Cl$_2$ in DCE (337.5 mg solution, prepared with 1.67 g DCE and 7.96 mg Pd(DPPP)Cl$_2$ which corresponds to 1.60 mg Pd(DPPP)Cl$_2$, 0.0027 mmoles, 0.04 equiv) and 3-oxocyclohex-1-en-1-yl 4-methylbenzenesulfonate solution in EtOAc (150 mg solution, ~13.4 wt %, 20.1 mg 3-oxocyclohex-1-en-1-yl 4-methylbenzenesulfonate, 0.075 mmoles, 1.0 equiv., limiting reagent). The mixture was concentrated to dryness (Genevac, full vacuum, ~1 h) and then sequentially charged with KOAc (18.4 mg, 0.187 mmoles, 2.5 equiv) and wet CH$_3$CN (0.75 mL, prepared stock solution with 3.7 mL CH$_3$CN and 67.5 mg water which corresponds to ~10 equiv water). The vial was then sealed and purged/vented to 30 psi nitrogen 3 times. The vial was then pressurized with carbon monoxide to 55 psi and warmed to 60° C. while on an orbital shaker set to 500 RPM. After >12 h, the vial was vented/placed back under nitrogen and judged to have afforded 99 AP of 3-oxocyclohex-1-ene-1-carboxylic acid by UPLC analysis.

$^1$H NMR (500 MHz, CDCl$_3$) δ 6.86 (t, J=1.9 Hz, 1H), 2.61 (td, J=6.1, 1.9 Hz, 2H), 2.52-2.47 (m, 2H), 2.14-2.06 (m, 2H).

HPLC method conditions: Column: Acquity UHPLC HSS C18, 50×2.1 mm, 1.8 μm; Mobile phase A: 0.05% TFA in acetonitrile:water (5:95); Mobile phase B: 0.05% TFA in acetonitrile:water (95:5); Temperature: 40° C.; Gradient: 0 min (0% B), 2.0 min (100% B), 2.5 min (100% B); Flow: 1.0 mL/min; 240 nm; UHPLC RT 0.85 min.

Example 17. (1S,3S)-3-hydroxycyclohexane-1-carboxylic Acid

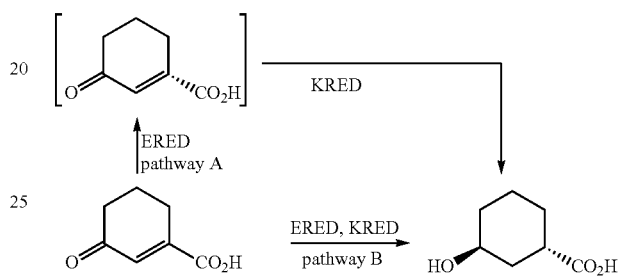

Stepwise Reaction (Pathway A):

To a 50 mL reactor was add ERED-302 (450 mg, 45 wt %), GDH-105 (100 mg, 10 wt %) and NADPH (50 mg, 0.05 wt %). Then 0.5 M sodium phosphate buffer pH 8.0 (17 mL, 17 L/Kg) was added and the agitation turned on to 500 rpm. The reaction was allowed to age for 30 minutes to allow dissolution of the biocatalysts. The pH was then checked and adjusted to pH 8.0 with 2.5 M NaOH, followed by charging D-Glucose (3.75 g, 3 equiv). At this point, set temperature to 32.5° C. and utilized pH stat to maintain reaction pH=8.0. In a second vessel, charged 3-oxocyclohex-1-ene-1-carboxylic acid (1.0 g, limiting reagent), 0.5 M sodium phosphate buffer pH 8.0 (3 mL, 3 L/Kg) and agitated for 10 minutes. The pH of this solution was then adjusted to pH 8.0 by the addition of 2.5 M NaOH. This solution was then charged to the biocatalyst solution over 6 hours via syringe pump. After 16 hours, the reaction was judged complete (<1 LCAP 3-oxocyclohex-1-ene-1-carboxylic acid) and charged 4M aqueous HCl to adjust pH to 6.0. A solution of KRED-P2-G03 (200 mg, 20 wt %) in 0.4 M sodium phosphate buffer (1 mL, 1 L/Kg) was then added the pH stat utilized to maintain pH=6.0. After 16 h the reaction was judged complete (<1 LCAP 3-oxocyclohex-1-ene-1-carboxylic acid).

Cascade Reaction (Pathway B):

To a 100 mL reactor was add ERED-302 (750 mg, 45 wt %), GDH-105 (100 mg, 10 wt %), NADPH (50 mg, 0.05 wt %) and KRED-P2-G03 (100 mg, 10 wt %). Then 0.5 M Sodium Phosphate buffer pH 7.0 (57 mL, 57 L/Kg) was added and the agitation set to 500 rpm. The reaction was allowed to age for 30 minutes to allow dissolution of the biocatalysts. The pH was then adjusted to pH 7.0 with 2.5M aqueous NaOH, followed by adding D-Glucose (3.75 g, 2 equiv). At this point, set temperature to 32.5° C. and utilized a pH stat to maintain reaction pH=7.0. In a second vessel, charged BMT-203387-01 (1.0 g, limiting reagent), 0.5 M Sodium Phosphate buffer pH 8.0 (3 mL, 3 L/Kg) and agitated for 10 minutes. The pH of this solution was then adjusted to pH 7.0 by the addition of 2.5 M NaOH. This solution was then charged to the biocatalyst solution over 6 hours via syringe pump. After 16 hours, the reaction was judged complete (>99 LCAP (1S,3S)-3-hydroxycyclohexane-1-carboxylic acid).

Analytical: Working concentration 1 mg/mL, Injection volume: 1 μL. Column: DB-FFAP 15 m×0.32 mm×0.50 μm, Carrier gas: Helium, Flow: 1.4 mL/min (constant flow) Front inlet temperature: 250° C., Injection Mode: Split, Split Ratio: 10, Split Flow: 14. Oven program: 50° C., 1 minute hold, then 10° C./min to 230° C., 3 minutes hold, then 20° C./min to 250° C., hold 2 minutes (25 minutes run time). Detector Type: FID, Detector temperature: 250° C., Fuel flow: 30 mL/min, Oxidizer flow: 300 mL/min, Makeup gas: Helium, Makeup gas flow: 30 mL/min.

What is claimed is:

1. A method of making a compound of Formula (VII), or a stereoisomer or a salt thereof:

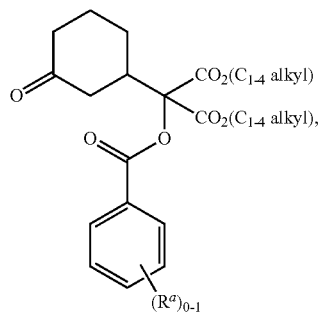

(VII)

wherein $R^a$ is —N(C$_{1-4}$ alkyl)$_2$,
comprising contacting a compound of Formula (VIII) or a salt thereof:

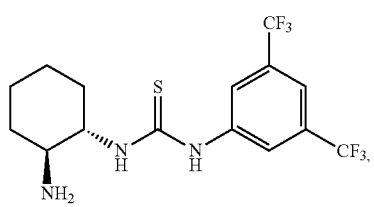

(VIII)

in presence of

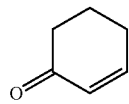

and a co-catalyst selected from

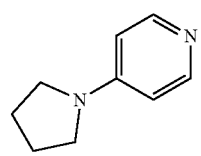

and 4-DMAP, with or without an aqueous base, in Solvent 5 that is a nonpolar solvent, or a solvent mixture thereof;
for a time and at a temperature sufficient for reaction completion to produce the compound of Formula (VII) or a stereoisomer or a salt thereof.

2. The method of claim 1, for making a compound of Formula (VIIa) or a salt

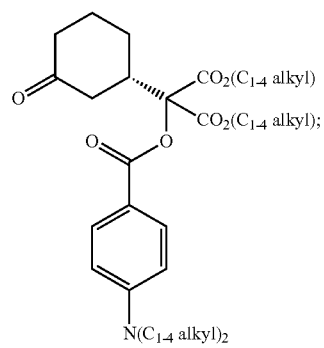

(VIIa)

comprising contacting a compound of Formula (VIII) or a salt thereof;
in presence of

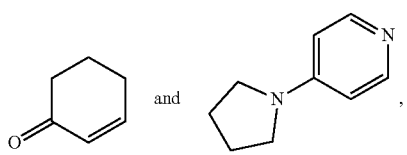 [SMILES: O=C1C=CCCC1 ; c1cc(N2CCCC2)ccn1]

with or without aqueous KOH, in Solvent 5 selected from toluene, CH$_2$Cl$_2$, trifluorotoluene, 1,2-dichlorobenzene, and a solvent mixture thereof;
for a time and at 25 to 35° C. sufficient for reaction completion to produce the compound of Formula (VIIa) or a salt thereof.

3. The method of claim 2, for making a compound of Formula (VIIb):

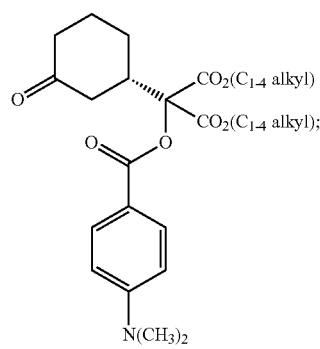

(VIIb)

comprising contacting a compound of Formula (VIII) or a salt thereof;

in presence of

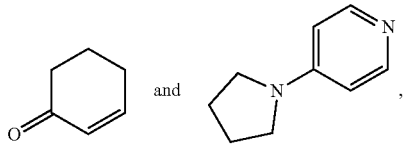 [SMILES: O=C1C=CCCC1 ; c1cc(N2CCCC2)ccn1]

with or without aqueous KOH, in toluene;

for 24 to 48 hours and at 25 to 35° C. sufficient for reaction completion to produce the compound of Formula (VIIb).

4. A method of making a compound of Formula (IX), or a stereoisomer or a salt thereof:

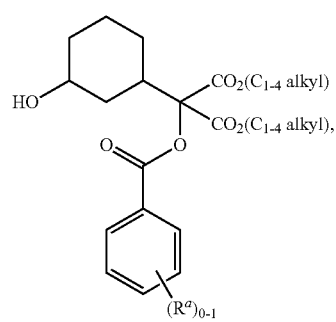

(IX)

wherein $R^a$ is —$N(C_{1-4}$ alkyl$)_2$;

comprising contacting a compound of Formula (VII) or a salt thereof:

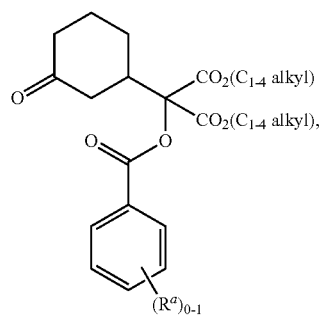

(VII)

wherein $R^a$ is —$N(C_{1-4}$ alkyl$)_2$;

with a transition-metal catalyst in presence of a diprotic acid in Solvent 6 that is a protic or polar aprotic solvent or a solvent mixture thereof;

for a time and at a temperature sufficient for ketone reduction to produce the compound of Formula (IX) or a stereoisomer or a salt thereof.

5. The method of claim 4, for making a compound of Formula (IXa) or a salt thereof:

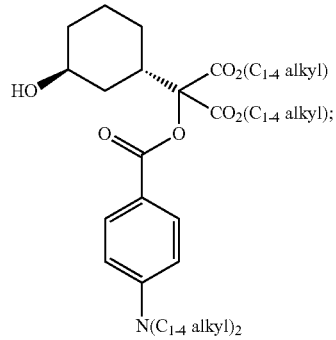

(IXa)

comprising contacting a compound of Formula (VIIa) or a salt thereof:

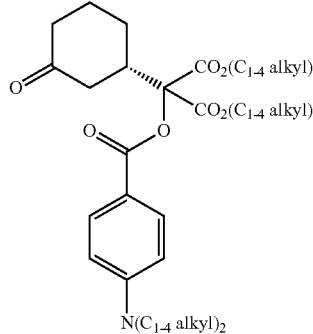

(VIIa)

with a transition-metal catalyst selected from $IrCl_4$, $IrCl_4$*hydrate or $[Ir(COD)Cl]_2$ in presence of phosphorous acid in Solvent 6 selected from IPA, MeOH, EtOH, t-AmOH, $H_2O$, NMP, DMF, DMAc, sulfolane, and a solvent mixture thereof;

for a time and at 65 to 100° C. sufficient for ketone reduction to produce the compound of Formula (IXa) or a salt thereof.

6. The method of claim 5, for making a compound of Formula (IXb):

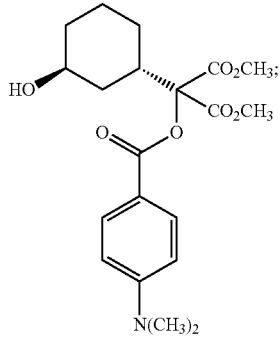

(IXb)

comprising contacting a compound of Formula (VIIb):

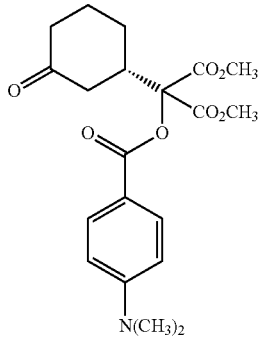

(VIIb)

with $IrCl_4$*hydrate or $[Ir(COD) Cl]_2$ in presence of phosphorous acid in $IPA/H_2O$ or a solvent mixture thereof; for 24 to 96 hours and at 80 to 85° C. sufficient for ketone reduction to produce the compound of Formula (IXb).

7. A method of making a compound of Formula (Xa) or a salt thereof:

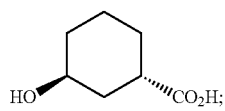

(Xa)

comprising (1) contacting a compound of Formula (IXa) or a salt thereof:

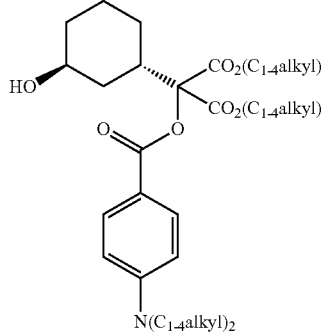

(IXa)

with Reagent 3 selected from NaOH, KOH, LiOH, tetraalkylammonium hydroxide, and a mixture thereof, in an aqueous $R^7$—OH solution, wherein $R^7$ are independently $C_{1-6}$ alkyl;

for up to 48 hours at 80 to 85° C. sufficient for hydrolysis of all three ester moieties to produce the compound of Formula (XI);

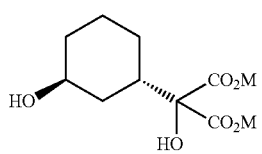

(XI)

wherein M is selected from a metal element selected from Li, Na, and K, and tetraalkylammonium;

(2) contacting an acid in a protic solvent; and
(3) contacting periodic acid in a protic solvent;
for up to 48 hours at 20-25° C. sufficient for oxidation to produce the compound of Formula (Xa) or a salt thereof.

8. The method of claim 7, for making a compound of Formula (Xa):

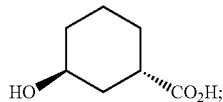

(Xa)

comprising (1) contacting a compound of Formula (IXb) or a salt thereof:

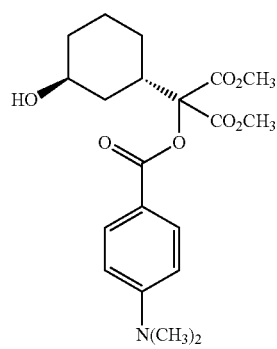

(IXb)

with NaOH in an aqueous IPA solution for at least 12 hours at 80 to 85° C. sufficient to produce the compound of Formula (XIa);

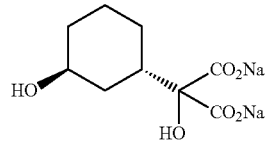

(XIa)

(2) contacting aqueous HCl; and
(3) contacting periodic acid in an aqueous IPA solution;
for up to 48 hours at 20-25° C. sufficient for oxidation to produce the compound of Formula (Xa).

9. A method of making a compound of Formula (XII), or a stereoisomer or a salt thereof:

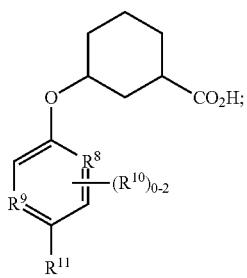

(XII)

wherein: $R^8$ and $R^9$ are independently N, CH or C($C_{1-6}$ alkyl);

$R^{10}$ is independently $C_{1-4}$ alkyl or halogen; and $R^{11}$ is independently Br, Cl or I;

comprising contacting a compound of Formula (XIII) or a salt thereof:

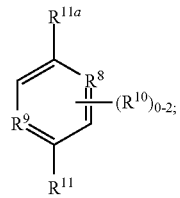

(XIII)

wherein: $R^8$, $R^9$, $R^{10}$ and $R^{11}$ are the same as above in the Formula (XII) and $R^{11a}$ is halogen;

with the compound of Formula (X) or a stereoisomer or a salt thereof:

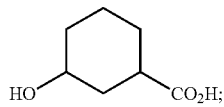

(X)

in presence of a metal alkoxide in Solvent 7 that is a polar aprotic or nonpolar solvent, or a solvent mixture thereof;

for a time and at a temperature sufficient for reaction completion to produce the compound of Formula (XII) or a stereoisomer or a salt thereof.

10. The method of claim 9, for making a compound of Formula (XIIa) or a salt thereof:

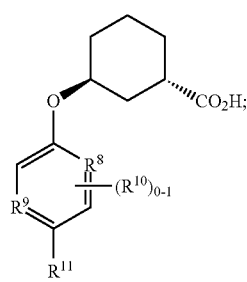

(XIIa)

comprising contacting a compound of Formula (XIIIa) or a salt thereof:

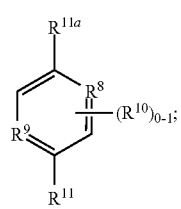

(XIIIa)

with the compound of Formula (Xa) or a salt thereof:

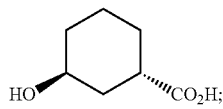

(Xa)

in presence of a metal alkoxide selected from KOtBu, KHMDS, NaHMDS, and potassium amylate; in Solvent 7 selected from DMF, MTBE, DMAc, NMP, DMPU, THF, 2-MeTHF, CPME, diisopropyl ether, toluene and a solvent mixture thereof;

for a time and at 20 to 35° C. sufficient for reaction completion to produce the compound of Formula (XIIa) or a salt thereof.

11. The method of claim 10, for making a compound of Formula (XIIb) or a salt thereof:

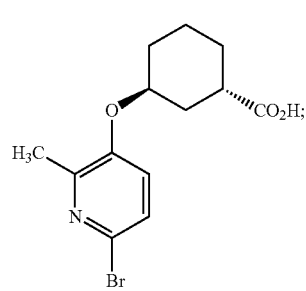

(XIIb)

comprising contacting a compound of Formula (XIIIb) or a salt thereof:

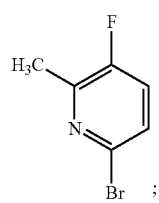

(XIIIb)

with the compound of Formula (Xa) or a salt thereof:

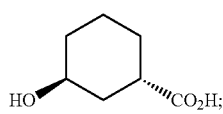

(Xa)

in presence of KOtBu in a DMF/MTBE mixture;

for 18 to >48 hours and at 20 to 35° C. sufficient for fluoride displacement to produce the compound of Formula (XIIb) or a salt thereof.

12. A method of making a compound of Formula (XIVc), or a stereoisomer or a salt thereof:

(XIVc)

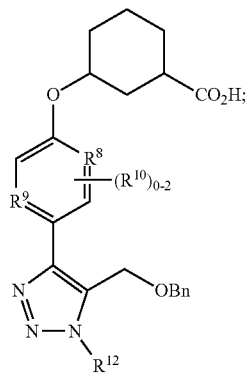

wherein: $R^8$ and $R^9$ are independently N, CH or C($C_{1-6}$ alkyl);
$R^{10}$ is independently $C_{1-4}$ alkyl or halogen; and
$R^{12}$ is $C_{1-4}$ alkyl;
comprising (1) contacting a compound of Formula (I):

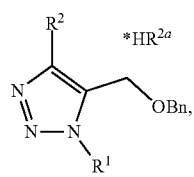
(I)

wherein $R^1$ is $C_{1-6}$ alkyl; and $R^2$ and $R^{2a}$ are halogen;
with an organometallic reagent and with or without an inorganic reagent in Solvent 8 that is a polar aprotic, or nonpolar solvent, or a solvent mixture thereof;
for a time and at a temperature sufficient for metal-halogen exchange; then
(2) contacting a compound of Formula (XII) or a stereoisomer or a salt:

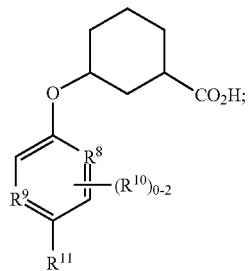
(XII)

wherein: $R^8$ and $R^9$ are independently N, CH or C($C_{1-6}$ alkyl);
$R^{10}$ is independently $C_{1-4}$ alkyl or halogen; and
$R^{11}$ is Br or Cl;
with the metal-halogen exchanged product and a Palladium catalyst in Solvent 8;
for a time and at a temperature sufficient for C—C coupling; and
(3) contacting a metal binding agent in Solvent 8;
for a time and at a temperature sufficient for reaction quench to produce the compound of Formula (XIVc) or a stereoisomer or a salt thereof.

13. The method of claim 12, for making a compound of Formula (XIVd) or a salt thereof:

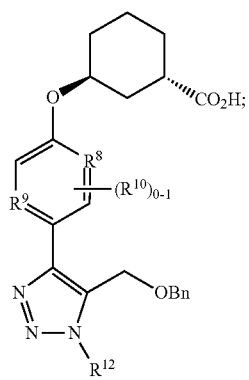
(XIVd)

wherein: $R^8$ and $R^9$ are independently N, CH or C($C_{1-4}$ alkyl);
$R^{10}$ is independently $C_{1-4}$ alkyl or halogen; and
$R^{12}$ is $C_{1-4}$ alkyl;
comprising (1) contacting a compound of Formula (I),
with the organometallic reagent that is a Grignard reagent selected from i-PrMgCl, i-PrMgCl*LiCl, and i-PrMgBr or an organolithium reagent selected from methyllithium, n-butyllithium, iso-propyllithium, sec-butyllithium, tert-butyllithium, and phenyllithium; with or without an inorganic reagent selected from $ZnCl_2$, $ZnBr_2$, and $ZnI_2$ in Solvent 8 selected from THF, 2-MeTHF, DMF, DMA, DMPU, NMP, 1,4-dioxane and a solvent mixture thereof;
for a time and at −5 to 25° C. sufficient for metal-halogen exchange and organozinc formation;
(2) contacting a compound of Formula (XIIa) or a salt:

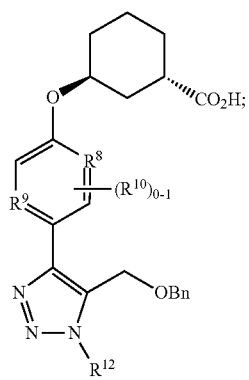
(XIIa)

with the metal-halogen exchanged product that is organometallic reagent and a Palladium catalyst selected from $PdCl_2$ (Xantphos), Pd(dppf) $Cl_2$ or Pd(OAc)$_2$+ Brettphos, BINAP, dppf, DPEPhos and xantphos in Solvent 8;
for a time and at −5 to 40° C. sufficient for C—C coupling; and
(3) contacting a metal binding agent selected from tribasic sodium ethylenediaminetetraacetic acid or dibasic sodium ethylenediaminetetraacetic acid in Solvent 8;
for a time and at −5 to 25° C. sufficient for reaction quench to produce the compound of Formula (XIVd) or a salt thereof.

14. The method of claim 13, for making a compound of Formula (XIVe), isolated as either the free acid or a salt thereof selected from potassium, tetramethylammonium, tert-butylamine, dicyclohexylamine and tromethamine salt:

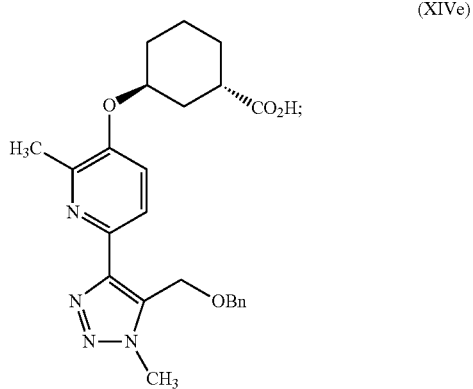 [SMILES: Cc1nc(-c2nnn(C)c2COCc2ccccc2)ccc1O[C@H]1CCC[C@H](C(=O)O)C1]

comprising (1) contacting a compound of Formula (Ia):

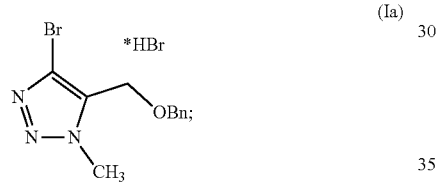

with i-PrMgCl (2.15 M in THF), with or without ZnCl$_2$, in THF;
for a time and at −5 to 25° C. sufficient for metal-halogen exchange and organozinc formation (if ZnCl$_2$ present);
(2) contacting a compound of Formula (XIIb) or a salt thereof:

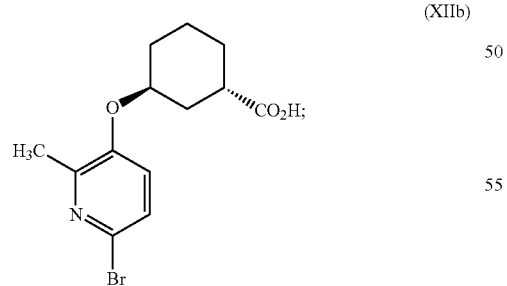

with i-PrMgCl (2.15 M in THF), with or without ZnCl$_2$, the organomagnesium (or organozinc) Reagent and PdCl$_2$ (Xantphos) in THF;
for >12 hours and at −5 to 40° C. sufficient for C—C coupling; and
(3) sequentially contacting tribasic sodium ethylenediaminetetraacetic acid or dibasic sodium ethylenediaminetetraacetic acid in the THF solvent mixture, with or without sodium percarbonate and sodium bisulfite (or sodium metabisulfite);
for >1 hour and at −5 to 25° C. sufficient for reaction quench to produce the compound of Formula (XIVe), then isolated as either the free acid or a salt thereof selected from potassium, tetramethylammonium, tert-butylamine, dicyclohexylamine and tromethamine salt.

15. A compound of Formula (VII), or a salt thereof:

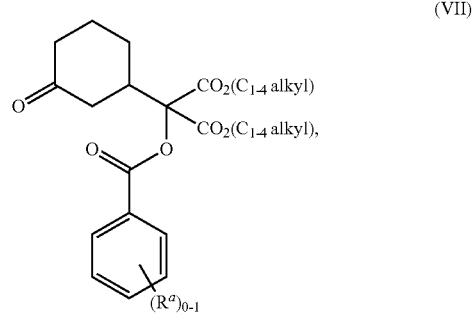

wherein $R^a$ is —N(C$_{1-4}$ alkyl)$_2$.

16. The compound of claim 15, wherein the compound is of Formula (VIIa) or a salt thereof:

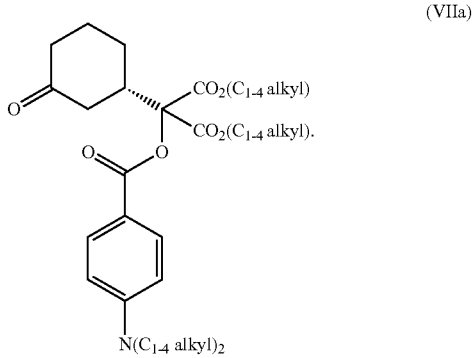

17. The compound of claim 16, wherein the compound is of Formula (VIIb), or a salt thereof:

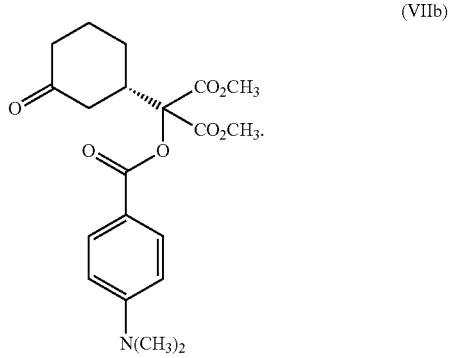 [SMILES: COC(=O)C(OC(=O)c1ccc(N(C)C)cc1)(C(=O)OC)[C@H]1CCCC(=O)C1]

18. A compound of Formula (IX) or a stereoisomer or a salt thereof:

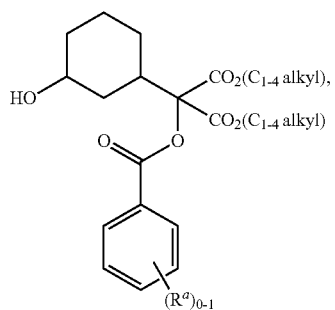

(IX)

wherein $R^a$ is —N(C$_{1-4}$ alkyl)$_2$.

19. The compound of claim 18, wherein the compound is of Formula (IXa) or a salt thereof:

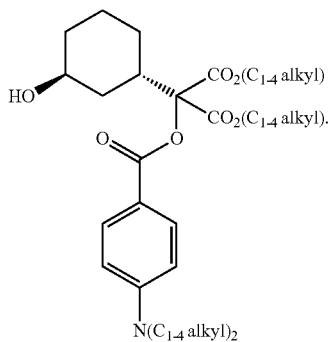

(IXa)

20. The compound of claim 19, wherein the compound is of Formula (IXb) or a salt thereof:

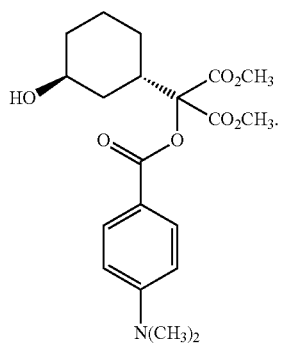

(IXb)

21. A compound of Formula (XII) or a stereoisomer or a salt thereof:

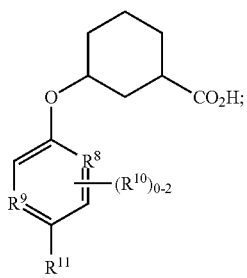

(XII)

wherein: $R^8$ and $R^9$ are independently N, CH or C(C$_{1-6}$ alkyl);
$R^{10}$ is independently C$_{1-4}$ alkyl or halogen; and
$R^{11}$ is independently Br, Cl or I.

22. The compound of claim 21, wherein the compound is of Formula (XIIa) or

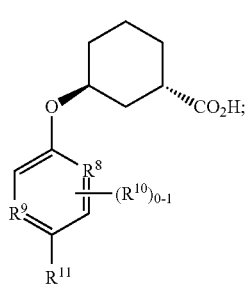

(XIIa)

wherein: $R^8$ and $R^9$ are independently N, CH or C(C$_{1-4}$ alkyl);
$R^{10}$ is independently C$_{1-4}$ alkyl or halogen; and
$R^{11}$ is independently Br, Cl or I.

23. The compound of claim 22, wherein the compound is of Formula (XIIb) or a salt thereof:

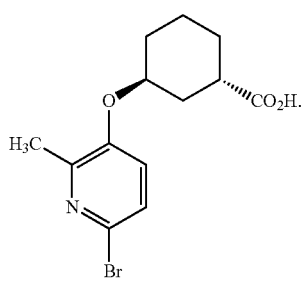

(XIIb)

* * * * *